US010503528B2

(12) United States Patent
Van der Sanden et al.

(10) Patent No.: US 10,503,528 B2
(45) Date of Patent: Dec. 10, 2019

(54) METHOD AND APPARATUS FOR COMPOSITE USER INTERFACE CREATION

(71) Applicant: Versata FZ-LLC, Dubai Media (AE)

(72) Inventors: Edwin Wilhehmus Petrus Cornelus Van der Sanden, London (GB); Matthew Rhys Madoc Stephens, London (GB)

(73) Assignee: Versata FZ-LLC (AE)

( * ) Notice: Subject to any disclaimer, the term of this patent is extended or adjusted under 35 U.S.C. 154(b) by 0 days.

(21) Appl. No.: 15/832,559

(22) Filed: Dec. 5, 2017

(65) Prior Publication Data
US 2018/0253323 A1 Sep. 6, 2018

Related U.S. Application Data

(63) Continuation of application No. 10/587,474, filed as application No. PCT/GB2004/000429 on Feb. 3, 2004, now Pat. No. 9,864,610.

(51) Int. Cl.
*G06F 3/0481* (2013.01)
*G06F 9/451* (2018.01)

(52) U.S. Cl.
CPC ............ *G06F 9/451* (2018.02); *G06F 3/0481* (2013.01)

(58) Field of Classification Search
CPC .......................................... G06F 3/0481–0489
See application file for complete search history.

(56) References Cited

PUBLICATIONS

Corizon.com et. al. "Corizon User Process Management Software", Nov. 20, 2003 (Year: 2003).*
Response to Rule 312 Communication dated Nov. 13, 2017, mailed in U.S. Appl. No. 10/587,474, pp. 1-3.
Amendment under 37 C.F.R. § 1.312 as filed in U.S. Appl. No. 10/587,474 on Nov. 3, 2017, pp. 1-24.
Notice of Allowance dated Nov. 24, 2017, mailed in U.S. Appl. No. 10/587,474, pp. 1-17.
Response to Non-Final Office Action dated Feb. 27, 2017, as filed in U.S. Appl. No. 10/587,474 on Jul. 27, 2017, pp. 1-24.
Non-Final Office Action dated Feb. 27, 2017, mailed in U.S. Appl. No. 10/587,474, pp. 1-42.
Response to Non-Final Office Action dated Jul. 25, 2016, as filed in U.S. Appl. No. 10/587,474 on Oct. 25, 2016, pp. 1-25.
Non-Final Office Action dated Jul. 25, 2016, mailed in U.S. Appl. No. 10/587,474, pp. 1-19.
Response to Non-Final Office Action dated Oct. 8, 2015, as filed in U.S. Appl. No. 10/587,474 on Apr. 8, 2016, pp. 1-37.
Non-Final Office Action dated Oct. 8, 2015, mailed in U.S. Appl. No. 10/587,474, pp. 1-53.
Request for Continued Examination (RCE) and RCE Submission, as filed in U.S. Appl. No. 10/587,474, pp. 1-37.
Advisory Action dated Oct. 22, 2014, mailed in U.S. Appl. No. 10/587,474, pp. 1-4.

(Continued)

*Primary Examiner* — Steven B Theriault

(57) ABSTRACT

A method and apparatus for modelling and generating a composite user interface comprising a plurality of user interface elements provided by at least one source application. Modelling the composite user interface comprises modelling at least part of a user interface provided by the or each source application, and modelling relationships between the at least part of the user interface provided the or each source application and the composite user interface.

33 Claims, 69 Drawing Sheets

(56) References Cited

PUBLICATIONS

Response to Final Office Action dated Apr. 24, 2014, as filed in U.S. Appl. No. 10/587,474 on Sep. 24, 2014, pp. 1-34.
Final Office Action dated Apr. 24, 2014, mailed in U.S. Appl. No. 10/587,474, pp. 1-52.
Response to Non-Final Office Action dated Jun. 25, 2013, as filed in U.S. Appl. No. 10/587,474 on Dec. 25, 2013, pp. 1-32.
Non-Final Office Action dated Jun. 25, 2013, mailed in U.S. Appl. No. 10/587,474, pp. 1-52.
Request for Continued Examination (RCE) and RCE Submission, as filed in U.S. Appl. No. 10/587,474 on Feb. 19, 2013, pp. 1-38.
Advisory Action dated Feb. 6, 2013, mailed in U.S. Appl. No. 10/587,474, pp. 1-4.
Response to Final Office Action dated Aug. 16, 2012, as filed in U.S. Appl. No. 10/587,474 on Jan. 16, 2013, pp. 1-34.
Final Office Action dated Aug. 16, 2012, mailed in U.S. Appl. No. 10/587,474, pp. 1-44.
Response to Non-Final Office Action dated Oct. 28, 2011, as filed in U.S. Appl. No. 10/587,474 on Apr. 30, 2012, pp. 1-33.
Non-Final Office Action dated Oct. 28, 2011, mailed in U.S. Appl. No. 10/587,474, pp. 1-49.
Request for Continued Examination (RCE) and RCE Submission, as filed in U.S. Appl. No. 10/587,474 on Jul. 6, 2011, pp. 1-37.
Final Office Action dated Jan. 6, 2011, mailed in U.S. Appl. No. 10/587,474, pp. 1-42.
Response to Non-Final Office Action dated Apr. 16, 2010, as filed in U.S. Appl. No. 10/587,474 on Oct. 18, 2010, pp. 1-32.
Non-Final Office Action dated Apr. 16, 2010, mailed in U.S. Appl. No. 10/587,474, pp. 1-46.

* cited by examiner

| DefaultComponentRegistry |
|---|
| -DefaultComponentRegistry minstance=new DefaultComponentRegistry()<br>-MbeanServer mMyMBEanServer<br>-String mG2MbeanDomain<br>-String mDefaultDomain<br>-String mHostIpString<br>-String mProcessIdString<br>-Hashtable mRegisteredComponent |
| -DefaultComponentReistry()<br>-void init()<br>-void reisterMBeanObject( String domain, Object obj, Hashtable nvps)<br>-void unregisterMBeanObject(ObjectName target)<br>-void CleanUpMBeanServer()<br>-voidregisterComponent(Component c)<br>-void unregisterComponent(Component c)<br>-Component registerComponentAware(ComponetAware ca)<br>-Component registerGenericComponent(Object o)<br>-Component registerRmiConnectorServer(RmiConnectorServer o)<br>-Component registerCascadingAgent(CascadingAgent o)<br>-Component registrHtmlAdapterServer(HtmlAdapterServer o)<br>-void cleanup()<br>-Set findObjectNames(AddressMask am)<br>+Hashtable getComponentProperties(Component c)<br>+ComponentRegistry getInstance()<br>+ComponentAddress lookupComponentAddress(Object o)<br>+void waitForComponentRegistration(String objectname, int maxwaitseconds)<br>*+Component registerObject(Object o)*<br>+void unregisterObject(Object o)<br>+void addNotificstionListener(ObjectName name, NotificstionListener listener, java.lang.Object.handback)<br>+void invokeOnObject(AddressMask m, String method, Object[] params, String[] signature)<br>+void invokeOnObject(Object o, String method, Object[] params, String[] signature)<br>+void invokeOnObject(ComponentAddress addr, String method, Object[] params, String[] signaure)<br>+Set findLocalObjectComponents(AddressMask props)<br>+Set findGlobalObjectComponents(AddressMask props) |

FIG 4A

| ComponentRegistry |
|---|
| +Component registerObject(Object c)<br>+void unregisterObject(Object c)<br>+void invokeOnObject(AddressMask addr, String method, Object[] params, String[] signature)<br>+void invokeOnObject(ComponentAddress addr, String method, Object[] params, String[] signature)<br>+void invokeOnObject(Object o, String method, Object[] params, String[] signature)<br>+void WaitForComponentRegistration(String objectname, int maxwaitseconds)<br>+ComponentAddress lookupComponentAddress(Object o)<br>+Set findLocalObjectComponents(AddressMask props)<br>+set findGlobalObjectComponents(AddressMask props) |

FIG 4B

| HostMaster |
|---|
| -boolean misDebug<br>-int mNextProcessId<br>-VectormActiveProcessIds<br>-boolean mIsAlive<br>-ComponentRegistry mCRegistry<br>-HostMaster mTheMaster<br>-HostMasterComponent mHotMasterComponent<br>-*String mProcessPropsString* |
| +HostMaster()<br>+int addProcess()<br>+void destroyProcess(Integer pid)<br>+void main(String[] args)<br>+void shutdown()<br>+void kill()<br>+*void SetLsDebug(boolean d)*<br>+boolean isDebug()<br>+boolean isAlive()<br>-boolean getBooleanArg(String token, String[] args)<br>+void processLost(int pid)<br>+Class getComponentClass()<br>-void recover()<br><br>-ShutdownMonitor |

FIG 4C

| ProcessAgent |
|---|
| -int mMyPid<br>-ProcessAgentComponent mAgent<br>-*ProcessAgent mAgent*<br>-NodeManager mNodeManager<br>-boolan mIsAlive<br>-ComponentRegistry mCRegistry |
| +ProcessAgent(int pid)<br>+boolean isAlive()<br>+void main(String[] args)<br>+void addNode(NodeType nt)<br>+void removeNode(NodeType nt)<br>+void startNode(NodeType nt)<br>+void stopNode(NodeType nt)<br>+void destroyProcess()<br>+void addNode(String nt)<br>+void removeNode(String nt)<br>+void startNode(String nt)<br>+void stopNode(String nt)<br>+int getProcessId()<br>+Class getComponentClass() |

| NodeManager |
|---|
| -Vector mynodes |
| +void NodeManager()<br>+Node createNode(NodeType type)<br>-void destroyNode(Node n)<br>-void startNode(Node n)<br>-void stopNode(Node n)<br>+void destroyNode(NodeType nt)<br>+void startNode(NodeType nt)<br>+void stopNode(NodeType nt)<br>+Node getNode(NodeType type)<br>+Integer activeNodeCount()<br>+void recoverNodes() |

| ComponentAware |
|---|
| +Class getComponentClass() |

| HostMasterComponent |
|---|
| -String MBEANTYPE="HostMaster"<br>-String MYBEAQNDESCRIPTION<br>-int HEARTBEATRETRIES=1<br>-int HEARTBEATPERIOD=5000<br>-HostMaster mHostMaster<br>-HtmlAdapterComponent mHtmlAdapterComponent<br>-Hashtable mRemAgents<br>-ComponentRegistry mCRegistry |
| +HostMasterComponent(Object hm)<br>-CascadingAgent createCascadingAgent(String cascadingDomain, String hostname, int targetProcess<br>+String getType()<br>+void processAdded(int pid)<br>+void processRemoved(int pid)<br>+void preRegister()<br>+void preUnregister()<br>+void handleNotification(Notification n, Object o)<br>+void processRecovered(int pid)<br>#String getMBeaqnDescription()<br>#ModelMBeanOperationInfo[] getMBenOperations() |

| ProcessAgentComponent |
|---|
| +String MBEANTYPE="ProcessAgent"<br>-String MYBEANDESCRIPTION=""<br>-ProcessAgent mProcessAgent<br>-RMIConnectorServerComponent mRMIServer<br>-ComponentRegistry mCRegistry |
| +ProcessAgentRegistry(Object pa)<br>+ void preRegister()<br>+void preUnregister()<br>+String getType()<br>#String getMBeanDescription()<br>#ModelMBeanOperationInfo[] getMBeanOperations() |

| GenericComponent |
|---|
| -String MYBEANDESCRIPTION="Object"<br>+GenericComponent(Object o)<br>+String getType()<br>#String getMBeanDescription() |

| Component |
|---|
| +String IDPROP="id"<br>+String TYPEPROP="type"<br>+String HOSTPROP="host"<br>+String PROCESSPROP="process"<br>+String NODEPROP="node"<br>+String SERVICEPROP="service" |
| +String getId()<br>+String getType()<br>+String getService()<br>+String getNode()<br>+String getAdminDomain()<br>+Object getObject()<br>+Object getMBEan()<br>+String getHostId()<br>+String getProcessId()<br>+void preRegister()<br>+void preUnregister() |

| ComponentBase |
|---|
| -Object mTheObject<br>-String mObjectDescription<br>-Object mTheMBean<br>-ArrayList mMBeanOperationInfo<br>-ArrayList mMBEANAttributeInfo<br>-ArrayList mMBeanNotificationInfo<br>-String mHostIp<br>-String mProcessId |
| +ComponentBase(Object o)<br>+boolean isMBean(Object o)<br>+String getId()<br>+String getType()<br>+String getService()<br>+string getNode()<br>+Object getObject()<br>+void preRegister()<br>+void preUnregister()<br>+Object getMBean()<br>#void setObjectDescription(String desc)<br>#ModelMBeanOperatingInfo[] getMBeanOperations()<br>#ModelMBeanAttributeInfo[] getMBeanAttributes()<br>#ModelMBeanNotificationInfo[] getMBeanNotifications()<br>#String getMBeanDescription()<br>-void setupMBeanInfo()<br>+String getAdminDomain()<br>+String getHostIP()<br>+String getProcessId() |

| G2Component |
|---|
| +G2Component(Object o)<br>+String getAdminDomain() |

| AdminComponent |
|---|
| +AdminComponent(Object o)<br>+String getAdminDomain() |

FIG 4M

| CascadingAgentComponent |
|---|
| +String MBEANTYPE="CascadingAgent"<br>+String CONNECTORCLIENTCLASSNAME="com.sun.j" |
| +CascadingAgentComponent(CascadingAgent agent)<br>+String getId()<br>+String getType() |

FIG 4N

| HTMLAdaptorComponent |
|---|
| -String HTTPCONNECTIONSERVER<br>-HtmlAdaptorServer mHtmlAdaptor |
| +HtmlAdaptorComponent(HtmlAdaptorServer has)<br>+String getType() |

FIG 4O

| RMIConnectorServerComponent |
|---|
| +String RMICONNECTORSERVER="RmiConnectorServer"<br>+String RMICONNECTORSERVICENAMEPREFIX="Process-"<br>-RmiConnectorServer mTheRmiConnector=null |
| +RMIConnectorServerComponent(RmiConnectorServer o)<br>+String getRMIConnectorServiceName(int targetProcessId)<br>+String getType() |

FIG 4P

| ServiceComponent |
|---|
| -BaseService m_Service<br>-String MYBEANDESCRIPTION="A Service" |
| +ServiceComponent(Object s)<br>+String etType()<br>+String getNode()<br>#String getMBeanDescription()<br>#ModelMBeanAttributeInfo[] getMBeanAttributes()<br>#ModelMBeanOperationInfo[] getMBeanOperation |

| NodeComponent |
|---|
| -String MYMBEANDESCRIPTION="A node : runs a set"<br>-MasterNode mNode |
| +NodeComponent(Object n)<br>+String getType()<br>#String getMBeanDescription()<br>#ModelMBeanAttributeInfo[] getMBeanAttributes()<br>#ModelMBeanOperationInfo[] getMBeanOperations() |

| NodeAdmin |
|---|
| +Node createNode(NodeType type)<br>+void startNode(NodeType nt)<br>+void stopNode(NodeType nt)<br>+Node getNode(NodeType type)<br>+Integer activeNodeCount()<br>+void recoverNodes() |

| G2Runtime |
|---|
| -G2Runtime mInstance=new G2Runtime()<br>-int mProcessId<br>-String mHostIdString |
| -G2Runtime()<br>+void init()<br>+ComponentRegistry getComponentRegistry()<br>+String getHostId()<br>+int getProcessId() |

FIG 4T

| ComponentAddress |
|---|
| -Hashtable mAddressAttributes<br>-String HOST=G2Runtime.getHostIp()<br>-String PROCESS=""+G2Runtime.getProcessId()<br>-AddressAttribute[] mAttributeList=new AddressAttribute[] |
| +ComponentAddress newAddress()<br>+ComponentAddress getAddress(Component c)<br>-ComponentAddress(Hashtable props)<br>-ComponentAddress()<br>+Hashtable getAttributes()<br>+void setAttribute(AddressAttribute aa)<br>+AddressAttribute getAttribute(String name)<br>+boolean isComplete()<br>+boolean equals(Object o)<br>+String toString() |

FIG 4U

| MBeanConfig |
|---|
| +int RMIPORT=1099<br>+int HTTPPORT=8080<br>+String G2DOMAQIN="G2Domain"<br>+String DEFAULTDOMAIN="DefaultDomain"<br>+String PIDPROPERTYNAME="g2.processid" |

| com.genient.platform.node.NodeFactory |
|---|
| -Object[][] NODEDEFS={ ( NodeType.A |
| -NodeFactory instance=new NodeFactory() |
| #NodeFactory() |
| +NodeFactory getInstance() |
| +Node[] createNodes(NodeType[] nodetype) |
| +Node createNode(NodeType nodetype) |
| -void loadNodeDefs() |
| -LinkedList getApplicationAdapterServiceList |
| -LinkedList getClientAdapterServiceList() |
| -LinkedList getBPStoreServiceList() |
| -LinkedList getTMServiceList() |
| -LinkedList getSystemManagerServiceList() |
| -LinkedList getDebugNodeServiceList() |

| ComponentAware |
|---|
| ...platform.node.MasterNode |
| -Thread mEventNotifier |
| -NodeType type |
| -String subType |
| -HashMap mStateTransitions |
| -HashMap mServices |
| -HashMap mListeners |
| -boolean isInitialised |
| -boolean removed |
| -String lastError=NOERROR |
| -String NOERROR="NONE" |
| -Node mState |
| -Pool mRouterThreadPool |
| -Cache mCache |
| -AddressableRegistry mAddressab |
| -void notifyListeners() |
| -void setType(NodeType type) |
| -void startServices() |
| -void stopServices() |
| +String getLastError() |
| +NodeType getType() |
| +Node getState() |
| +String getStateDescription() |
| -void initRouterThreadPool() |
| #void addService(HandlerContext s |
| #void removeServices() |
| + MasterNode() |
| +void addListener() |
| +void removeListener() |
| +void start() |
| +void stop() |
| +void setSubType(String st) |
| +String getSubType() |
| +void init() |
| +void destroy() |
| +Integer getAvailableRouterThread |
| +RouterThread getRouterThread() |
| +void releaseRouterThread(Router |
| +Class getComponentClass() |
| +void recover() |
| #void setState(Node newState) |

| interface |
|---|
| ...platform.node.Node |
| +void init() |
| +void start() |
| +void stop() |
| +void destroy() |
| +void recover() |

| interface |
|---|
| com.genient.platform.util.Pool |
| +void releaseObject(Object o) |
| +Object getObject() |
| +int getAvailableCount() |
| +int getSize() |

FIG 5D

| ComponentAware | 74 |
| --- | --- |
| ...platform.framework.BaseService | |

- -int mMessageSendCount
- -int mMessageReceivedCount
- -float mMsgAvg
- -HashMap mMessageListeners
- -int mResultsHandled
- -int mResultsMissed
- -MasterNode mNode
- -ServiceType mType
- -ServiceState mState
- -Pool mServiceableHandlerPool
- -PriorityQueue mInQueue
- -PriorityQueue mOutQueue
- -MessageDispatcher mMyInDispat
- -MessageDispatcher mMyOutDispa
- -ComponentAddress mMyAddress
- -AddressableRegistry mRegistry <<constructor>>
- + BaseService(ServiceType service
- +void initService(String host, String
- +ServiceType getType()
- #void sendServiceMessage(Messa
- +void route(Message msg)
- +void updateMessageStatistics(Me
- +ComponentAddress getAddress()
- #void initHandlerPool(Vector handl
- +void startService()
- +void stopService()
- +MasterNode getNode()
- +Integer getState()
- +Integer getInQueueSize()
- +Integer getOutQueueSize()
- +Integer getMessageInCount()
- +Integer getMessageOutCount()
- +String getAverageMessageAge()
- +Integer getAvailableHandlers()
- #Queue getInQueue()
- #Queue getOutQueue()
- +void addResultListener(Messagel
- +ResultListener removeResultList
- +Integer getResultListenersCount(
- +void receivedResult()
- +Integer getResultsHandled()
- +void missedResult()
- +Integer getResultsMissed()
- +Class getComponentClass()
- -MessageToHandlerForwarder
- -MessageToRouterForwarder

FIG 7A

| interface | 76 |
| --- | --- |
| com.genient.platform.framework.HandlerContext | |

- +ServiceType getType()
- +void route(Message msg)
- +ComponentAddress getAddress()
- +Integer getState()
- +void addResultListener(MessageId replyToId, ResultListener target)
- +ResultListener removeResultListener(MessageId replyToId)
- +void registerAddressable(Addressable obj)
- +void unregisterAddressable(Addressable obj)
- +ArrayList lookupAddressables(AddressMask mask)
- +void addResultListener(MessageId replyToId, ResultListener target)
- +void addPersistentResultListener(MessageId replyToId, ResultListei

77
*AutoPoolReleasing*
*ResultListener*
*...framework.BaseServiceHandler*
-Pool mMyPool
-HandlerContext mMyParent
-CommandExecutor mMyExecutor
-Message mCurrentMessage + BaseServiceHandler(HandlerContex
+void setPool(Pool p)
+Message getCurrentMessage()
+void handleMessage(Message msg)
+void route(Message msg)
+void deliverResult(Object o)
+ComponentAddress getAddress()
+HandlerContext getParent()

-CommandExecutor

FIG 7D

80
Thread
*...services.MessageDispatcher*
-Queue mWaitQueue
-MessageRouter mTarget
-boolean mRunning + MessageDispatcher(Queue q, Me
+void start()
+void run()
+void halt()

FIG 7E

82
*...platform.services.ServiceFactory*
-ServiceFactory instance=null
-ComponentRegistry mCRegistry
ServiceFactory()
+ServiceFactory getInstance()
+HandlerContext getService(Master

FIG 7F

83
*Serializable*
*...platform.services.ServiceState*
-byte mIndex
-String mName
-byte RUNNING_INDEX=0
-byte STARTING_INDEX=1
-byte STOPPED_INDEX=2
-byte STOPPING_INDEX=3
-byte RECOVERING_INDEX=4
-byte FAILED_INDEX=5
+ServiceState RUNNING=new Ser
+ServiceState STARTING=new Ser
+ServiceState STOPPED=new Ser
+ServiceState STOPPING=new Ser
+ServiceState RECOVERING=new
+ServiceState FAILED=new Service
+String toString()
+boolean equals(Object obj)
+ServiceState fromInt(int index)
+int intValue()
-Object readResolve()

| Interface<br>Message |
|---|
| +void addMessageNVP(name:String, value:Serializable)<br>+void cancel()<br>+void commandFailed (e:RequestProcessingException)<br>+void commandSucceeded()<br>+Message copyWithNewId()<br>+AddressMask getAddressMask()<br>+long getAge()<br>+Command getCommand()<br>+GenIentID getContext()<br>+Object getHeaderValue (headername : String)<br>+Iterator getHistory()<br>+Messageid getId()<br>+Serializable getMessageNVPValue (name : String)<br>+MessageType getType()<br>+Messageid getRootId()<br>+boolean hasFinished()<br>+Map headersAsMap()<br>+boolean isMultiDelivery()<br>+boolean isValidHeaderName (name: String)<br>+void leaveProcess()<br>-void readObject (stream: ObjectInputStream)<br>+void removeMessageNVP (name: String)<br>+void setHeaderValue (headername: String, headervalue:Object |

FIG 8A

| AbstractMessage |
|---|
| -mClonedFrom : Messageid<br>-mCreateTime : long<br>-mHeaderMap : HashMap<br>-mHeaders : HashMap<br>-mHistory : ArrayList<br>-mid : Messageid<br>-mNVPs : HashMap<br>-mSource : AddressMask<br>-mState : MessageState |
| #AbstractMessage(src:Addressable, ctx:GenIentID)<br>+void addMessageNVP(name:String, value:Serializable)<br>#void appendToHistory (id: Messageid)<br>+void cancel()<br>+void commandFailed (e:RequestProcessingException)<br>#boolean commandFinished ()<br>+void commandSucceeded()<br>#void commandSuccessNotification()<br>+Message copyWithNewId()<br>+AddressMask getAddressMask()<br>+long getAge()<br>+Command getCommand()<br>#Command getCommandForState (state:MessageState)<br>+GenIentID getContext()<br>+Object getHeaderValue (headername : String)<br>+Iterator getHistory()<br>+Messageid getId()<br>+Serializable getMessageNVPValue (name : String)<br>+Messageid getRootId()<br>+AddressMask getSource()<br>#AddressMask getTargetForState(state: MessageState)<br>+boolean hasFinished()<br>+Map headersAsMap()<br>-void initHeaderMap()<br>+boolean isMultiDelivery()<br>+boolean isValidHeaderName (name: String)<br>- boolean isValidHeaderType (name: String, value: Object)<br>+void leaveProcess()<br>-void readObject (stream: ObjectInputStream)<br>+void removeMessageNVP (name: String)<br>+void setHeaderValue (headername: String, headervalue:Object<br>#void setHistory (hist: Iterator)<br>+String toString() |

FIG 8B

CommandSequence (92)

-mCommandTargetPairs : ArrayList
-mIndex : int

+CommandSequence (ctp : CommandTargetPair{})
+void cancel()
+boolean isFinished()
+CommandTargetPair nextCommandTarget()
+AddressMask peekNextAddress()
+void reset()

FIG 8H

CommandTargetPair (93)

-mCommand : Command
-mCommandClass : Class
-mTarget : AddressMask

+CommandTargetPair(cmd : Class, trg : AddressMask)
+Command getCommand()
+AddressMask getTarget()

FIG 8I

SingleCommandMessage (98)

+SingleCommandMessage (src:Addressable, target : AddressMask, cmd: Command, ctx : GenieId, internaliseResponse : boolean)
+SingleCommandMessage (src:Addressable, target : AddressMask, cmd: Command, ctx : GenieId)
-CommandTargetPair getFailureDelivery()
-CommandSequence createCommandSequence (src:Addressable, target : AddressMask, cmd: Command, ctx : GenieId, internaliseResponse : boolean)

FIG 8J

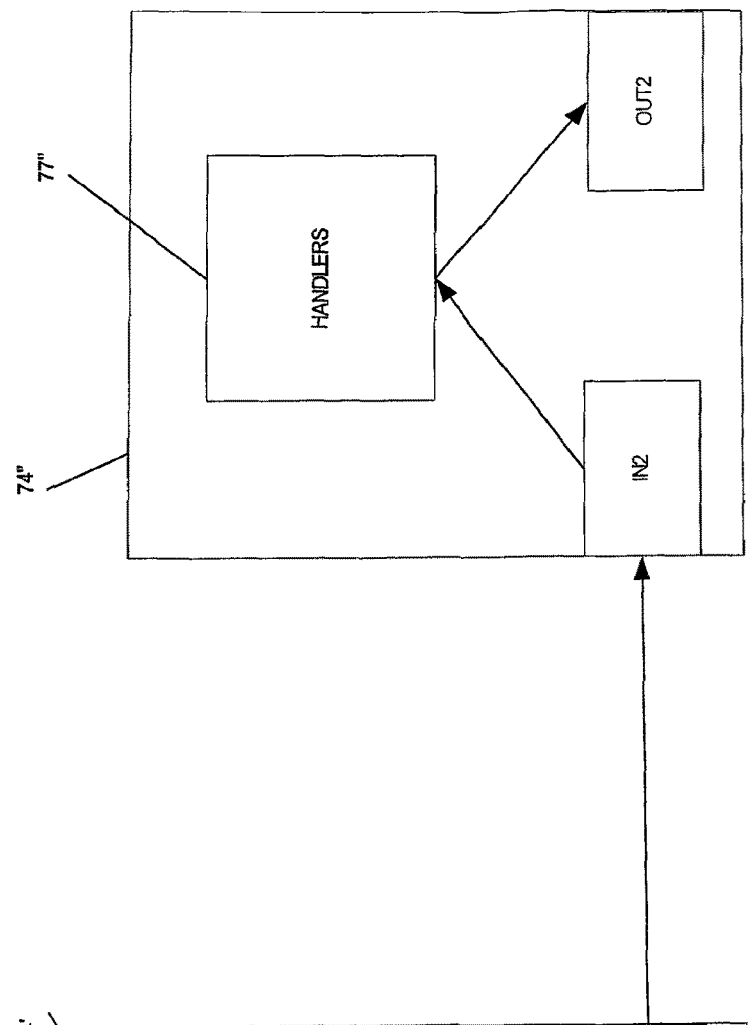
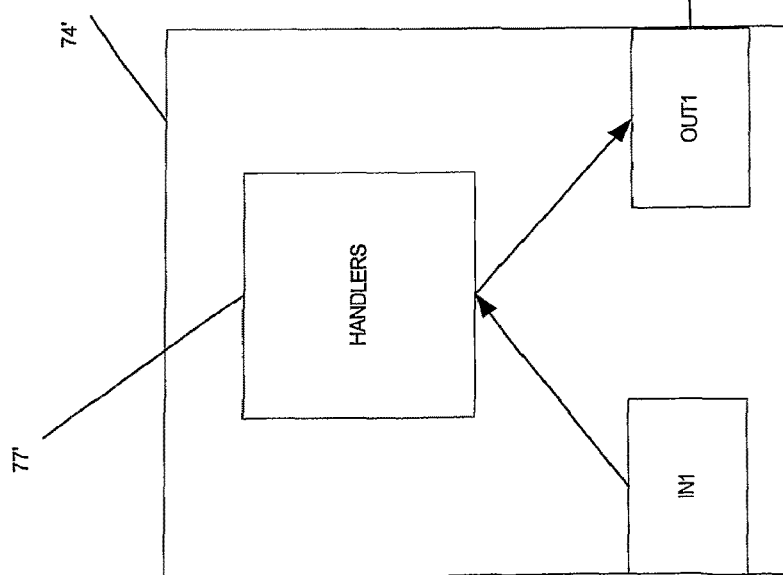
FIG 11A

| Parameter | Req. | Type | Values | Notes |
|---|---|---|---|---|
| g2jms.config | Y | Str | | File containing the jms configuration properties for the Listener<br>e.g. g2jms.config=c:\conf\jms.properties |
| g2listener | Y | Str | | This is the name of the node under the UAconfigs node in the IDM containing the listener configuration.<br>e.g. g2listener=weblistener |
| g2config.instance | Y | Str | | Node in the IDM that has an instance definition for the Composite Application. [shouldn't be necessary but is in current release<br>e.g. g2config.instance=googleweb |
| g2config.home | Y | Str | | Directory containing the IDM properties file for the Composer/Listener. This has to point to a directory containing the file rather than the file.<br>e.g. g2config.home=c:\GCP\2.3.0\conf |
| g2tracer.conf | Y | Str | | File containing the logger configuration for the Listener.<br>e.g. g2tracer.conf=c:\conf\listenerlog.conf |

FIG 16

| Parameter | Req. | Type | Values | Notes |
|---|---|---|---|---|
| G2config.home | Y | Str | | Directory containing the IDM properties file for the Composer/Listener. This has to point to a directory containing the 'IDM.properties' file rather than the file itself<br>e.g. g2config.home=c:\GCP2.3.0\conf |
| g2config.instance | Y | Str | | Node in the IDM that has an instance definition for the Composite Application.<br>e.g. g2config.instance=googleweb |
| g2config.webhost | Y | Str | | Host-name (or IP address) and port, of the Web Server used with the Listener. Used to rewrite the pages served up through the composer to point back to the listener.<br>e.g. g2config.webhost=192.168.1.229:80 |
| g2config.baseipport | Y | Str | | Specify the Admin console port<br>e.g. g2config.baseipport=8080 |
| g2jms.config | Y | Str | | File containing the jms configuration properties for the Composer<br>e.g. g2jms.config=c:\conf\jms.properties |
| g2basetracer.conf | Y | Str | | File name containing the logger configuration(s) for the Listener – It will look for a file per process so there needs to be at least a '0' and a '1' log file.<br>e.g. g2tracer.conf=c:\conf\composerlog.conf |

FIG 17

| Name | Req. | Type | Values | Notes |
|---|---|---|---|---|
| APPLICATION_CLASS | Y | Str | | Destination service for the incominguserrequest message that will be generated. This is the application class name used for the composite application. |
| UXM_MODIFIED | Y | Str | true/false | Set to true if the request is to be processed by the Composer. If false, then the UXM will not process the request and pass it on to the AA (pass through applications) |
| UXM_TREEID | Y | Str | | The 'id' (from the control data-group) of the TreeRootNode targeted by this request. |
| UXM_NODEID | Y | Str | | The 'id' (from the control data-group) of the TreeNode (within the hierarchy defined by UXM_TREEID) targeted by this request. |

FIG 18

```
hm.g2config.baseipport=9080
hm.rmiport=1299
hm.g2config.webhost=10.230.226.162
hm.g2config.instance=MyInstance
hm.g2jms.config=/usr/genient/composer/conf/jms.properties
hm.g2tracer.conf=/usr/genient/composer/conf/composer-log.properties
pa.x.Xms512m
pa.x.Xmx512m
pa.x.XX\:NewSize=64m
pa.x.XX\:MaxNewSize=64m
pa.x.XX\:+DisableExplicitGC
pa.x.g2config.webhost=10.230.226.162
pa.x.g2config.home=/usr/genient/composer/conf
pa.x.g2config.instance=MyInstance
pa.x.g2jms.config=/usr/genient/composer/conf/jms.properties
pa.x.g2tracer.conf=/usr/genient/composer/conf/composer-log.properties
pa.x.javax.net.ssl.trustStore=/usr/genient/j2re1_3_1_08/lib/security/g2cert
pa.x.javax.net.ssl.keyStoreType=pkcs12
pa.x.javax.net.ssl.keyStorePassword=thglrwtfos
pa.x.javax.net.ssl.keyStore=/usr/genient/j2re1_3_1_08/lib/security/xF8FF_2_XEG000004.p12
pa.x.java.protocol.handler.pkgs=HTTPClient
```

FIG 19

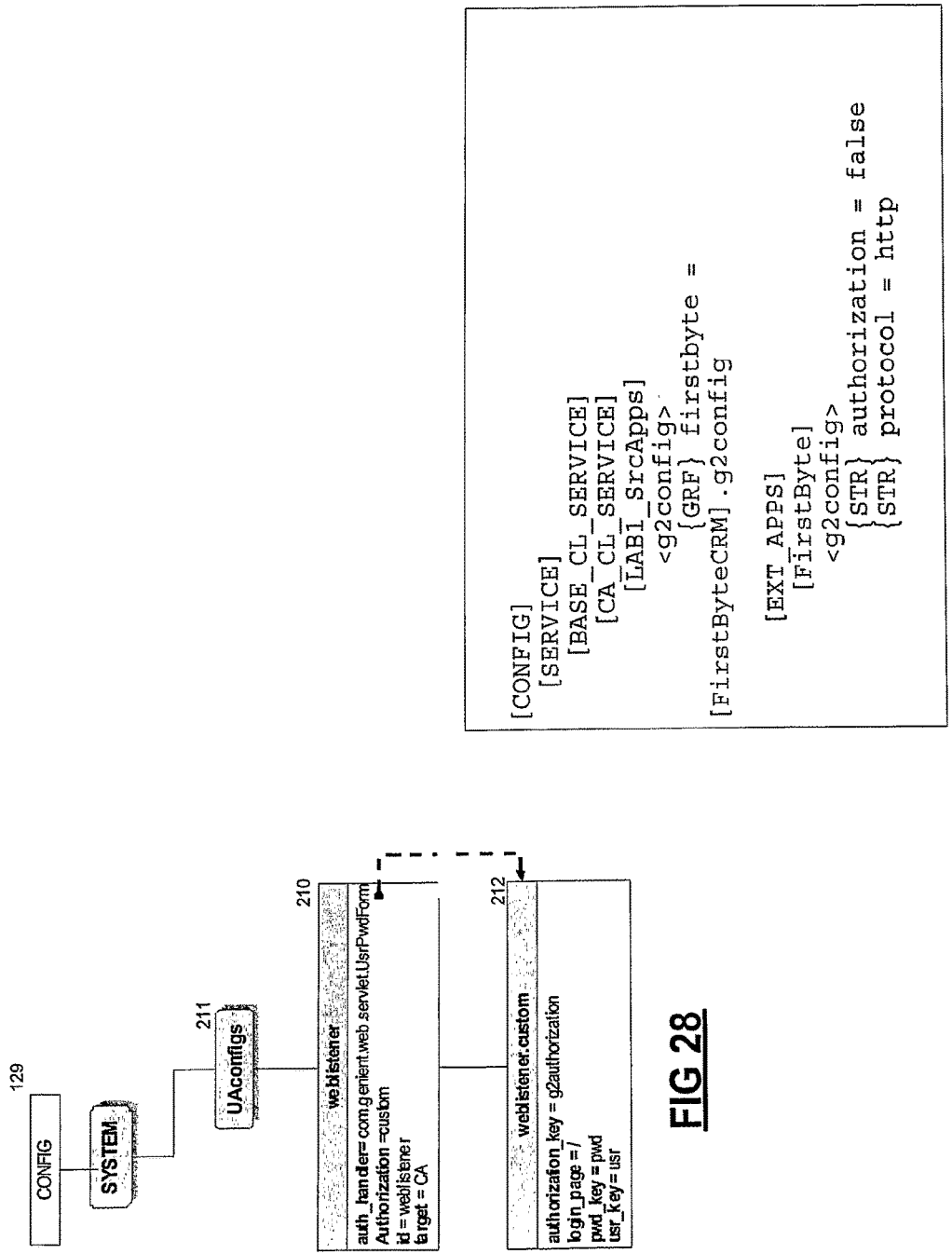

```
<html>
<form action="/G2/G2" method="POST">
<input type="hidden" name="APPLICATION_CLASS" value="Lab1App">
<input type="hidden" name="UXM_MODIFIED" value="true">
<input type="hidden" name="UXM_TREEID" value="Lab1App">
<input type="hidden" name="UXM_NODEID" value="CustPg">
.....
</html>
```

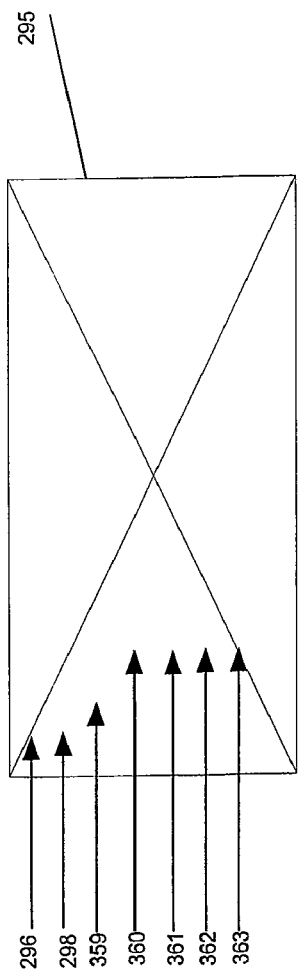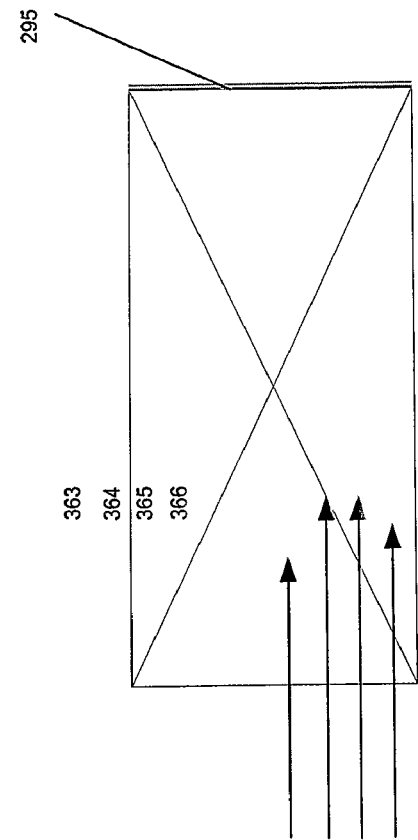

METHOD AND APPARATUS FOR COMPOSITE USER INTERFACE CREATION

The present invention relates to methods and systems for modelling and creating composite user interfaces, and to methods for monitoring and affecting the use of such composite user interfaces Computer users routinely need to use a plurality of different applications in order to complete tasks allocated to them, and each application typically has a separate user interface. Switching between the different user interfaces of the different applications in order to complete a given task considerably degrades user efficiency. It will often be the case that different applications are supplied by different vendors and accordingly their user interfaces have a different "look and feel", further degrading operator efficiency.

For example, in order to process customer enquiries, operators in a call centre may need to access a customer management application to access customer details, a billing application to access customer account information, and a payment application to process any payment which may be made by the customer over the telephone; for example by credit card. Working in this manner is inefficient, given that the operator is required to switch between applications in order to complete some tasks. Furthermore, a customer will typically remain on the telephone while the operator uses these different applications, and it is therefore advantageous to speed up the processing of enquires, in order to offer a higher quality customer service.

Various proposals have been made to enhance user efficiency when multiple applications need to be used.

The multiple applications can be combined into a single product or product suite. While such a proposal provides great increases in user efficiency, it is difficult and expensive to implement. Furthermore, such a combined product or product suite will typically have a different user interface from those used previously, therefore meaning that users need to be trained in use of the combined product, further increasing cost.

It has alternatively been proposed that the multiple application can be combined in some way. For example, all requests can be passed to a single one of the applications, and this application can be adapted to forward requests to an appropriate source application. Such a solution typically requires considerable customisation if it is to work in under all circumstances that may routinely arise, making such a solution difficult to implement.

It is an object of the present invention to obviate or mitigate at least some of the problems outlined above.

According to one aspect of the present invention, there is provided a method and apparatus for generating model data representing a model of a composite user interface. The composite user interface comprises a plurality of user interface elements provided by at least one source application. The method comprises modelling at least part of a user interface provided by the or each source application and modelling relationships between the at least part of the user interfaces provided by the or each source application and the composite user interface.

A model of a user interface created in this way can be used in isolation to analyse the composite user interface, or can be processed to create a composite user interface which can be used for communication with the at least one source application.

The model can be created in a wide variety of different ways, however in some embodiments of the invention the source application is modelled by defining a plurality of source flow items each comprising a specified source user interface page provided by the at least one source application, and relationships are defined between these source flow items. A source interface page can be a HTML document. Modelling a source application in this way is advantageous, given that each source flow item need only model a single source user interface page, and can additionally comprise a plurality of other anonymous user interface pages which are not explicitly modelled, but instead are handled by an appropriate source application. A first source flow item can be used to represent an entire source application. Further source flow items can then represent only parts of the source application of interest in further detail. Thus, the invention allows modelling to be carried out such that detailed modelling is carried out only of parts of a source application which are of relevance to modelling of a composite application.

It should be noted that embodiments the invention can allow manipulations to be carried out to anonymous user interface pages. For example, a source flow item may include a single identified source interface page, and a plurality of anonymous user interface pages. All pages (identified and anonymous) can then, for example, be fitted into a common template HTML page, or have a logout button added at a predetermined location. Thus, composite applications can be modelled and created including anonymous source pages, which are manipulated in a predetermined manner, without knowledge of the content or format of the anonymous source pages. This can greatly reduce the number of source interface pages which need to be modelled.

When modelling source flow items comprising a source interface page, the model can contain data indicating one ore more recognition rules for a source interface page. Such rules can be specified using a regular expression, using path data such as XPath, or any other suitable means. For example if a source page is a HTML document, path data may specify a series of HTML tags which should be used to identify the source interface page.

The composite user interface may comprise at least one composite page which is made up of a combination of source interface elements provided by one or more source applications. The model may specify manipulations to be applied to these source interface elements, and an ordered sequence of manipulations may be defined which can be used to create the composite page.

There is preferably provided a graphical user interface (GUI) to allow specification and editing of model data. Model data is preferably represented in an object oriented manner by creating objects which are instances of appropriate classes defined in an object oriented programming language such as Java or C++.

Models created as described above, can be processed to create configuration data. For example a hierarchical data structure comprising a plurality of entities can be created, and such a hierarchical data structure can be used to represent the composite application. The hierarchical data structure can be created using a plurality of writers, each writer being associated with a particular entity within said hierarchical data structure. Each writer is preferably represented by a writer object which is an instance of a corresponding writer class defined in an object oriented programming language such as Java or C++. Writer objects are registered with a writer lookup mechanism. When a model or part of a model is to be written to said hierarchical data structure, a process referred to as publishing, the appropriate part of the model is provided to the look up mechanism, which then determines one or more writers to be invoked to write appropriate data to the appropriate entities within the hierarchical data structure. A location within the hierarchical data structure to which data should be written can be determined by invoking a writer which is configured to create and/or locate an appropriate entity within the hierarchical data structure. In some cases, a writer may determine that in order to publish the specified part of a model that other parts of the model must also be published, and cause suitable publishing to occur.

According to another aspect, the invention provides a method and apparatus for providing a composite user interface comprising a plurality of user interface elements provided by at least one source application. The method comprises monitoring operation of the composite user interface to obtain management data.

Thus, the invention allows managers to monitor usage to obtain various management data which can be used, for example to modify the composite user interface. For example, if it is determined that response times are relatively slow given relatively high levels of demand, the modifying may delete some non-essential user interface elements from said composite user interface so as to provide the essential information in a more acceptable timeframe.

According to a further aspect, the invention provides a method and system for generating a composite user interface comprising a plurality of user interface elements provided by at least one source application. The method comprises selecting said composite user interface from a plurality of predefined composite user interfaces on the basis of at least one predefined parameter.

Thus, the invention allows a plurality of user interfaces to be created and stored, each of which can be used to carry out the same function. The user interface used can be selected using any of a wide range of predefined parameters. For example, it may be determined that users require slightly different information depending on the current date or time, and in such cases method and system may automatically select the most appropriate interface using time and/or date information.

In other embodiments, a first user interface may provide a relatively large quantity of information, while a second provides a smaller quantity of information. The first user interface can then be used when system usage is relatively low, and the second user interface can be used when system usage is relatively high.

In some embodiments, the user interface elements within each composite user interface are considered to be mandatory or non-mandatory, and the composite user interface is produced when all mandatory user interface elements have been received from appropriate source applications. The plurality of predefined composite user interfaces may comprise the same user interface elements, but with different mandatory user interface elements. Thus, a composite user interface having a large quantity of mandatory data can be used under low usage conditions, and a composite user interface having a smaller quantity of mandatory data can be used under high usage conditions.

Embodiments of the present invention will now be described, by way of example, with reference to the accompanying drawings, in which:

FIGS. 4A to 4V are UML class diagrams showing the classes of FIG. 4 in further detail;

FIGS. 5A to 5J are UML class diagrams showing the classes of FIG. 5 in further detail;

FIGS. 7A to 7F are UML class diagrams showing the classes of FIG. 7 in further detail;

FIGS. 8A to 8J are UML class diagrams showing the classes of FIG. 8 in further detail;

FIG. 11A is a schematic overview of a messaging process in accordance with the present invention;

FIG. 16 is a table showing invocation parameters used by the web server of FIG. 2;

FIG. 17 is a table showing invocation paramaters used by the server of FIG. 2;

FIG. 18 is a table showing Hypertext Markup Language (HTML) tags which may be used in embodiments of the present invention;

FIG. 19 is an extract from a configuration file, illustrating how various parameters can be initalised;

FIG. 28 is a tree diagram showing configuration data for the web server illustrated in FIG. 14;

FIG. 29 shows configuration data for the IDM illustrated in FIG. 14;

FIGS. 47 and 48 are screenshots showing the dialog box of FIG. 38 in further detail;

Figure 1:
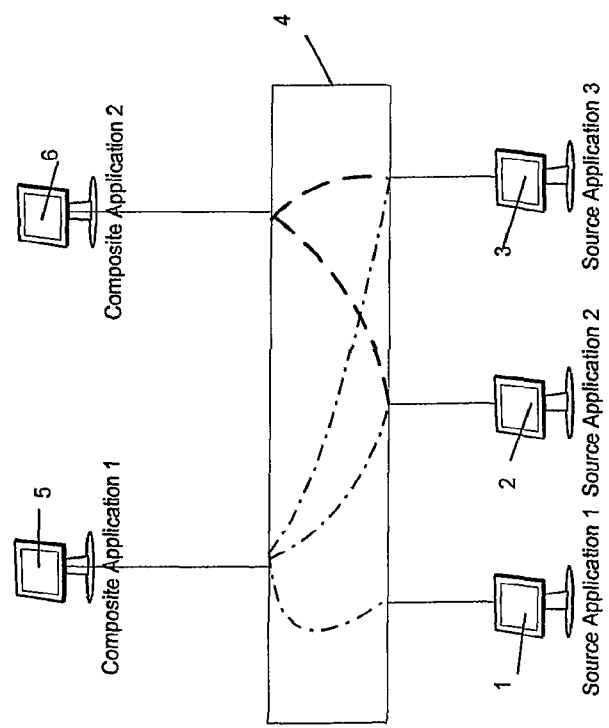
FIG. 1 is a schematic overview of a system for composite application creation in accordance with the present invention.

FIG. 1 illustrates a system for creating composite applications in accordance with an embodiment of the present invention. A first source application provides a first user interface 1, a second source application provides a second user interface 2, and a third source application provides a third user interface 3. A composition system 4 composes the first, second and third user interfaces to form a first composite user interface 5 and a second composite user interface 6. It can be seen that the first composite user interface 5 is created from the composition of the first, second and third user interfaces 1, 2, 3, while the second composite user interface 6 is created from the composition of the second and third user interfaces 2, 3.

The composition system 4 processes requests from users of the composite user interfaces 5, 6 and generates requests to the appropriate source applications. The composition system 4 additionally receives information from the first, second and third applications in response to such requests, and uses this information to generate the composite user interfaces 5, 6.

For example, the composite user interfaces 75 may comprise a number of pages each containing elements from one or more of the first, second and third user interfaces 1, 2, 3. That is a first page of the user interface may be made up solely from the first user interface 1, and a second page may be up from the combination of part of the second user interface 2 and part of the third user interface 3, and a third page may comprise part of the second user interface 2, rearranged by the composer to provided a "look and feel" which is similar to that of the first and second pages.

Figure 2:
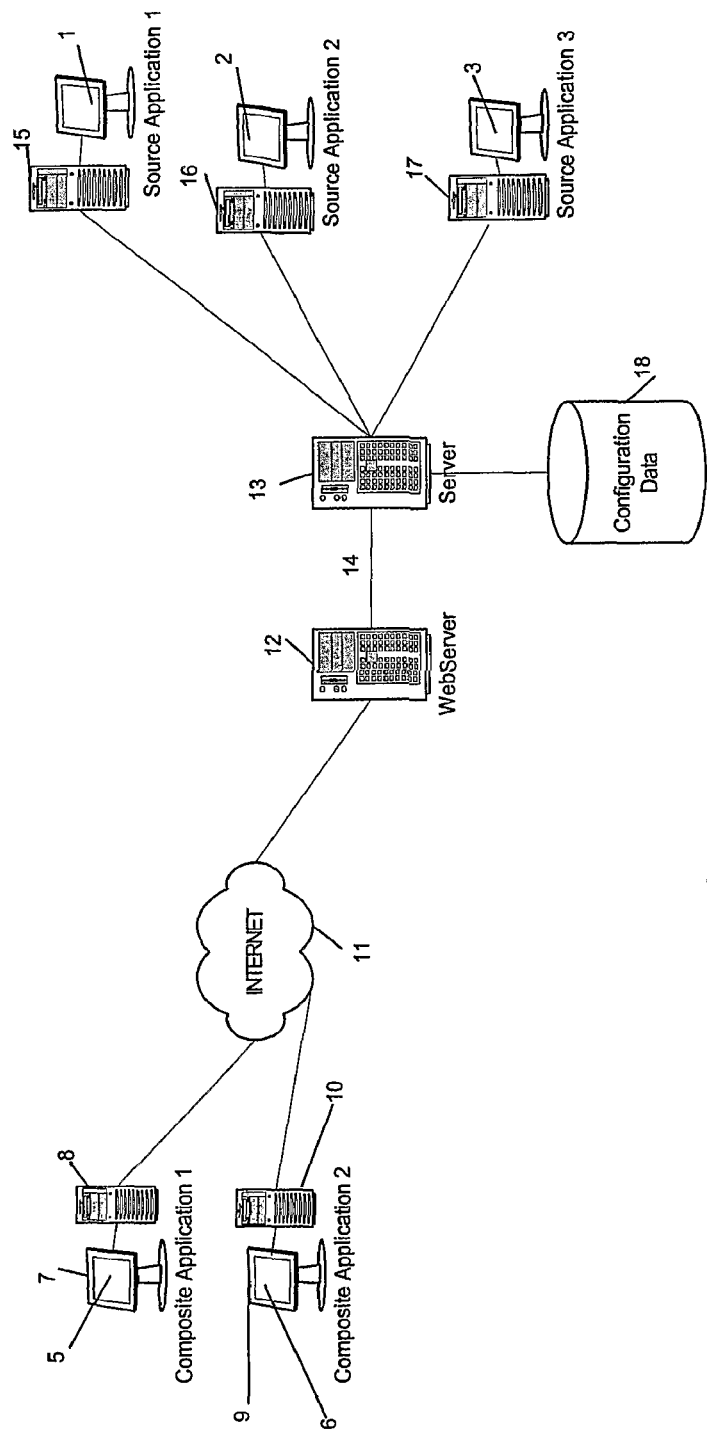
FIG. 2 is a schematic illustration showing the system of FIG. 1 in further detail.

FIG. 2 illustrates the system of FIG. 1 in further detail. The composite user interface 5 is displayed to a user by means of a display device 7 connected to a PC 8. Similarly, the composite user interface 6 is displayed to a user by means of a display device 9 connected to a PC 10. The PCs 8, 10 have means for connection to the Internet 11. The PCs 8, 10 can be connected to the Internet 11 via a local area network connection, or alternatively via a modem (not shown).

A Web server 12 is also connected to the Internet 11, and stores a plurality of webpages in HTML (Hypertext Markup Language) format which can be accessed by the PCs 8, 10. The Web server is connected to a server 13. This connection can either be a direct connection 14 (as shown in FIG. 2), or alternatively a connection across a network such as the Internet. The server 13 is in turn connected to three servers 15, 16, 17 which respectively execute the first second and third applications to provide the first second and third user interfaces 1, 2 3. The server 13 is also connected to a database 18 which stores configuration data.

In operation, the web server 12 provides HTML documents which form the composite user interfaces 5, 6. The composite user interfaces 5, 6 are created by processes running on the server 13, which create the composite user interfaces from information provided by the servers 15, 16, 17, in accordance with configuration data stored in the database 18 as described below. Data input by users of the composite interfaces 5, 6 is received by the web server 12 and forwarded to the server 13 via the connection 14. The server 13 processes such data in a predefined manner, and forwards data to the servers 15, 16, 17 as appropriate.

It will be appreciated that in some embodiments of the present invention, instead of connection over the Internet 11, the appropriate connections can be realised through an organisation's Intranet.

Operation of the Web server 12 and the server 13 in creating and modifying the composite user interfaces 5, 6 is described below.

Figure 3:
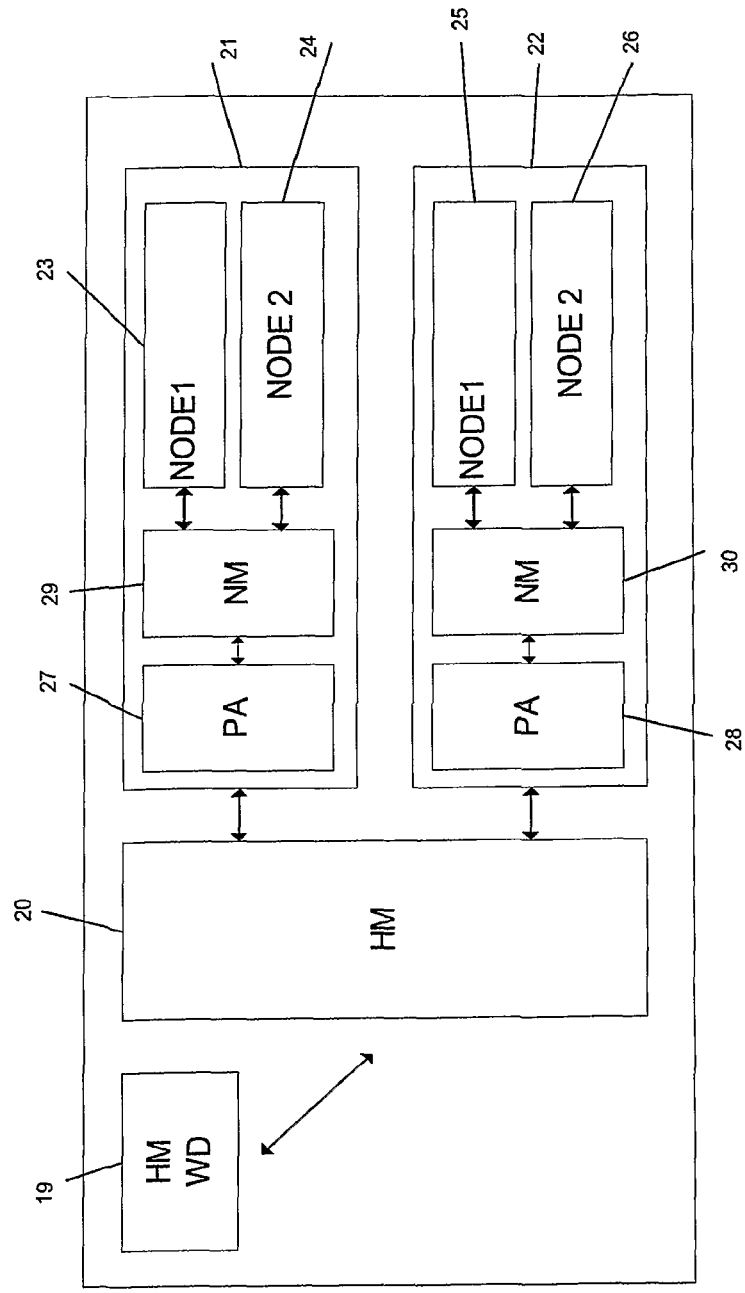
FIG. 3 is a schematic illustration of process management within the server of FIG. 2.

The server 13 operates using a flexible process framework. FIG. 3 illustrates components used within this flexible process framework.

A HostMasterWatchdog component 19 checks if a HostMaster process 20 is already running, and if not causes a HostMaster process to be started. The HostMaster process 20 is responsible for creating and removing processes. The HostMaster process 20 ensures that all created processes are up and running and also passes relevant configuration information to such processes. Any host operating in accordance with the process framework described herein runs a single instance of the HostMasterWatchdog component 19 and the HostMaster process 20.

In the illustration of FIG. 3, a server runs a first process 21 and a second process 22. The first process comprises two nodes 23, 24 and the second process comprises two nodes 25, 26. Nodes are containers for user services, and are described in further detail below. Each of the processes 21, 22 includes a respective process agent 27, 28 which is responsible for starting nodes within the respective process, and restarting nodes within the process in case of failure. Operation of nodes within the processes 22, 23 is managed by respective node manager components 29, 30.

In preferred embodiments of the present invention all entities in the framework illustrated in FIG. 3 except the HostMasterWatchdog 19 are implemented as instances of Java™ classes, thereby providing and object oriented implementation. Details of such an implementation are described below. In the following description, programming language constructs such as classes, objects, interfaces and methods, are given their usual meaning within the Java programming language.

The HostMasterWatchdog process 19 regularly checks the state of the HostMaster process 20. If the HostMasterWatchdog process 19 finds a HostMaster process 20 in an invalid state, or fails to find a HostMaster process, it attempts to shutdown any existing HostMaster process 19 and starts a new HostMaster process. If this is initially unsuccessful, repeated retries are attempted until a user manually exits the HostMasterWatchdog 19. The HostMasterWatchdog process 19 is typically written in a conventional high level programming language such as C, and a HostMasterWatchdog implementation will therefore need to be written for each different platform on which the framework is to operate. However, in preferred embodiments of the invention, the other components are all implemented as instances of Java classes, providing portability between platforms.

Figure 4:
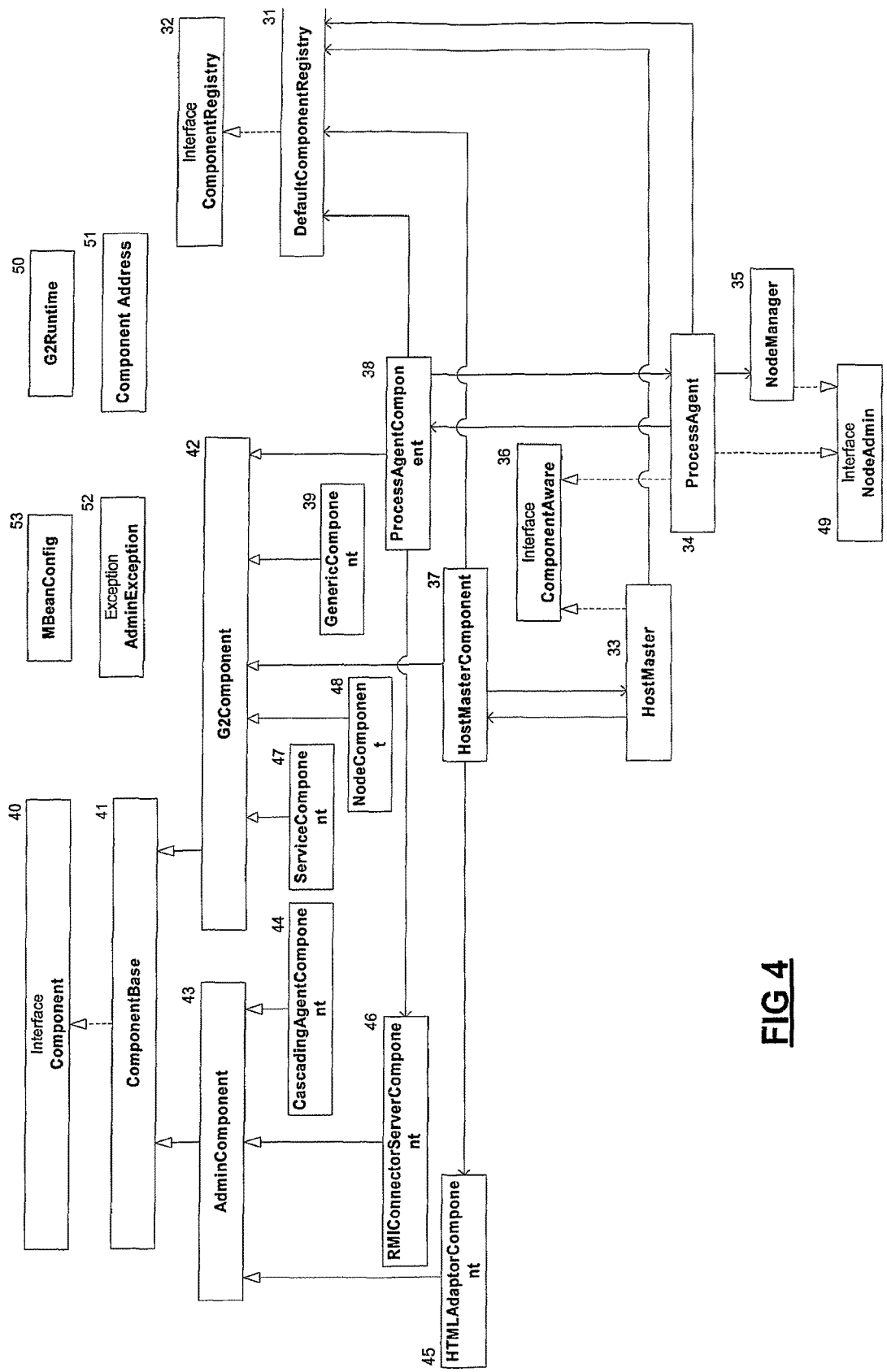
FIG. 4 is a schematic overview of Java classes used to implement some parts of the architecture of FIG. 3.

FIG. 4 illustrates the classes used to implement other entities illustrated in FIG. 3. Individual classes are illustrated in further detail in FIGS. 4A to 4V.

In addition to the entities illustrated in FIG. 3, each of the processes 21, 22 maintains a component registry by creating and maintaining an instance of a DefaultComponentRegistry class 31 (FIG. 4A), which implements a ComponentRegistry interface 32 (FIG. 4B). This registry allows objects to be added to the registry using a registerObject(Object C) method specified in the ComponentRegistry interface 32. Objects added to the registry can be monitored and administered using methods provided by the DefaultComponentRegistry class 31, and therefore such components can receive notifications of state changes in other components in the registry.

Each of the entities illustrated in FIG. 3 is represented by a corresponding class shown in FIG. 4. The HostMaster process is represented by an instance of a HostMaster class 33 (FIG. 4C). The ProcessAgent process is represented by an instance of a ProcessAgent class 34 (FIG. 4D), which in turn references an instance of a NodeManager class 35 (FIG. 4E) by means of a private variable mNodeManager within the ProcessAgent class 34. The NodeManager class 35 contains details of individual nodes. Classes used to represent such nodes will be described in further detail below.

Appropriate instances of the HostMaster 33 and ProcessAgent 34 classes set out above are registered with an instance of the DefaultComponentRegistry class 31. It can be seen that both HostMaster class 33 and ProcessAgent class 34 implement a ComponentAware interface 36 (FIG. 4F). This specifies a single method getComponentClass( ) which all implementing classes must provide. Each class defines this method so as to locate an appropriate corresponding component class. In the case of the HostMaster class 33, a HostMasterComponent class 37 (FIG. 4G) is located by the getComponentClass( ) method. In the case of the ProcessAgent class 34, the getComponentClasss( ) method locates the ProcessAgentComponent class 38 (FIG. 4H).

The component classes provide a convenient manner for encapsulating administrative information separately from functionality. When an object implementing the ComponentAware interface 36 is registered with the instance of the DefaultComponentRegistry class 31, the getCompoentClass( ) method is used to locate the appropriate component class, and this component class is then instantiated and registered with the instance of DefaultComponentRegistry. These component classes in turn links with the respective object which is being registered.

It should be noted that all entities to be registered with the DefaultCompoentRegistry will not necessarily implement the ComponentAware interface 36. If the DefaultComponentRegistry object determines that an object being registered does not implement this interface, an instance of a GenericComponent class 39 (FIG. 4I) is used to register the object with the DefaultComponetRegistry object. This class simply allows the object being registered to be located, but provides no administrative functions.

FIG. 4 illustrates the hierarchy of classes used to represent components. The highest level of the hierarchy comprises a Component interface 40 (FIG. 4J) which is implemented by a ComponentBase class 41 (FIG. 4K). The ComponentBase class 41 has two subclasses, a G2 Component class 42 (FIG. 4L) and a AdminComponent class 43 (FIG. 4M). The AdminComponent class 43 acts as a superclass for three classes which are used to implement administrative functions. A CascadingAgentComponent class 44 (FIG. 4N) is used for communication between an instance of the HostMaster class 33 and an instance of the ProcessAgent class 34. An HTMLAdaptorComponent class 45 (FIG. 4O) is used by the HostMasterComponent 37. An RMIConnectorServerComponent 46 (FIG. 4P) is used by the ProcessAgentComponent 38 for communication via Remote Method Invocation (RMI) as provided by the Java programming language. The G2Component class 42 acts as a superclass for components described above. Specifically, the GenericComponent class 39, the ProcessAgentComponent class 38 and the HostMasterComponent class 37 are all subclasses of the G2Component class 42. Additionally, the G2Component class 42 is a superclass for a ServiceComponent class 47 (FIG. 4Q), and a NodeComponent class 48 (FIG. 4R).

It has been mentioned above that an instance of the NodeManager class 35 is referenced by a private variable in instances the ProcessAgent class 34. Both the ProcessAgent class 34 and the NodeManager class 35 both implement a NodeAdmin interface 49 (FIG. 4S).

A number of other classes are also illustrated in FIG. 4. A G2 Runtime class 50 (FIG. 4T) is used as a master class for the runtime of all classes illustrated in FIG. 4. A ComponentAddress class 51 (FIG. 4U) is used to address the components of the architecture of FIG. 3. An exception AdminException 52 is used for exeptions thrown by subclasses of the AdminComponent class 43.

An MBeanConfig class 53 (FIG. 4V) is used to represent configuration information of an MBean™. The components implemented as subclasses of the ComponentBase class 41 all inherit a private variable of type Object which represents an MBean used to implement that component. The Mbean-Config class 53 represents the configuration of such MBean objects.

As described above, the HostMaster process 20 (FIG. 3) is represented by a HostMaster object, and registered using a HostMasterComponent object. The HostMasterComponent allows the HostMaster to be notified of ProcessAgent creation and removal. This is described in further detail below.

The ProcessAgent processes 27, 28 (FIG. 3) are represented by respective ProcessAgent objects which allow administration of nodes within that process, via appropriate NodeManager object(s).

Figure 5:
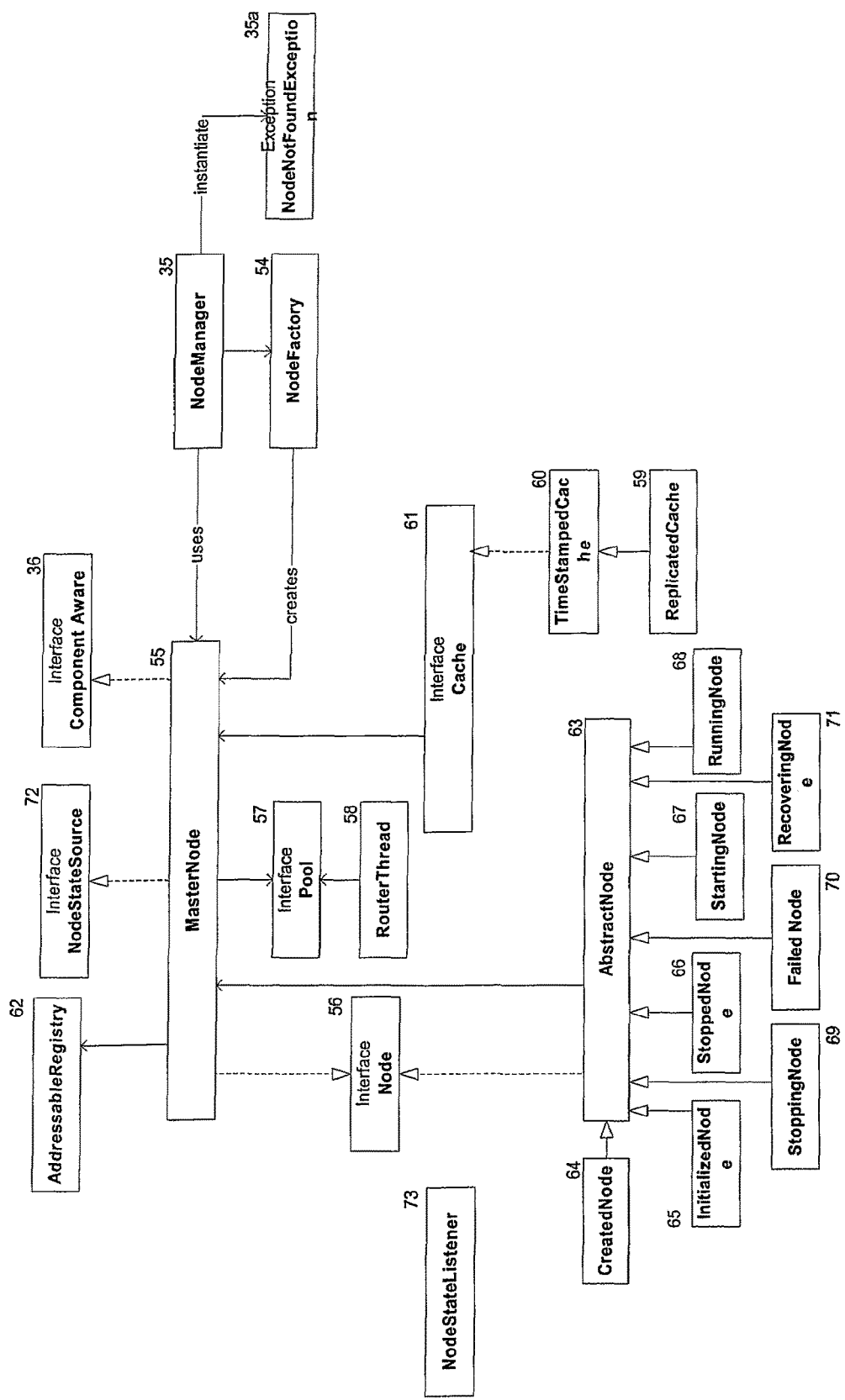
FIG. 5 is a schematic overview of Java classes used to implement the nodes illustrated in FIG. 3.
Figure 5E:
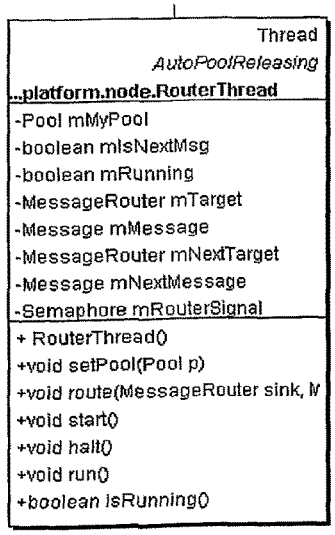
Figure 5F:
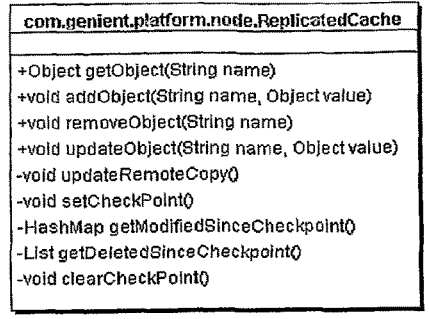

As shown in FIG. 3, processes contain nodes, which are managed by a NodeManager object. Nodes in turn comprise one or more services. A node is responsible for its contained services, and does not directly deliver any user functionality. Each node is represented by a suitable object, and FIG. 5 shows an overview of appropriate classes. The individual classes are shown in Further detail in FIGS. 5A to 5J.

The NodeManager class 35 instantiates and uses an instance of a NodeFactory class 54 (FIG. 5A) which creates instances of a MasterNode class 55 (FIG. 5B), and these instances are used to represent the nodes 23, 24, 25, 26 (FIG. 3). It should be noted that the MasterNode class 55 implements a Node interface 56 (FIG. 5C) which specifies methods required to implement basic functionality. The NodeManager class instantiates instances of a NodeNotFoundException 35a, when it is requested to act upon a MasterNode object of which it is not aware.

Each MasterNode object has associated with it one or more router threads which are used to route messages within the node. These threads are represented by a private variable mRouterThreadPool in the MasterNode class 55, which is an instance of a class (not shown) implementing a Pool interface 57 (FIG. 5D). The class implementing the Pool interface contains objects represented by instances of a RouterThread class 58 (FIG. 5E), which represent the router threads.

Figure 5H:
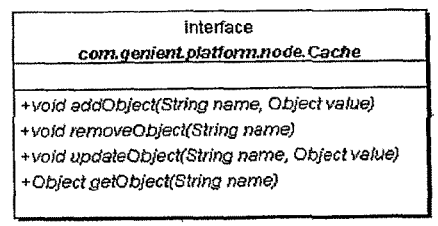
Figure 5G:
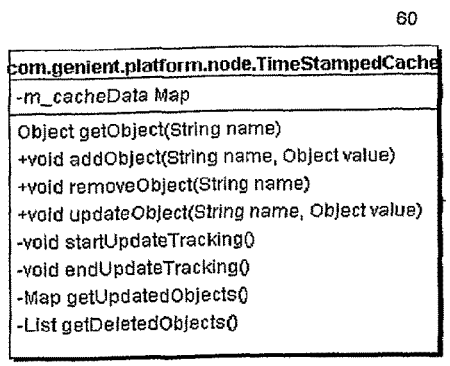
Figure 5I:
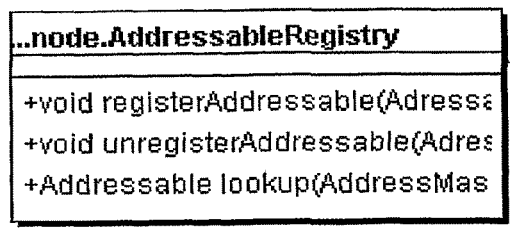
Figure 5J:
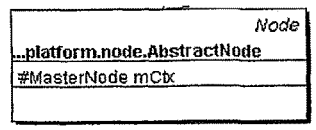

Each node has associated with it a cache represented by an instance of a ReplicatedCache class 59 (FIG. 5F) which is a subclass of a TimeStampedCache class 60 (FIG. 5G), which in turn implements a Cache interface 61 (FIG. 5H). The purpose of the ReplicatedCache object is to store state information related to each service contained in that node, and this information can be used to restart services in the event of a system crash. Furthermore, the cache is replicated between multiple nodes, such that if one node crashes, the node and its associated services can be restarted using cache data from the node containing the copy of the cache data. The ReplicatedCache class 59 provides methods to ensure synchronisation of data in the copy cache.

Each node also comprises an addressable registry, represented by an instance of the ComponentRegistry class 62 (FIG. 5I) This class allows services within a node to be registered with the node, and also provides look up functions which can be used to locate services present within the node.

A node represented by a MasterNode object can have one of eight possible states, each of which is represented by a corresponding class. The private variable mState indicates an object indicating this state information. Each of the eight classes which may be stored in the mState variable implements the Node interface 56 which specifies methods relevant to transitions between states.

The state information is infact represented by instances of classes which are subclasses of an AbstractNode class 63 (FIG. 5J) which itself implements the node interface 56.

A class CreatedNode 64 represents a node which has been created but not yet initialised. A class InitializedNode 65 is used to represent a node following initialisation. A class StoppedNode 66 represents an initialised node which is not currently running. When a node is starting, its state is represented by a class StartingNode 67. A class RunningNode 68 represents a node which has been started and is running. A node which is about to stop running is represented by a StoppingNode class 69. Classes FailedNode 70 and RecoveringNode 71 are used to represent node failure. Each of these classes specifies a constructor method taking as its sole parameter the MasterObject to which it belongs, and the also provides five methods specified in the Node interface 56—init( ), start( ), stop( ), destroy( ), recover( ). Each class representing state therefore provides a number of methods to allow state change. For each state, only a single method will not throw an InvalidStateException when called.

Figure 6:
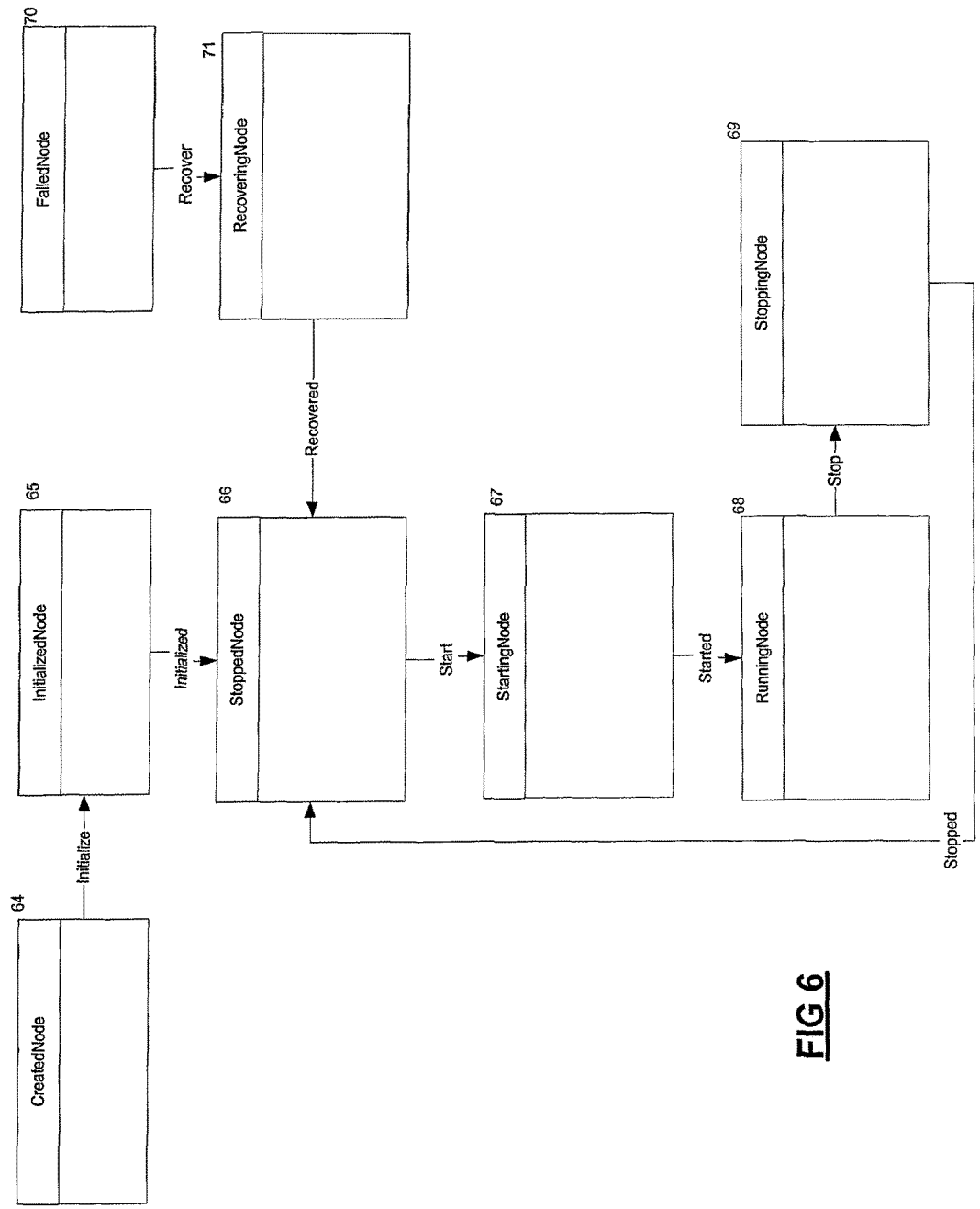
FIG. 6 is a state transition diagram showing transitions between classes of FIG. 5 used to represent state information related to nodes.

Transitions between the states represented by the objects set out above are now described with reference to FIG. 6. Upon construction of a MasterNode object by instantiation of the MasterNode 55 by the NodeFactory 54, the mState variable points to an instance of the CreatedNode class 64.

Calling the init( ) method provided in the CreatedNode class creates an instance of InitializedNode 65, which is referenced by the MasterNode to represent state. When initialisation is complete an instance of the StoppedNode class 66 is created by the InitializedNode instanvce. Calling the start( ) method provided by the StoppedNode class 66 causes an instance of the StartingNode class 67 to be created which is then referenced by the MasterNode to represent state. The StartingNode class then creates an instance of the RunningNode class 68. The only method which provided by the RunningNode class 68 which does not throw the InvalidStateException is the stop( ) method. When this is called an instance of the StoppingNode class 69 is created, and subsequently a further instance of the StoppedNode class 66 is created to represent state.

If processing causes an uncaught exception to be thrown, an instance of the FailedNode class 70 is created. The only method which can then be vailidly used is recover( ) which creates an instance of the class RecoveringNode 71, before creating an instance of the class StoppedNode 66.

Referring back to FIG. 5, it can be seen that the MasterNode class 55 implements a NodeStateSource interface 72 which allows instances of a NodeStateListener class 73 to be registered as listeners with MasterNode objects.

Figure 7:
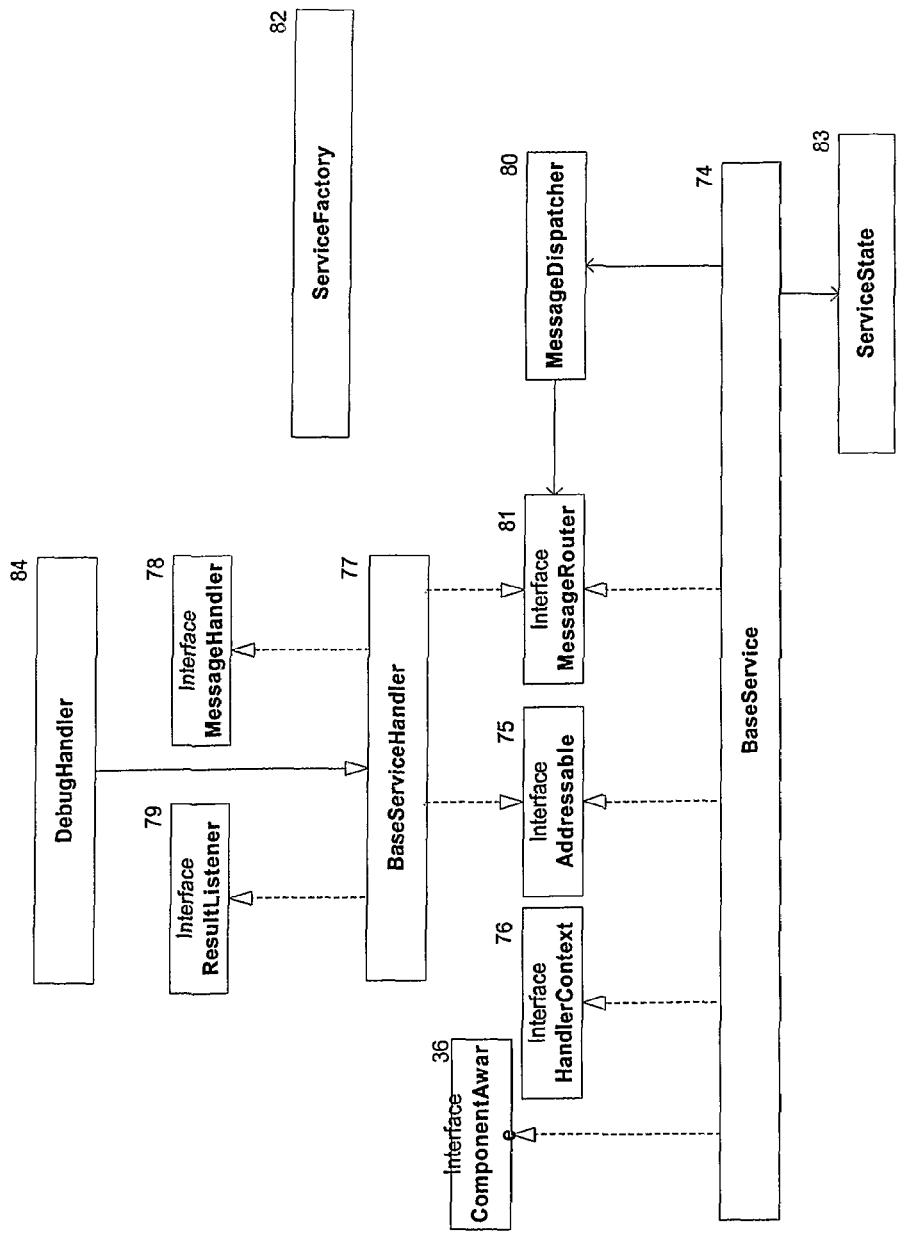
FIG. 7 is a schematic overview of Java classes used to implement the services illustrated in FIG. 3.

The preceding description has been concerned with the implementation of Nodes. It has been described that nodes contain services, and appropriate services are now described. Services are managed by a node, and receive and process messages which are sent to them. The class hierarchy used to implement services is now described with reference to FIG. 7. Further details of the classes shown in FIG. 7 are shown in FIGS. 7A to 7F.

Each service is implemented as an object which is an instance of a BaseService class 74 (FIG. 7A), or as an instance of a subclass thereof. The BaseService class 74 implements an Addressable interface 75, which specifies a single getAddress method. In the case of the BaseService class 74, it can be seen that a service's address is stored as a private variable of type ComponentAddress (shown in FIG. 4)

The BaseService class 74 additionally implements a HandlerContext interface 76 (FIG. 7B) which specifies features which allow service handlers represented by instances of the BaseServiceHandler class 77 (FIG. 7C) to be provided within a service to provide functionality. Handlers receive messages addressed to a service, and act upon those messages. Thus, handlers provide the functionality of a service. Each service will have a predetermined handler class which provides handlers, and this class will be a subclass of the BaseServiceHandler class 77. Each service may have a plurality of instances of the handler class, thus allowing a service to process messages from a plurality of users concurrently.

It can be seen that the BaseServiceHandler class 77 implements a MessageHandler interface 78 which allows handling of messages in a unified manner by specifying a single handleMessage( ) method. The BaseServiceHandler class 77 also implements a ResultListener interface 79 which specifies a single method deliverResult.

Instances of the BaseService class 74 use instances of a MessageDispatcher class 80 (FIG. 7D) to dispatch messages within and between services. Both the BaseService class 74 and the BaseServiceHandler class 77 implement a MessageRouter interface 81, which allows routing of messages between services using a route( ) method. This interface is used by the MessageDispatcher class 80. Routing of messages using these classes is described in further detail below.

It can be seen that FIG. 7 additionally illustrates a ServiceFactory class 82 (FIG. 7E) which is used to create services, and a Service State class 83 (FIG. 7F) which is used to denote the state of an instance of the BaseService class 74 or one of its subclasses. FIG. 7 also illustrates a DebugHandler class 84, which is a service handler used for debugging purposes during development.

Figure 8:
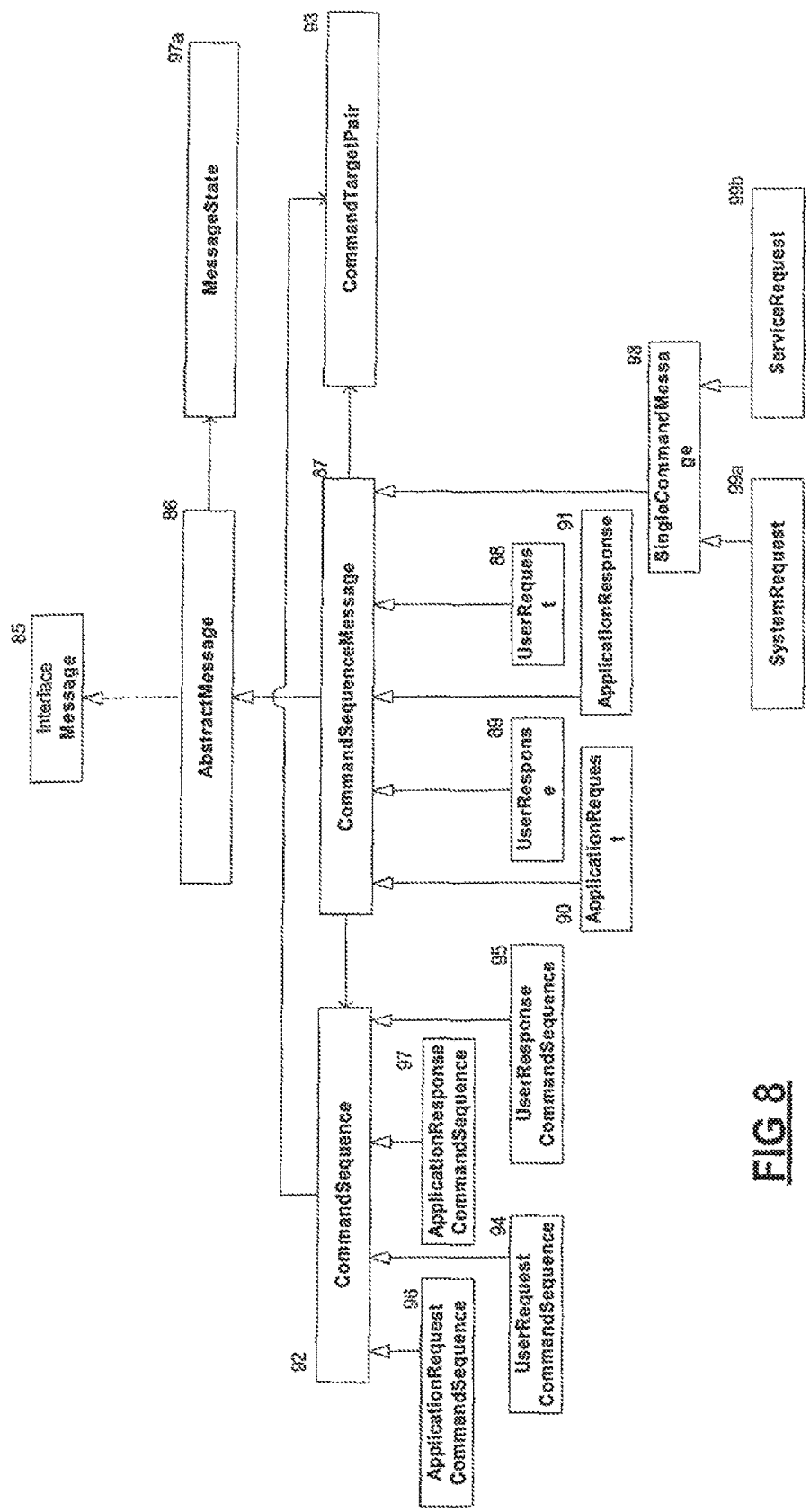
FIG. 8 is a schematic overview of Java classes class used to implement messaging within the architecture of FIG. 3.

FIG. 8 illustrates a hierarchy of classes used to implement messages which can be passed between services to be handled by appropriate service handlers. These classes are shown in further detail in FIGS. 8A to 8J.

Referring to FIG. 8, it can be seen that the hierarchy used to represent messages is headed by a Message interface 85 (FIG. 8A) which is implemented by an abstract class AbstractMessage 86 (FIG. 8B). A ComandSequenceMessage class 87 (FIG. 8C) extends the AbstractMessage class 86. An instance of the CommandSequenceMessage class 87 represents messages which are to be transmitted between services. The CommandSequenceMessage class has four subclasses representing messages used in preferred embodiments of the present invention. A UserRequest class 88 (FIG. 8D) is used to represent messages generated by a user. A UserResponse class 89 (FIG. 8E) is used to represent responses to messages represented by instances of the UserRequest class 88. An ApplicationRequest class 90 (FIG. 8F) is used to represent requests made using Application Programmers' Interface (API) calls, and an ApplicationResponse class 91 (FIG. 8G) is used to represent response to messages represented by the ApplicationRequest class 90.

Figure 8C:
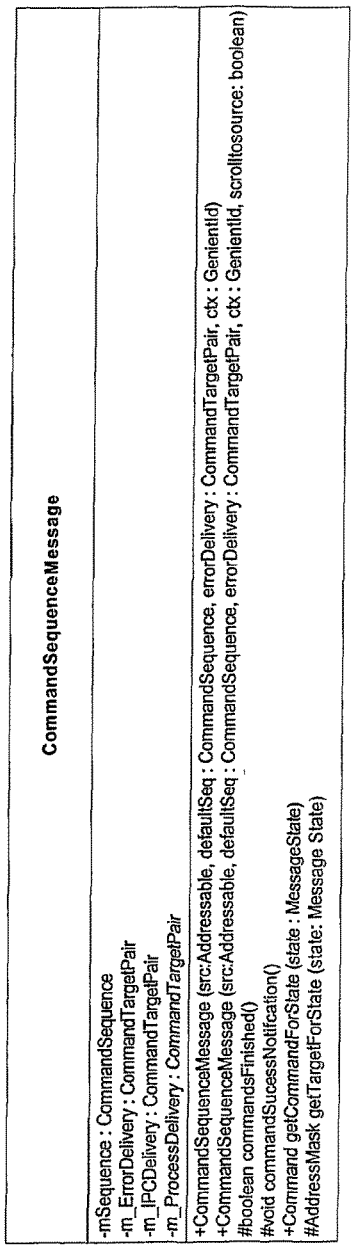
Figure 8D:
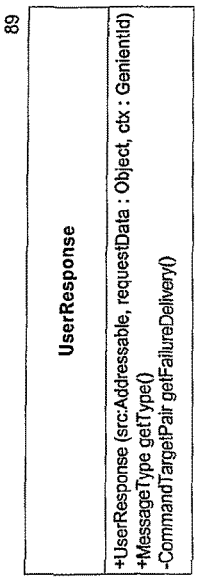
Figure 8F:
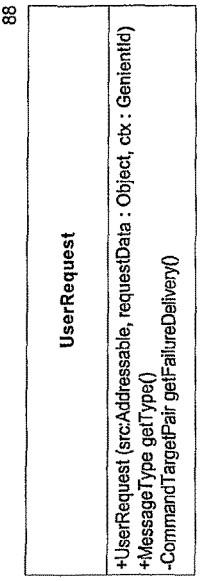
Figure 8E:
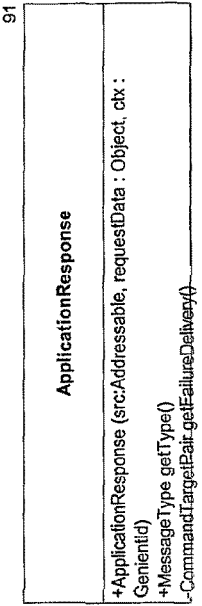
Figure 8G:
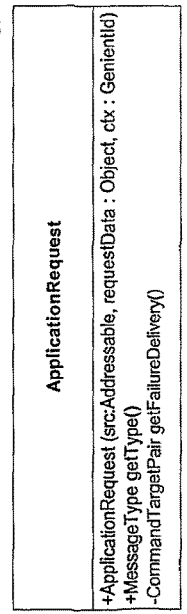

Each of the message types described above inherits core features required to implement messaging from the CommandSequenceMessage class 87 (FIG. 8C). A private mSequence variable within the CommandSequenceMessage class 87 references an instance of a CommandSequence class 92 (FIG. 8H). The CommandSequence class includes an array of pairs which comprise a command, and a target (that is a service to which that command is targeted). Each command target pair is represented by an instance of a CommandTargetPair class 93 (FIG. 8I). It can be seen that CommandSequence acts as a superclass for a UserRequestCommandSequence class 94, a UserResponseCommandSequence class 95, an ApplicationRequestCommand-Sequence class 96 and an ApplicationResponseCommandSequence class 97. Each of these subclasses of the CommandSequence class 92 represents a command sequence appropriate to the corresponding subclass of the CommandSequenceMessage class 87.

The state of any message represented by a subclass of the AbstractMessage class 86 is represented by a private mState variable which references an instance of a MessageState class 97a.

The CommandSequenceMessage class 87 also has as a subclass a SingleCommandMessage class 98 (FIG. 8J) which represents a message having a single command and a single target. The SingleCommandMessage class in turn has a SystemRequest class 99a and a ServiceRequest class 99b as subclasses.

Having described the various classes used to implement that which is illustrated in FIG. 3, and having also described the classes used to implement messaging, the manner in which the components of FIG. 3 operate together and the manner in which messaging is achieved is now described with reference to FIGS. 9 to 13. In the following description, objects are denoted by the reference numerals followed by a prime symbol ('). Where appropriate, reference numerals associated with the class of which an object is an instance are used.

Figure 9:
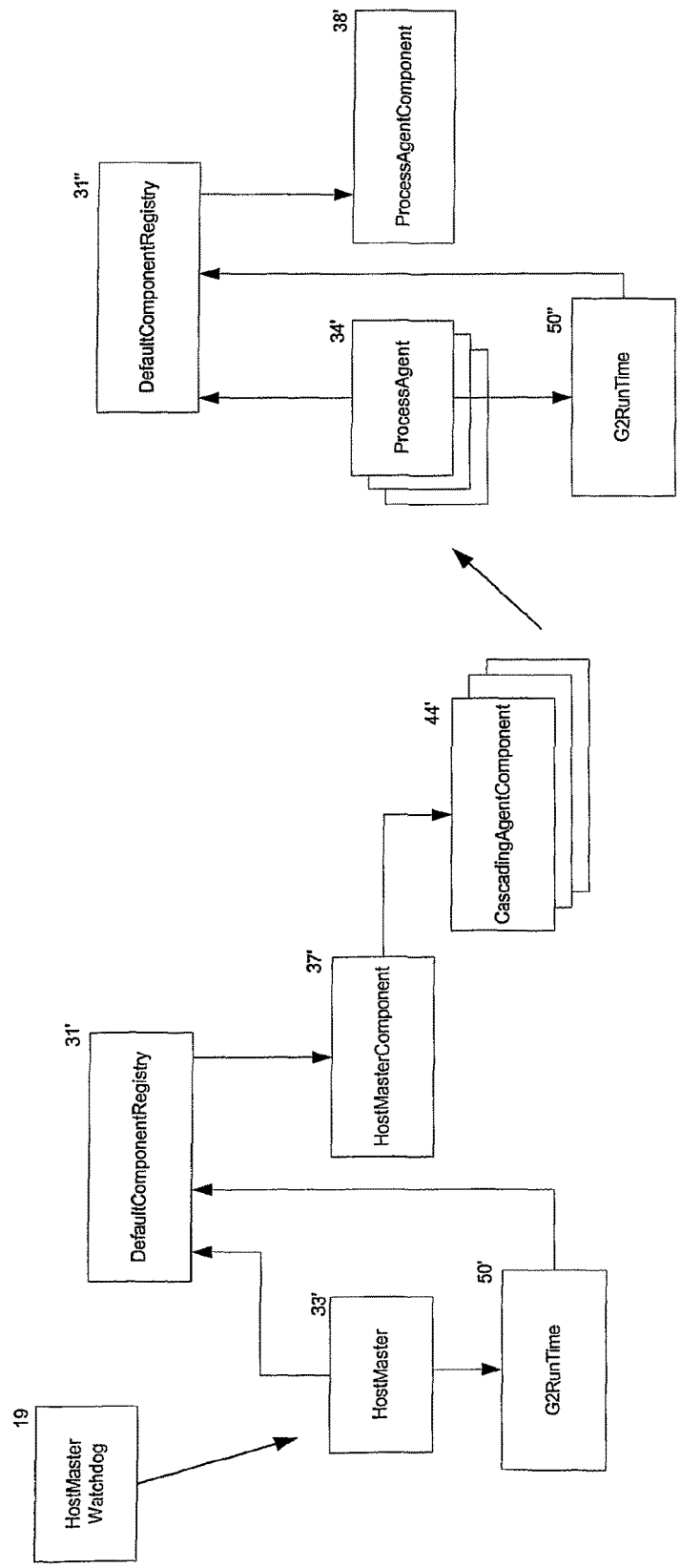
FIG. 9 is a schematic illustration showing creation of a process within the architecture of FIG. 3.

Referring first to FIG. 9, creation of ProcessAgents in the architecture of FIG. 3 is illustrated. As described above a HostMasterWatchDog process 19 creates a HostMaster object 33'. The HostMaster object has associated with it a G2Runtime object 50' which can be used to locate a DefaultComponentRegistry object 31' using a getComponentRegistry( ) method. The HostMaster object 33' is then registered within the DefaultComponentRegistry object 31' this in turn creates a HostMasterComponent object 37'.

The HostMaster uses configuration data to determine how many ProcessAgent objects it needs to create. For each ProcessAgent object which is to be created, a CascadingAgentComponent 44' is created, and this component in turn communicates with a respective ProcessAgent object 34' which is created within its own Java Virtual Machine. The main( ) method of the ProcessAgent object 34' is configured to carry out the work of the Process Agent. The ProcessAgent object 34' has an associated G2Runtime object 50" which is used to locate a DefaultComponentRegistry object 31". This in turn creates a ProcessAgentComponent object 38'.

The Component objects created by instances of the DefaultComponentRegistry class as described above allow administration of both HostMaster and ProcessAgent objects. As described above both the HostMaster object 33' and the ProcessAgent object 34' have associated DefaultComponentRegistry objects 31' and 31", and both these DefaultComponentRegistry objects store details of both the HostMasterComponent object 37', and the HostMasterComponent object 38'

The CascadingAgentComponent object 44' and the ProcessAgent object 34' communicate using RMI, and both have RMI clients which are used for this purpose. As described above, a HostMaster object is responsible for management of its associated ProcessAgent objects. This is achieved by communication using the component registries described above. Furthermore, a ProcessAgent object may generate "Heart beat" events at predetermined intervals, and the HostMaster object may listen for such events. If such an event is not received at the expected time, or within a predetermined time after the expected time, the HostMaster object then assumes that the ProcessAgent object has died, and accordingly performs recovery by instantiating a new ProcessAgent object. Details of the death of the earlier ProcessAgent object and creation of the new ProcessAgent object are recorded in the appropriate DefaultComponent registry objects.

Figure 10:
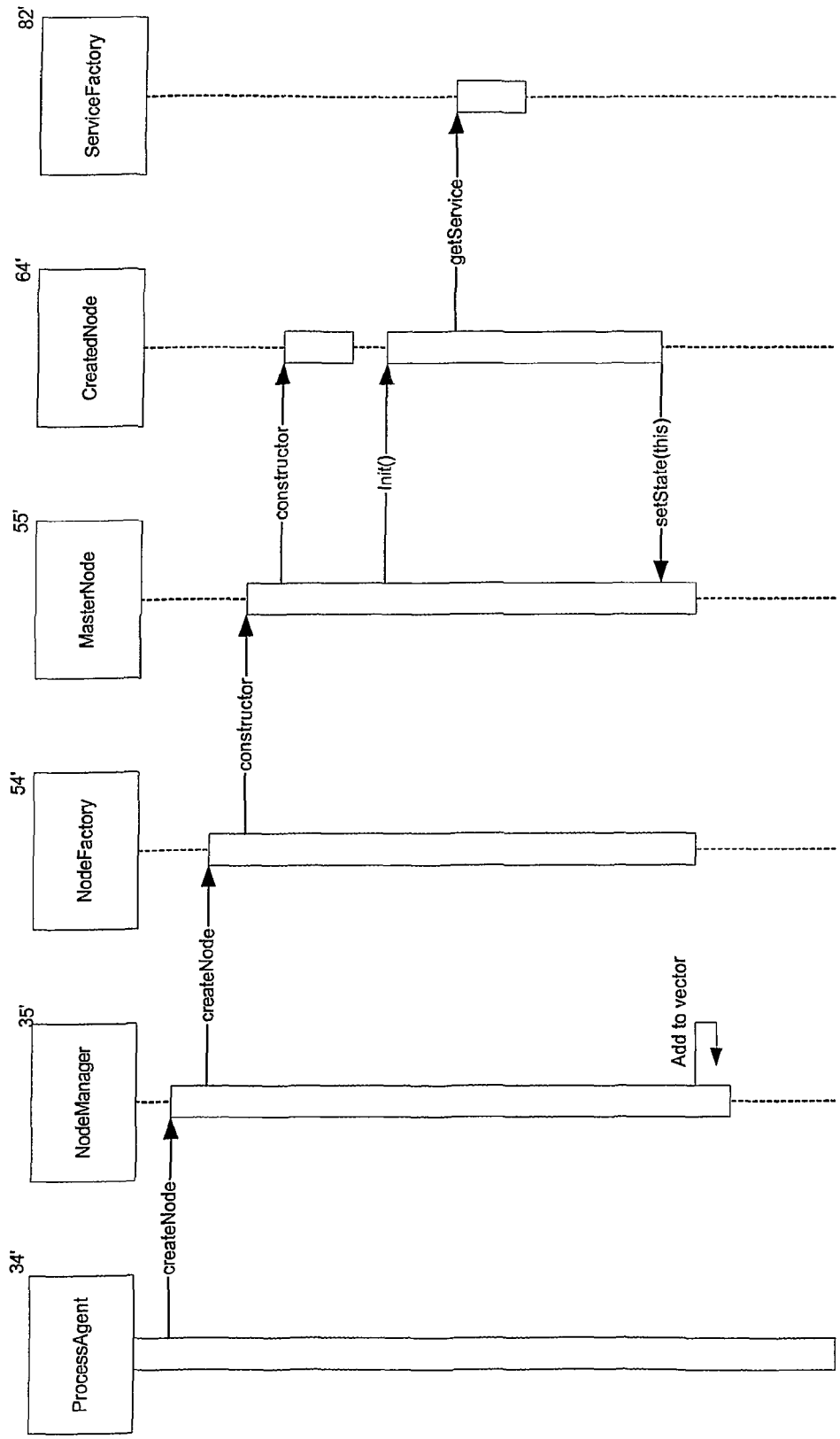
FIG. 10 is a schematic illustration showing creation of a node within one of the processes of FIG. 3.

FIG. 10 illustrates the process of node creation within a particular process. The ProcessAgent object 34' locates its NodeManager object 35' (referenced by the mNodeManager private variable). It then uses a public createNode method within the NodeManager object 35' to create a node. The createNode method takes as a parameter a node type, which is represented by a NodeType object which is an index and textual description of the node to be created. The NodeManager object 35' creates a NodeFactory object 54' using its constructor which takes no parameters. The createNode method provided by the NodeFactory object 54' is then used to create the desired node. The NodeFactory object 54' creates a MasterNode object 55' by calling its constructor method which takes no parameters.

The MasterNode object 55' in turn instantiates a CreatedNode object 64' which is referenced by an mState parameter within the MasterNode object 55'. An init( ) method provided by the CreatedNode object 64' is then called by MasterNode to initialise the MasterNode object 55', and the transitions between states illustrated in FIG. 6 can then occur as necessary, and the state of the node is set using a setState method provided by the MasterNode object 55'. The CreatedNode object 64 in due course uses a ServiceFactory object 82' to create the services required by the MasterNode object 64'.

It can be seen from FIG. 4E that the NodeManager class includes a private Vector variable mynodes which stores details of all nodes managed by a NodeManager object. FIG. 10 schematically illustrates that each time a MasterNode object is created, it is added to this vector variable.

Figure 11B:
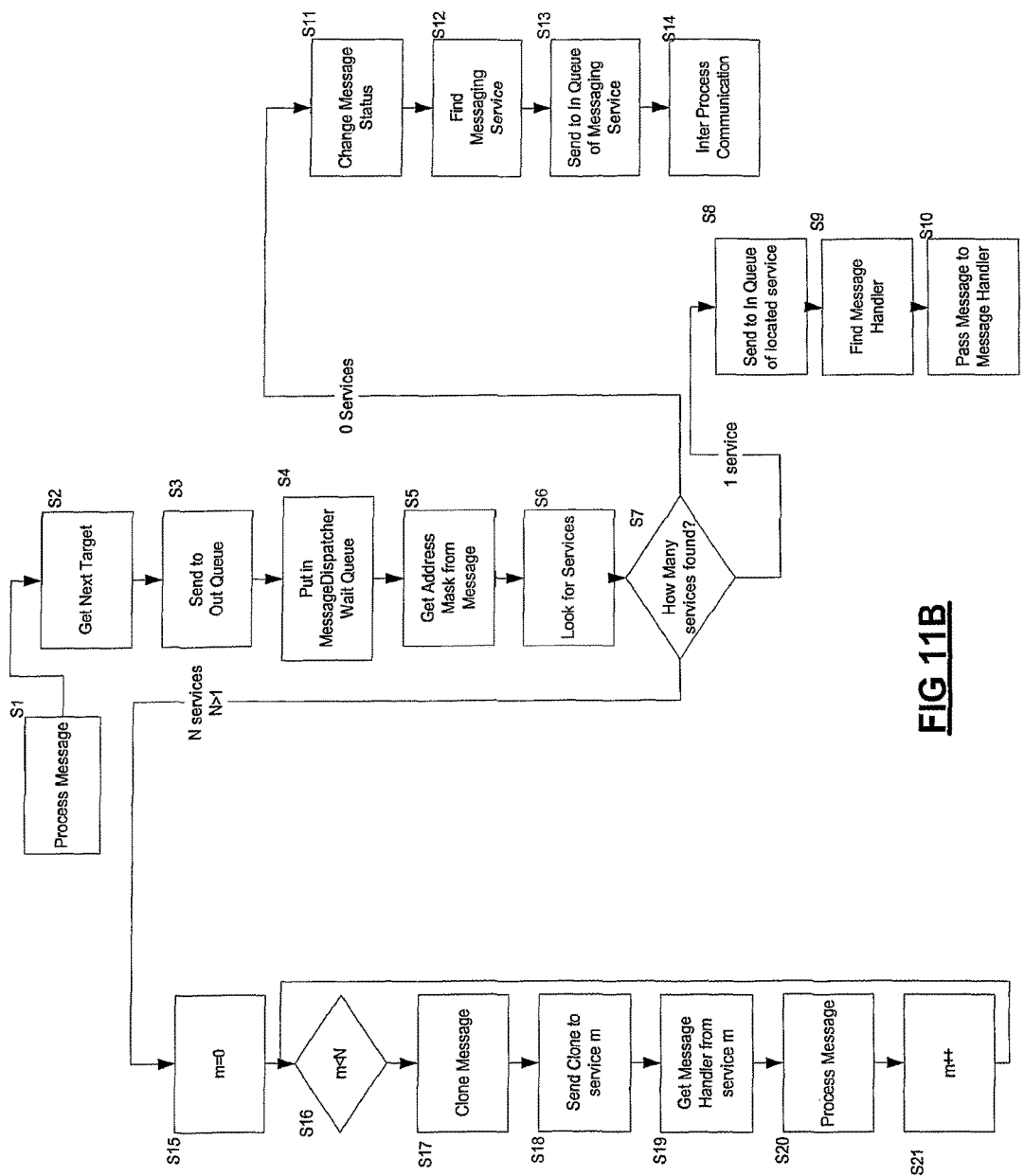
FIG. 11B is a flowchart showing the messaging process of FIG. 11A in further detail.

FIGS. 11A and 11B show how messages are transmitted from a first service 74' to a second service 74" in accordance with the present invention. Referring to FIG. 11A it can be seen that the first service 74' comprises a plurality of service handlers 77' which provide the functionality of the first service as described above. The first service 74' additionally comprises an in queue IN1 into which incoming messages are placed, and an out queue OUT1 into which outgoing messages are placed prior to transmission. The second service 74" comprises a plurality of service handlers 77", an in queue IN2 and an out queue OUT2. Both the first service 74' and the second service 74" have associated with them unique addresses which are used for directing messages to them.

FIG. 11B illustrates how messaging is effected using the structure illustrated in FIG. 11A. FIG. 11B illustrates routing of a message from one of the service handlers 77' of the first service 74' to one of the service handlers 77" of the second service 74". At step S1, a service handler 77' of the first service 74' executes the command specified in the message. When this execution is complete, the service handler 77' interrogates the message to determine an address mask of the next service to which it is to be sent, and modifies the message to show this address mask (step S2). At step S3, the message is sent to the out queue OUT1 of the first service 74'. A MessageDispatcher object associated with the out queue OUT1 then copies the message to its wait queue (step S4), and interrogates the message to obtain an address mask indicating the message's intended destination (step S5). At step S6, a ComponentRegistry object is used to locate all services within the current operating system process which match the message's address mask.

At step S7, a check is made to determine whether or not any services have been located. If it is determined that a single appropriate service has been located (e.g. the second service 74" of FIG. 11B), the message is forwarded to the in queue of that service (step S8), an appropriate service handler is located within that service (step S9), and the message is forwarded to the located service handler.

If step S7 determines that no suitable service can be found within the current process, the message is amended to show that it must be directed to a messaging service which can carry out inter-process messaging (step S11). An appropriate messaging service is then found (step S12), the message is directed to the in queue of the messaging service (step S13) and the messaging service then carries out inter-process communication (step S14).

If step S7 locates N suitable services, where N is greater than one, a counter variable, m is initialised to zero, (step S15), and then a sequence of operations are carried out N times by the action of a loop established by steps S16 and S21. Each loop will produce a clone of the message (using standard Java functionality) at step S17 and this is sent to one of the located services at step 18, A suitable service handler is then located within each service (step S19) and appropriate processing is carried out (step S20).

Figure 12A:
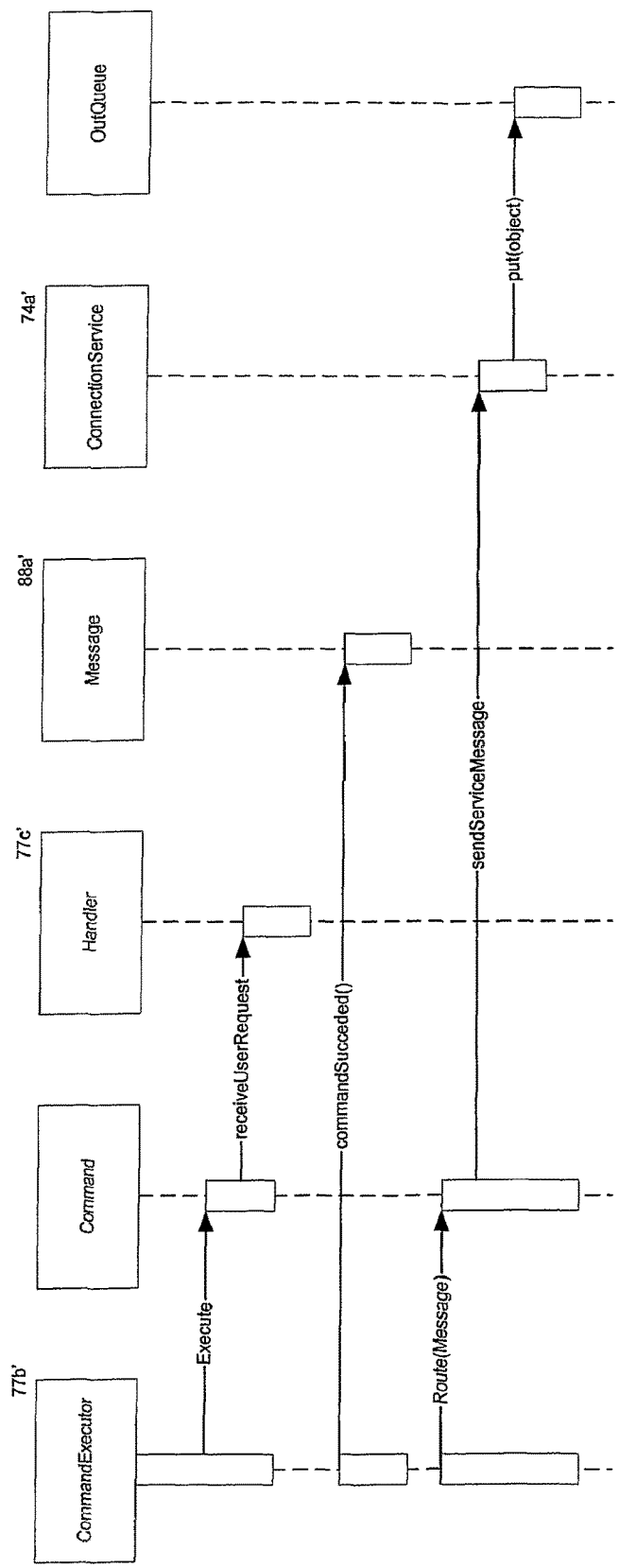
FIGS. 12A to 12D are schematic illustrations showing the messaging of FIGS. 11A and 11B in further detail.

FIGS. 12A to 12D illustrate messaging in further detail. Referring to FIG. 12A, it can be seen that a CommandExecutor object 77b' (referenced by an appropriate variable in an appropriate handler class) uses an execute method provided by a command stored in a Command variable within a message 88a'. In the example illustrated in FIG. 12A the command is a ReceiveUserRequestCommand, which in turn is handled by a connection handler object 77c'. It is at this stage that service and message specific processing takes place. Assuming that the command is correctly executed, the CommandExecutor object 77b' uses a commandSucceded method provided by the message 88a'. It can be seen that this method is provided by the AbstractMessage class (FIG. 8B), and all messages are instances of subclasses of the AbstractMessage class. In the case of a CommandSequenceMessage, the commandSucceded method will cause a CommandTargetPair variable m_ProcessingDelivery to be set to the next command, and the next target address. When this is complete, a SendServiceMessage method provided by a ConnectionService object 74a' is used to direct the message to the service's out queue (represented by an mOutQueue variable in the BaseService class), using a put method. Thus FIG. 12A illustrates the steps required to place a message in a service's out queue.

Referring to FIGS. 8B and 8C it can be seen that a CommandSequenceMessage object comprises a command sequence (which is an instance of a CommandSequence object, FIG. 8H), and three CommandTargetPair objects. A first CommandTargetPair is set set in the case of success as described above using the commandSucceded method. A second CommandTargetPair is set in case of failure by a commandFailed method, and a third CommandTargetPair is used where communication is required between processes, as is described below with reference to FIG. 12D. State information within a message object is used to determine which of the CommandTargetPair objects should be used at a particular time.

Figure 12B:
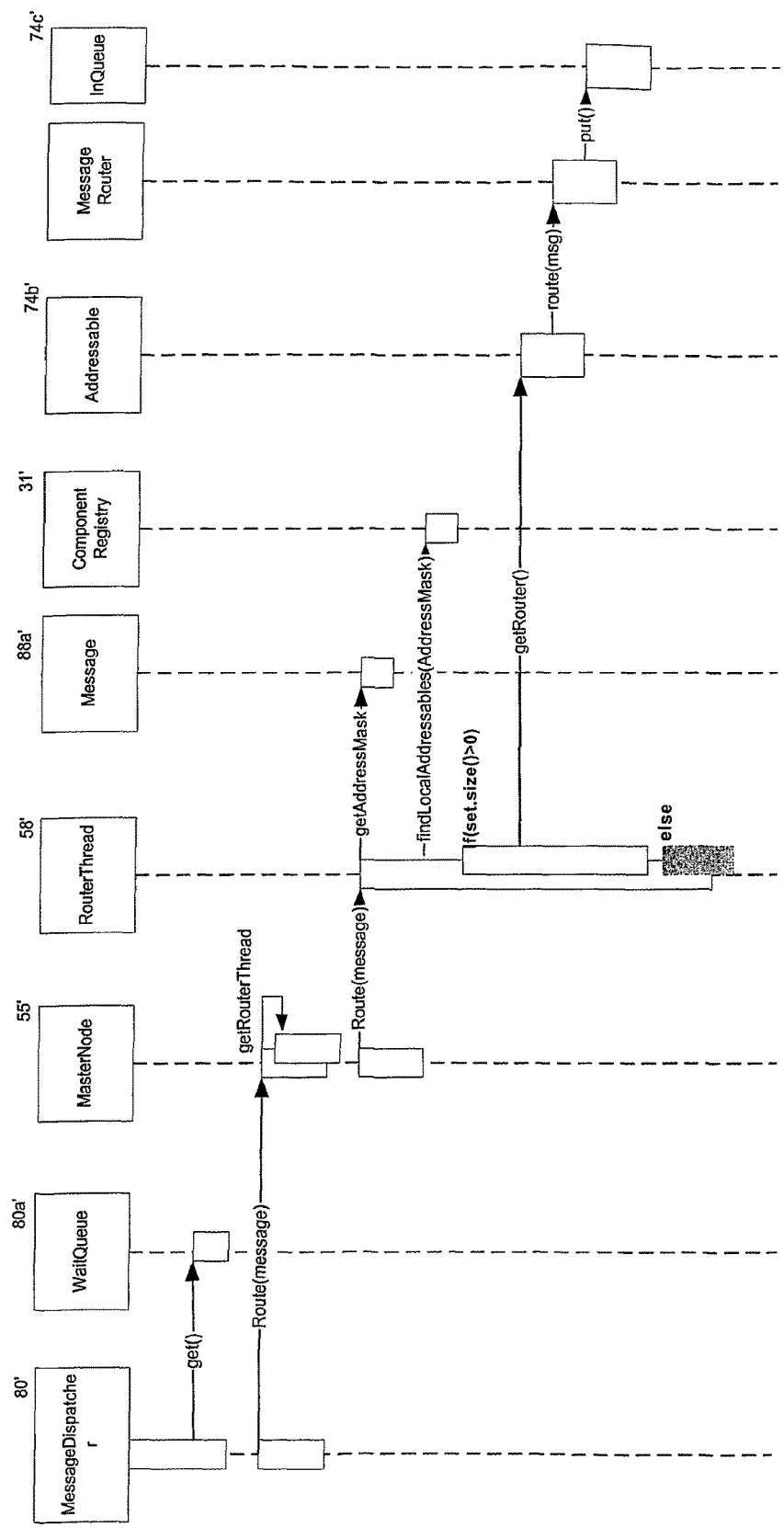

FIG. 12B illustrates steps which are carried out after a message has been placed in a service's out queue. The out queue of the service is provided with its own MessageDispatcher object 80', which implements the Thread interface provided by the Java programming language. A get( ) method provided by a WaitQueue is called by a MessageDispatcher object 80'. The get( ) method transfers the message to a queue represented by an mWaitQueue object 80a' within the Message dispatcher object 80'. The MessageDispatcher object 80' then locates an appropriate MasterNode object 55', and routes the message to that node.

On receiving the message, the MasterNode object 55' locates a RouterThread object 58' from its pool of router threads (represented by an instance of a class implementing the Pool interface illustrated in FIG. 5D), using a getRouterThread method. Having located a suitable RouteThread object, a route method provided by a RouterThread object 58' is used to route the message to the correct service. This inovolves calling the getAddressMask method provided by the Message object to obtain an address mask, and then using a ComponentRegistry object 31' to locate all services matching the obtained address mask by calling a findLocalAddressables method provided by the ComponentRegistry object 31'. Assuming that at least one suitable service is found, a getRouter( ) method is called on the Service object 74b'. A route( ) method provided by the Service object 74b' is then used to route the message to out queue 74c' of the Service object 74b'.

Figure 12C:
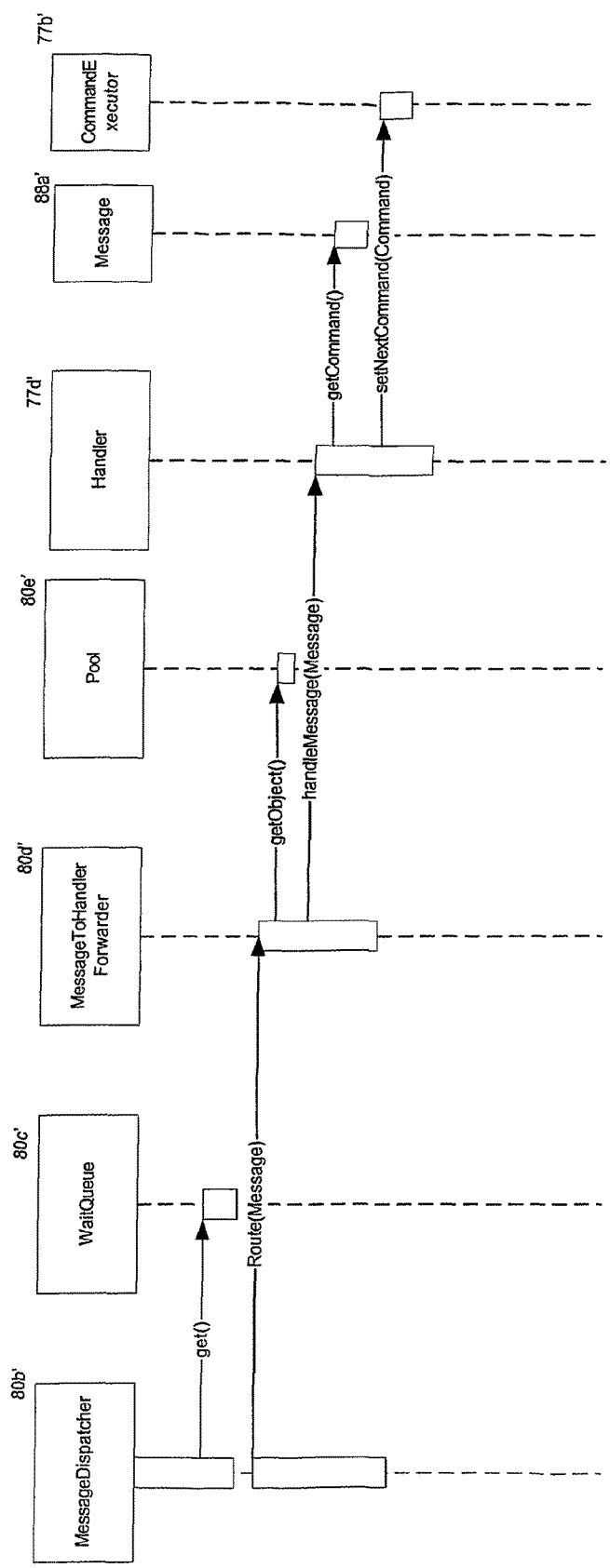
Figure 12D:
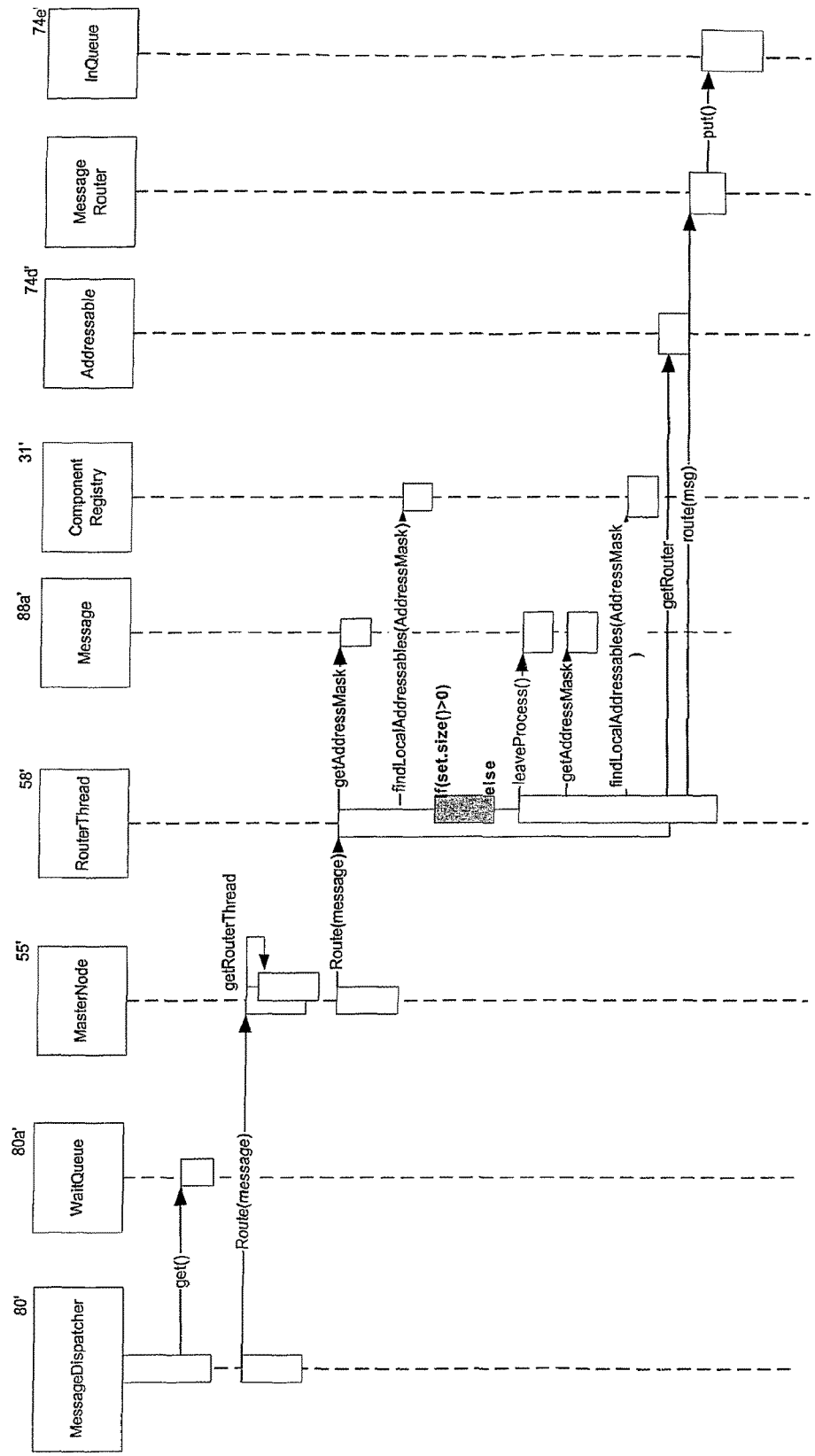

If no suitable services are located by the findLocalAddressables method, the processing illustrated in FIG. 12D is carried out, as described in further detail below.

If more than one service is found within a node which matches the specified address mask, then the message is cloned and sent to the in queues of all services in the manner described above. Furthermore, it should be noted that as soon as the message is dispatched to the RouterThread object 58' the work of the MessageDispatcher object is finished, thus operation of the MessageDispatcher object 80' is decoupled from operation of the RouterThread object 58'.

FIG. 12C illustrates processing when a message has reached a service's in queue. A MessageDispatcher object 80b' is associated with the in queue and listens for message arrivals. When a message arrives, the MessageDispatcher object 80b' uses a get( ) method to copy the message to its WaitQueue object 80c'. A route method is then used to forward the message to a MessageToHandlerForwarder object 80d'. The MessageToHandlerForwarder object 80d' uses a getObject method provided by a ServiceHandlerPool object 80e', to provide a Handler object 77d'. The MessageToHandlerForwarder object 80d' then call a handleMessage method (specified in the MessageHandler interface) to cause the message to be handled. In due course the Handler uses a setNextCommand method provided by a CommandExecutor object 77b' to cause the command sequence to be suitably updated.

FIG. 12D illustrates the processing shown in FIG. 12B, modified where it is the case that the RouterThread object 58' determines that there are no services registered with the ComponentRegistry 31' which match the specified address mask. In this case, a leaveProcess method is used to update the internal state of the message object 88a', and the RouterThread then seeks to locate a service which is responsible for inter-process communication by using a getAddressMask method and a findLocalAddressables method, which will return an appropriate service 74d'. Having located an appropriate service the message is sent to that service in the manner described above with reference to FIG. 12B. On receipt of the message an the In queue of the service, the service handles the message (as described with reference to FIG. 12D), and inter-process communication is thus achieved.

From the preceding description, it can be seen that message routing is carried out as specified within appropriate variables of a given message. There is no central control of message routing, but instead control is distributed between objects which handle messages.

Figure 13:
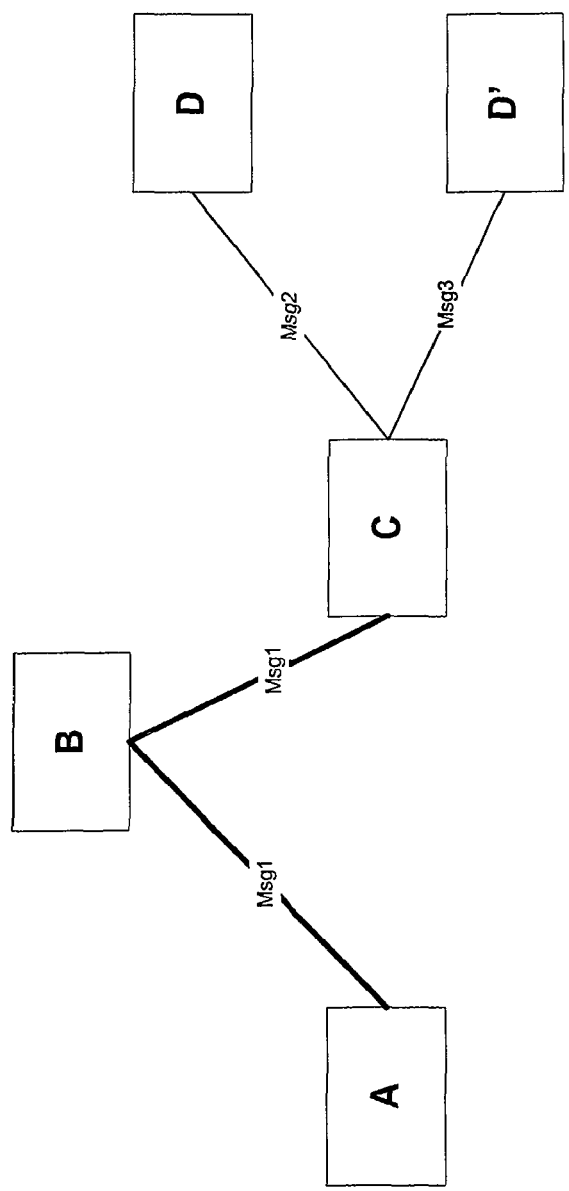
FIG. 13 is a schematic illustration showing distributed messaging as illustrated in FIGS. 12A to 12D.

For example, referring to FIG. 13, there is illustrated a system of five message handlers denoted A, B, C, D and D'. The message handlers D and D' are both instances of a common message handler.

A message Msg1 is sent from handler A, to handler B, and subsequently from handler B to handler C. Handler C processes Msg1 in a predetermined manner, and generates two messages, Msg2 and Msg3. Each of these messages is then routed independently. The message Msg2 is routed to handler D while the message Msg3 is routed to the handler D'.

Each handler processes the message, and routes the message onwards to the next service specified therein. Distributing control of message routing in this way provides a scalable system, and removes the need for any centralised control of messaging. This is particularly beneficial where a handler creates a plurality of messages from a single received message (as in the case of handler C in FIG. 13).

Referring back to FIG. 2, having described a framework for operation of the server 13. operation of the webserver 12 and server 13 to provide composite user interfaces is now described.

Figure 14:
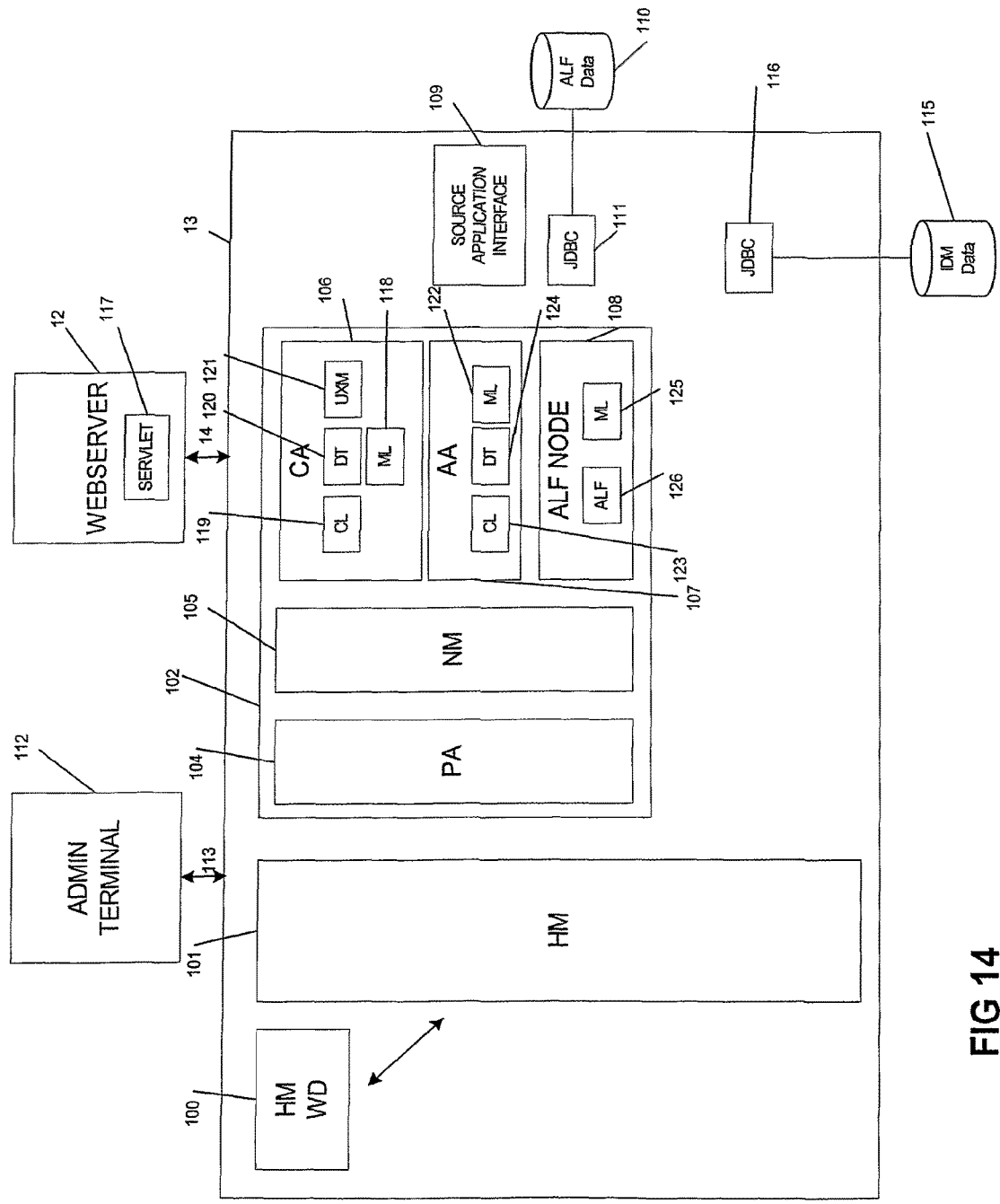
FIG. 14 is a schematic illustration of the logical architecture of the web server and the server of FIG. 2.

FIG. 14 illustrates the logical architecture of the web server 12 and the server 13. It can be seen that the server 13 operates using a process framework as illustrated in FIG. 3, and comprises a Host Master Watchdog process 100, a Host Master process 101 and a process 102.

The process 102 comprises a process Agent 104 and a Node Manager 105 which perform functions as described above. The process 102 comprises three nodes 106, 107, 108. A client adaptor (CA) node 106 is responsible for interaction between the server 13 and the composite application(s). An application adapter (AA) node 107 is responsible for interactions between the server 13 and the appropriate source applications via a source application interface 109. An ALF (Authentication Lockdown Framework) node 108 is responsible for authentication and security functionality provided by the server 13. Security information is stored in a database 110 which is accessed via a conventional Java Database Connectivity (JDBC) interface 111. The function of each of these nodes is described in further detail below.

The server 13 is connected to an administration terminal 112 via a link 113. The administration terminal 112 allows administrators of the server 13 to perform various administration functions, as described below.

Configuration data for the nodes 106, 107 is obtained from an Integration Data Manager (IDM), which comprises a database 115 accessed via an appropriate interface (such as JDBC interface 116). The form of the configuration data, and the manner in which it is used is described in further detail below. It should be noted that the database 110 and the database 115 together make up the configuration data 18 of FIG. 2.

The Webserver 12 communicates with the server 13 via a connection 14. The webserver runs a Java™ servlet 117, and this servlet 117 is responsible for communication between the webserver 12 and the server 13. In many situations is necessary to impose restrictions on access to composite applications or parts of composite applications managed by the server. Such restrictions can be conveniently implemented by allocating user names and passwords to users, and associating appropriate access privileges with such usernames and passwords. The servlet 117 implements any necessary security policies, by cooperating with the CA node 106. The functionality provided by the servlet 117 is referred to as a User Agent (UA) service.

The CA node 106 comprises four services. A Messaging layer (ML) service 118 provides Java Messaging service (JMS) functionality for communication between objects within different processes. The JMS is such that messaging between processes can be carried out in a unified manner, regardless of whether processes are located on the same or different hosts.

A Communications Layer (CL) service 119 provides connections between the CA node and other processes. A Data Transformation (DT) service 120 provides means to transform data from one form to another. Such a service can be required both when receiving user data from a composite application which is to be forwarded to a source application, and when receiving data from one or more source applications which is to be output to a composite application. A User Experience Manager (UXM) service 121 is responsible for determining the action necessary when requests are received from the webserver 12, and when data is received from a source application.

The AA node comprises three services an ML service 122, a CL service 123 and a DT service 124. Each of these services provides the same functionality as the equivalent service of the CA node 106.

The ALF node 108 again comprises an ML service 125 and an ALF service 126. The ALF service 126 is responsible for security features as is described in further detail below.

The use of the CA node 106 and the AA node 107 to produce and manage composite applications is now described with reference to FIG. 15. A user operates a web browser 126 to access HTML documents provided by the web server 13 which make up a composite user interface. A user issues a request via the web browser 126. This request is forwarded to the webserver 12 using the Hyper Text Transfer Protocol (HTTP) operating in a conventional manner. The servlet 117 within the web server 12 operates a UA service 127. The UA service 127 authenticates the request in accordance with predetermined security policies (defined as described below). If the authentication is successful, an IncomingUserRequest message is created using parameters received by the UA (e.g. from the HTTP request). This IncomingUserRequest message is then sent by the UA service 127 to the server 13, having a target address of the CL service 119 of the CA node 106. As described above, this message is transmitted using the JMS protocol. The CL service 119 receives the IncomingUserRequest message, and having received the message, directs it to the DT service 120 of the CA node 106. The DT service 120 performs any necessary transformation of data contained in the IncomingUserRequest message, and directs the message onwards to the UXM service 121 of the CA node 106. The UXM service 121 processes the message and generates one or more OutgoingUserRequest messages, destined for the appropriate source application(s) 128. These messages are first sent to the DT service 124 of the AA node 107 using, for example, the JMS protocol.

The DT service 124 of the AA node 107 performs any necessary transformation, and forwards the message to the CL service 123, which in turn generates messages to request appropriate data from the source application(s) 128 in an appropriate format. These messages are then forward to the Source Application(s) using, for example, the JMS protocol.

The Source application(s) 128 process received messages and in turn produce data in response to the received request. This data is received by the AA node 107, and passed to the CL service 123. The data is then forwarded to the DT service 124 which processes the data to extract one or more page objects and to create an IncomingUserResponse message which is forwarded to the UXM service 121 of the CA node 106.

The UXM service 121 processes the IncomingUserResponse message, and determines whether or not it has received all data necessary to create a composite page (determined by its configuration, which is described below). When all data required is received, an OutgoingUserResponse message is created which is forwarded to the DT service 120 where any necessary transformation is carried out. Having performed any necessary transformation the OutgoingUserResponse message is forwarded to the CL service 119 and then onwards to the ML service. The ML service transmits the composite page to the UA 127 using the JMS protocol. The UA then displays the page to the user via the web browser 126, assuming that any necessary validation is successfully carried out by the UA 127.

In the description presented above, a distinction is made between IncomingUserRequest messages and OutgoingUserRequest messages. A similar distinction is made between IncomingUserReponse messages and OutgoingUserResponse messages. These distinctions are made to aid understandability, however it should be appreciated that in some embodiments of the invention both IncomingUserRequest messages and OutgoingUserRequest messages are represented by a single UserRequest message type. Similarly both IncomingUserReponse messages and OutgoingUserResponse messages may be represented by a single UserResponse message type.

Figure 15:
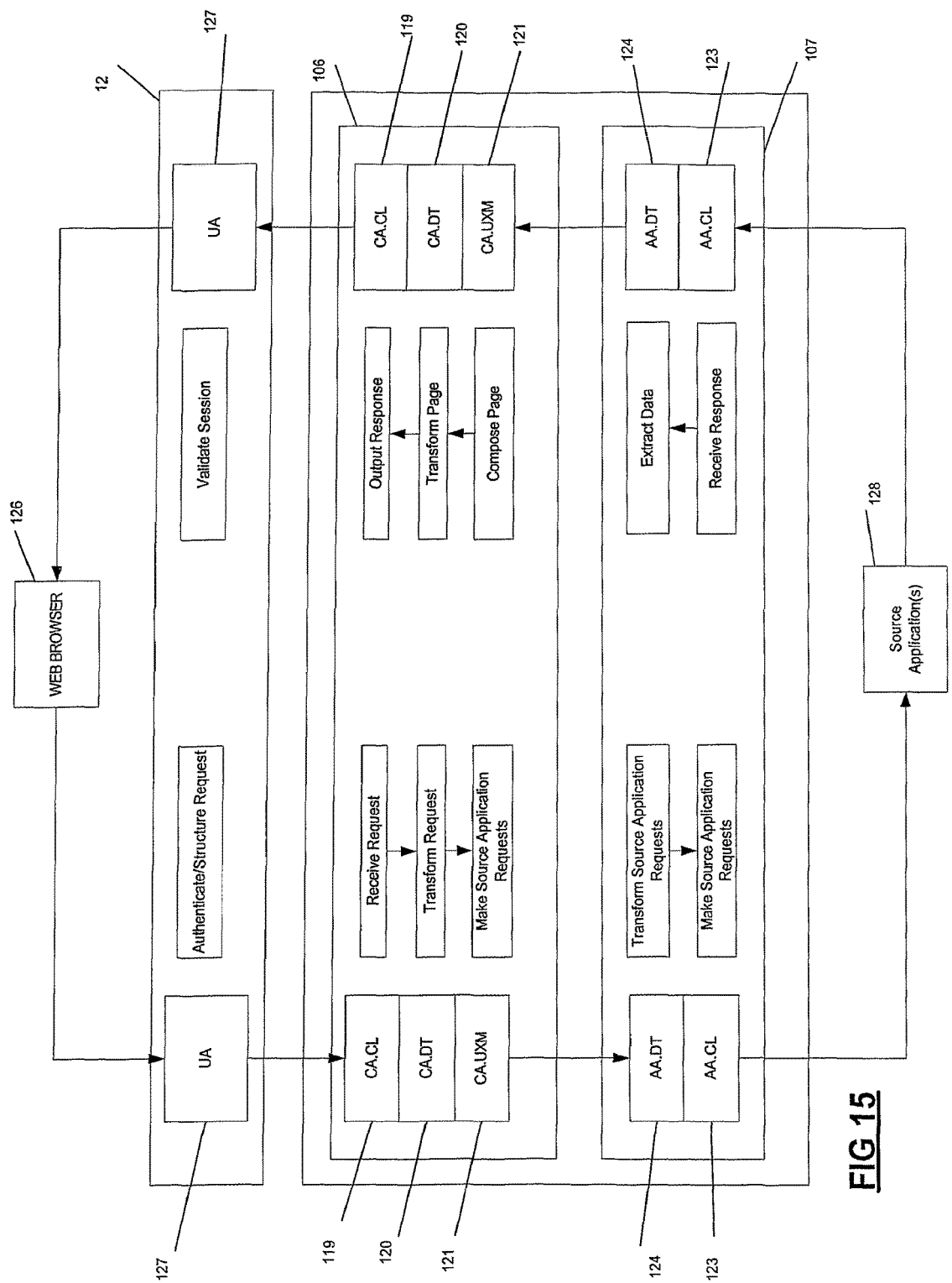
FIG. 15 is a schematic illustration showing how parts of the architecture of FIG. 14 cooperate to provide composite user interfaces.

It will be appreciated that the processing described above can be used to handle a wide range of different composite applications, however it will also be appreciated that the processing required will vary considerably, and therefore an effective means of configuring the services illustrated in FIGS. 14 and 15 is required. This is achieved by accessing the IDM database 115. IDM data is stored in a hierarchical manner as will be described in further detail below.

At startup, the web server 12 and the server 13 need to be provided with data which allows access to the IDM database, and indicates where in that database the appropriate data is located. This is achieved by providing each with appropriate invocation parameters which indicate where the configuration data can be located.

The servlet 117 of the webserver 12 (referred to as "the listener") is provided with invocation parameters as illustrated in FIG. 16.

A g2jms.config parameter specifies a file containing JMS configuration properties for the servlet 117. A g2config.home parameter specifies a directory containing an IDM properties file, which provides information as to how the IDM database 115 is accessed. A g2listener parameter specifies a node in the hierarchical IDM data structure where configuration information for the UA service 127 is located. A g2config.instance parameter species configuration data for the composite application which the webserver 12 is to provide to a user. A g2jms.config parameter specifies configuration for the JMS service of the UA 127. A g2tracer.conf parameter specifies logger configuration.

The nodes and services of the server 13 (collectively referred to as "the composer") are provided with invocation parameters are illustrated in FIG. 17.

The g2config.home, g2jms.config and g2config.instance parameters perform functions as described with reference to FIG. 16. The g2config.webhost parameter specifies an IP address for the web server on which the UA service 127 is implemented by means of the servlet 117. The g2config.baseipport parameter specifies a port number used by an administration console which is used in connection with the composer as described below. The g2basetracer.conf parameter is used to specify a log file for each process operating within the composer. Given that every composer comprises at least a HostMaster process and a process containing AA and CA nodes, at least two log files must be specified, in addition to a log file for the web server.

The parameters described above with reference to FIGS. 16 and 17 together allow the listener and the composer to obtain configuration data from the IDM. Additional invocation parameters are illustrated in FIG. 18. These specifiy page tags which are used in HTTP requests passed to the listener by the composer.

APPLICATION_CLASS specifies a name used for the composite application, and is used by the composer to determine any transformation that the CA.DT may be required to perform. UXM_TREEID and UXM_NODEID specify where in the configuration the UXM can find configuration information pertinent to the specific composite page. UXM_MODIFIED allows the UXM to perform no processing on some pages. If UXM_MODIFIED is set to true, this is an indication that processing is required in accordance with the configuration data stored in the IDM (described below). If UXM_MODIFIED is set to false, this means that no processing is required and the UXM simply forwards the message to the AA node.

Additional tags are used for security purposes. A g2authorization tag is used to indicate that the listener should attempt authentication. usr and pwd tags are respectively used to represent user name and password data when this is required for authentication.

The invocation parameters described above allow the composer and the listener to locate the IDM and to locate suitable data within the IDM. These parameters are conviently implemented as variables of appropriate Java classes. They can be configured by means of a system.properties file, an example of which is illustrated in FIG. 19. Each line of the file corresponds to a Java property to be set. It can be seen that all entries of the file are prefixed by either 'hm' or 'pa'. This ensures that each entry is picked up by the correct process. Entries prefixed by 'hm' are picked up by the HostMaster process, and it can be seen that these correspond to the composer invocation parameters described above. Entries prefixed by 'pa' are additional properties to be set in each process set up by the HostMaster process. These typically include configuration for various aspects of the Java Virtual Machine (JVM) such as garbage collection.

It can be seen that in FIG. 19, all entries which begin 'pa' are of the form 'pa.x'. This indicates that the property should be set on all processes started by the HostMaster. However, in some embodiments of the invention entries may be prefixed by 'pa.N' where N is an integer. In this case, that entry refers only to process N.

It should be noted that the system.properties file is used in a hierarchical manner as follows. Any entry of the form 'pa.N' will override a 'pa.x' entry for process N. Any entry of the form 'pa.x' will override the 'hm' entry inherited from the HostMaster process. In addition to setting parameters by means of the system.properties file, it should be noted that configuration parameters can be specified at start up, for example via a command line interface. In such a case, if a property value is specified both in the system.properties file and on the command line, the system.properties file will determine the value.

Having described invocation parameters, and associated tags, the structure of IDM data stored in the database 115 is now described.

It should be noted that, as will become apparent below, every composite application has a unique application class name which is used to identify it. Every source application also has an unique application class name which is used for identification. Thus, if a composite application is made up of two source applications, its configuration will include three application class names.

Figure 20:
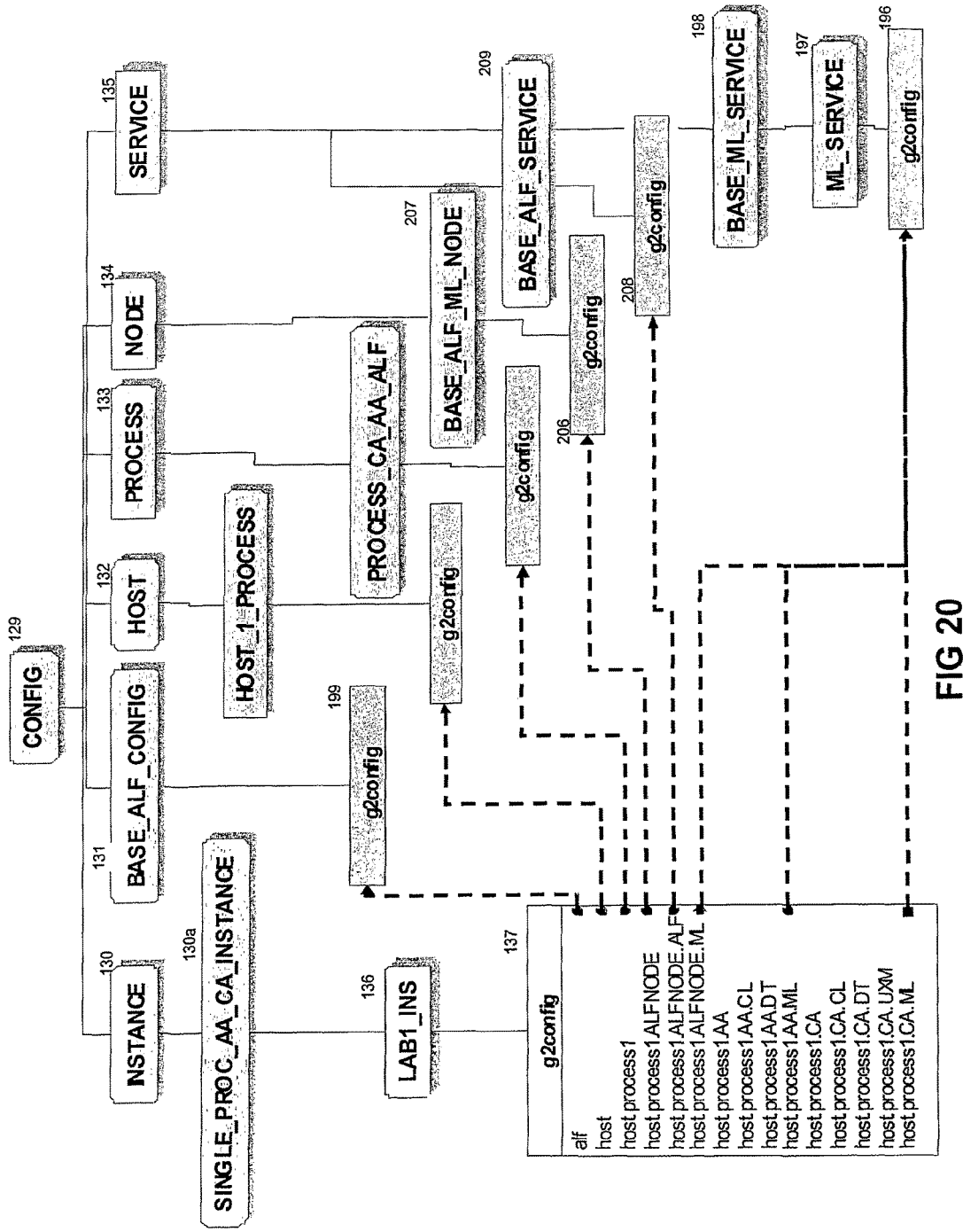
FIG. 20 is a tree diagram illustrating configuration data for the server and web server of FIG. 2.

A partial IDM structure for a configuration containing a single process containing an AA node and a CA node (as illustrated in FIG. 14) is shown in FIG. 20. The highest level of the hierarchy comprises a single entity CONFIG 129 which is the root of the IDM tree. This entity has six child entities. An entity INSTANCE 130 is concerned with configuration information for a particular composer configuration. An entity BASE_ALF_CONFIG 131 provides configuration information for an ALF node. Entities HOST 132, PROCESS 133, NODE 134, and SERVICE 135, each have children containing configuration information for the corresponding entities of FIG. 14.

As described above, the g2instance parameter references a named node in the IDM that contains appropriate configuration data. This data will include details of the number of processes that should be used, the allocation of CA nodes, AA nodes and ALF nodes to those processes, and locations where data appropriate for the services contained within those nodes can be found.

In this case the g2instance invocation parameter is set such that:

g2instance=LAB1_INS

This indicates that the composer should locate the LAB1_INS entity 136 which is a child of the SINGLE_PROC_AA_CA_INSTANCE 130a, which is itself a child of the instance entity 130a to obtain configuration data. It can be seen that the LAB1_INS entity has suitable data provided by a g2config data group 137.

The entry alf in the data group 137 indicates that server uses the ALF, and provides means for locating the ALF database 110 (FIG. 14). The entry host indicates that the server 13 comprises a single host referenced by that entry in the data group 137. It can be seen that all other entries are of the form "host.process1.". Each of these entries provides details of a respective node or service operating within the single process 102 (process1), on the server 13 of FIG. 14. It can be seen that every node and service illustrated in FIG. 14 has a corresponding entry in the data group 137, which provides details of its configuration.

Figure 21:
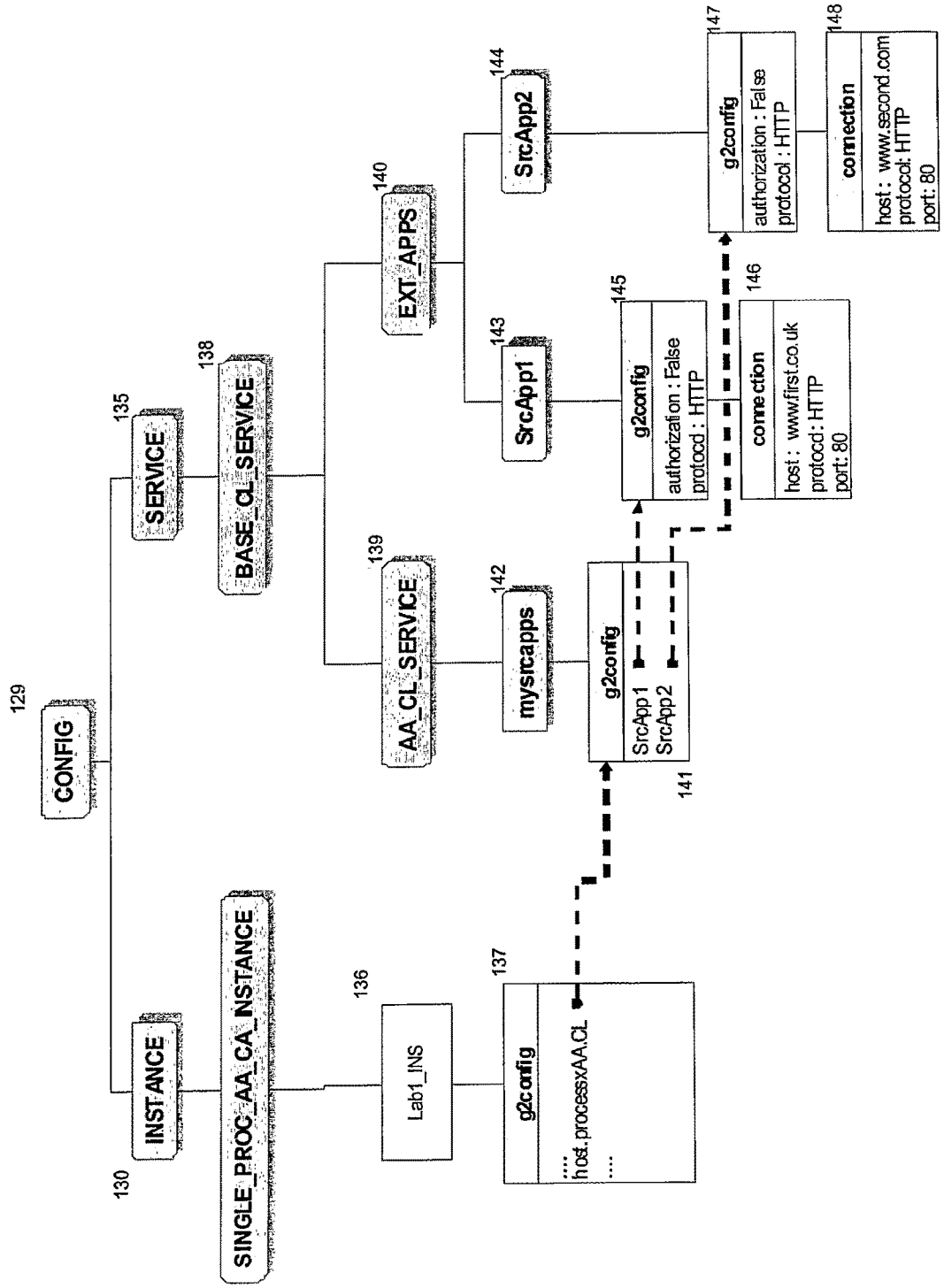
FIG. 21 is a tree diagram showing configuration data pertinent to the Communications Layer (CL) services of FIG. 14.

Configuration of the CL service 123 of the AA node 107 (FIG. 14) is now described. FIG. 21 shows part of the hierarchy of FIG. 20 in further detail, together with details of entities relevant to the configuration of the CL service 123 of the AA node 107. In addition to the entities described above, the hierarchy comprises a BASE_CL_SERVICE entity 138 which is a child of the SERVICE entity 135. The BASE_CL_SERVICE entity 138 has two child entities, a AA_CL_SERVICE entity 139 which represents the CL service 123 of the AA node 107, and an EXT_APPS entity 140 which contains details of relevant source applications. It should be noted that the hierarchical arrangement of the IDM allows child entities to inherit and override properties of their parent entity. For example, default data for all services may be specified in the SERVICE entity 135. Some this data may be inherited and used by the BASE_CL_SERVICE entity 138, while other parts of the data may be replaced by more appropriate values specified in the BASE_CL_SERVICE entity 138.

It can be seen that the host.processxAA.CL entry in the data group 137 references a data group g2config 141 under a mysrcapps entity 142. The g2config data group 141 includes an entry for every source application with which the AA communicates, and each application is referenced by its application class name. Each entry will include a session_timeout parameter which indicates a time (e.g. in minutes) which a user can be inactive without a connection being terminated, and a replicate_sessions parameter which is a Boolean indicating whether or not session data should be copied between processes. Setting this parameter to TRUE provides fail over if session data is lost for any reason.

The source applications from which the composite application is created are each represented by a child entity of the EXT_APPS entity 140. In FIG. 21, two source applications are illustrated. A first source application (having a class name "SrcApp1") is denoted by an entity SrcApp1 143 and a second application (having a class name "SrcApp2") is denoted by an entity SrcApp2 144.

Each of these entities has two data groups. The SrcApp1 entity 143 has a g2config data group 145 which is referenced by the data group 141 and which specifies data for the configuration of the AA, and a connection data group 146 which specifies communications protocols for communication with the SrcApp1 application. The entity SrcApp 2 144 has two similar data groups 147, 148.

The data stored in relation to each source application is now described. The g2confg data group for each source application 145, 147 includes a number of parameters. An authorization parameter takes a Boolean value and indicates whether or not the source application requires authentication. A credential_type parameter is required when the authorization parameter is set to TRUE. The credential_type parameter is either set to USRPWD or DYNAMIC. When creditial_type is set to USRPWD, a static username, password combination is used for authentication. When credential type is set to DYNAMIC, a static username and dynamically created password is used for authentication. For example, a password can be dynamically created from a user name using a predetermined algorithm. A protocol parameter indicates a protocol to be used for communication with the source application. Suitable protocols may include HTTP, SOAP, MQSERIES and JDBC. Other parameters provide information as to how errors should be handled.

The connection data group associated with each source application 146, 148 stores information related to each connection. It can be seen from FIG. 21 that the connection data groups are not directly referenced by the g2config data group 141, and are located by virtue of the fact that they are located below the same entity as the g2config data group 145, 146 for each application.

Each connection data group 146, 148 will include indications of a protocol to be used, a port number of the source application to which data should be sent, an identifier for the host on which the source application is operating, a proxy identifier (if appropriate), together with parameters related to session refresh and logout.

In addition to the parameters described above, the connection data group will include various other parameters appropriate to the protocol being used.

If SOAP is being used these parameters will include a file part of a URL to use for connection, a URI style for message encoding, a URI for the target object, and a URI indicating the intent of the SOAP request.

If JDBC is being used, these parameters will include a URL for JDBC database connection, a JDBC driver name, and parameters indicating both initial and maximum JDBC connection pool sizes.

Other protocols will require other parameters, and such parameters will be readily apparent to those of ordinary skill in the art.

In addition to the data set out above, various other configuration data may be used to configure the CL service of the AA. Such configuration data may either be stored in one of the data groups described above, or alternatively may be stored in an additional data group. Typically, such additional data groups are located within the same source application entity 143, 144 as the data groups described above, and accordingly the instance entity 136 is able to locate all necessary configuration data.

The CL service 119 of the CA node 106 (FIG. 14) is configured in a similar manner, although it will be appreciated that in this case, data of a similar form will be required for the or each composite application instead of the source applications. In some embodiments of the IDM, the data group 141 includes an entry for each composite application in addition to entries for each source application, and these entries in turn identify appropriate entities located below the EXT_APPS entity 140.

Figure 22:
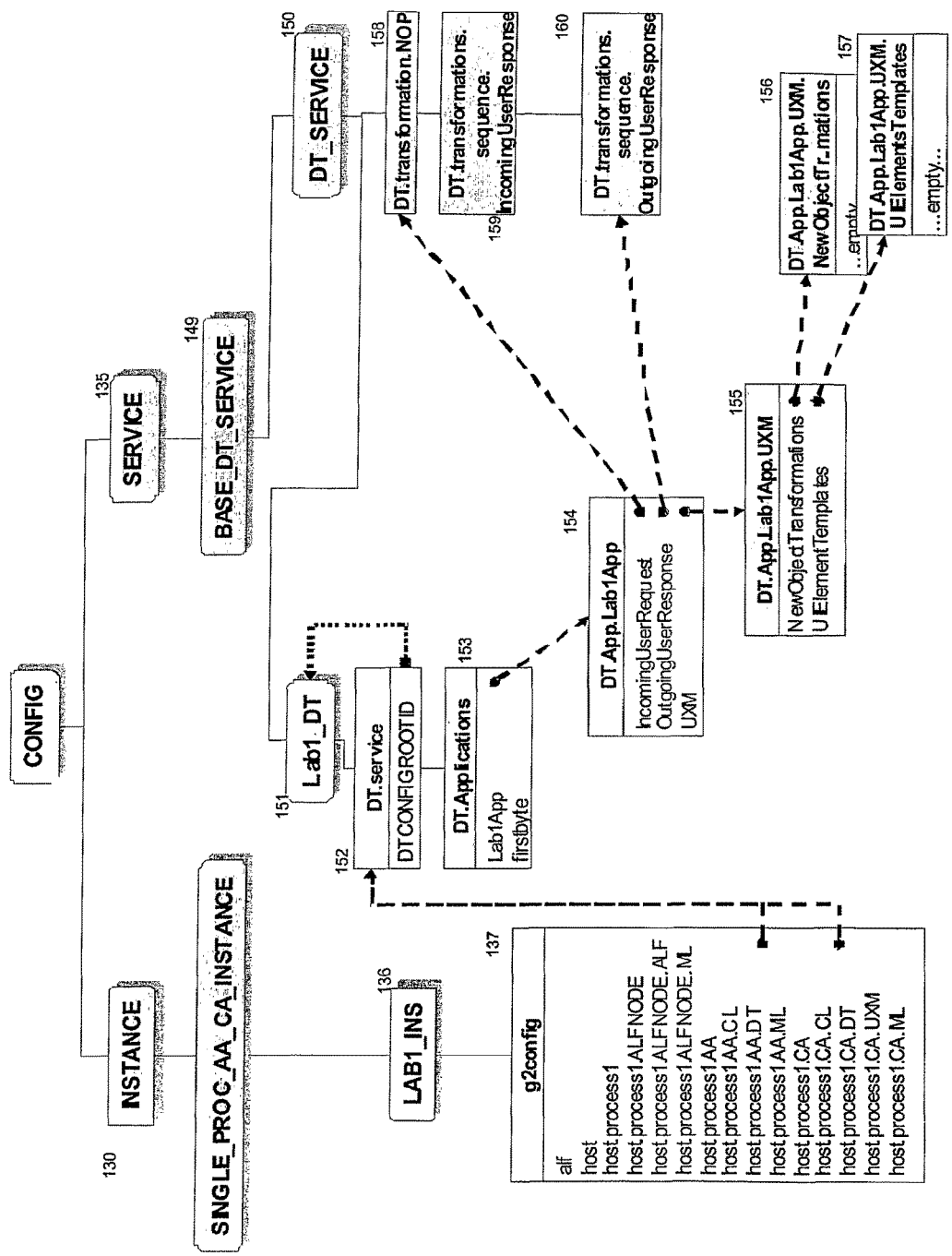
FIGS. 22 and 23 are tree diagrams showing configuration data pertinent to the Data Transformation (DT) services of FIG. 14.

Configuration data for the DT service 120 of the CA node 106, and for the DT service 124 of the AA node 107 is now described. FIG. 22 is a tree diagram showing part of the hierarchy of FIG. 20, together with details of entities pertinent to configuration of the DT services.

The service entity 135 has a child entity 149 BASE_DT_SERVICE which in turn has a child entity DT_SERVICE 150 which represents all DT service configuration data. An entity LAB1_DT 151 is a child entity of DT_SERVICE and represents DT service configuration for the application represented by the LAB1_INS entity 136.

It can be seen that the host.process1.AA.DT and host.process1.CA.DT entries in the data group 137 both reference a DT.service data group 152 which is located beneath the Lab1_DT entitey 151. The DT.service datagroup contains a single entry which allows it to locate its parent entity.

A DT.Applications data group 153 is located under the same entity 151 as the DT.service data group 152. The DT.Applications data group 153 contains one entry for each composite application which must be handled by the DT service of the CA, and one entry for each source application which must be handled by the DT service of the AA. In the example of FIG. 22, it can be seen that the data group 153 includes an entry for a single composite application Lab1App, and a single source application firstbyte. FIG. 22 shows data needed to configure the DT service of the CA to handle the composite application Lab1App.

It can be seen that the Lab1App entry in the DT.Applications data group 153 references a DT.AppLab1App data group 154 which contains data relevant to handling transformations to and from the composite application Lab1App. The DT.App.Lab1App data group 154 includes an entry indicating transformations required in response to an IncomingUserRequest, an entry indicating transformations required in response to an OutgoingUserRequest, and en entry indicating transformations required to convert data from the UXM in a form suitable for output to the composite application.

The UXM entry references a DT.App.Lab1App.UXM data group 155 which in turn contains entries which indicate how data should be transferred between UXM objects used in the UXM of the CA, and data which can be processed by the composite application. In the example of FIG. 22, the data group 155 includes a NewObjectTransfonuations entry which references a data group 156 and a UIElementTempates which references a data group 157. This data allows new data to be added to data received from source applications to create a composite page. The UIElementTemplates data group 157 contains details of such new data, and the NewObjectTransforamtions data group indicates how this data should be included in a composite page.

It can be seen that the other entries in the DT.App.Lab1App data group reference other data groups 158, 159, 160 which contain data indicating how these transformations should be carried out.

Figure 23:
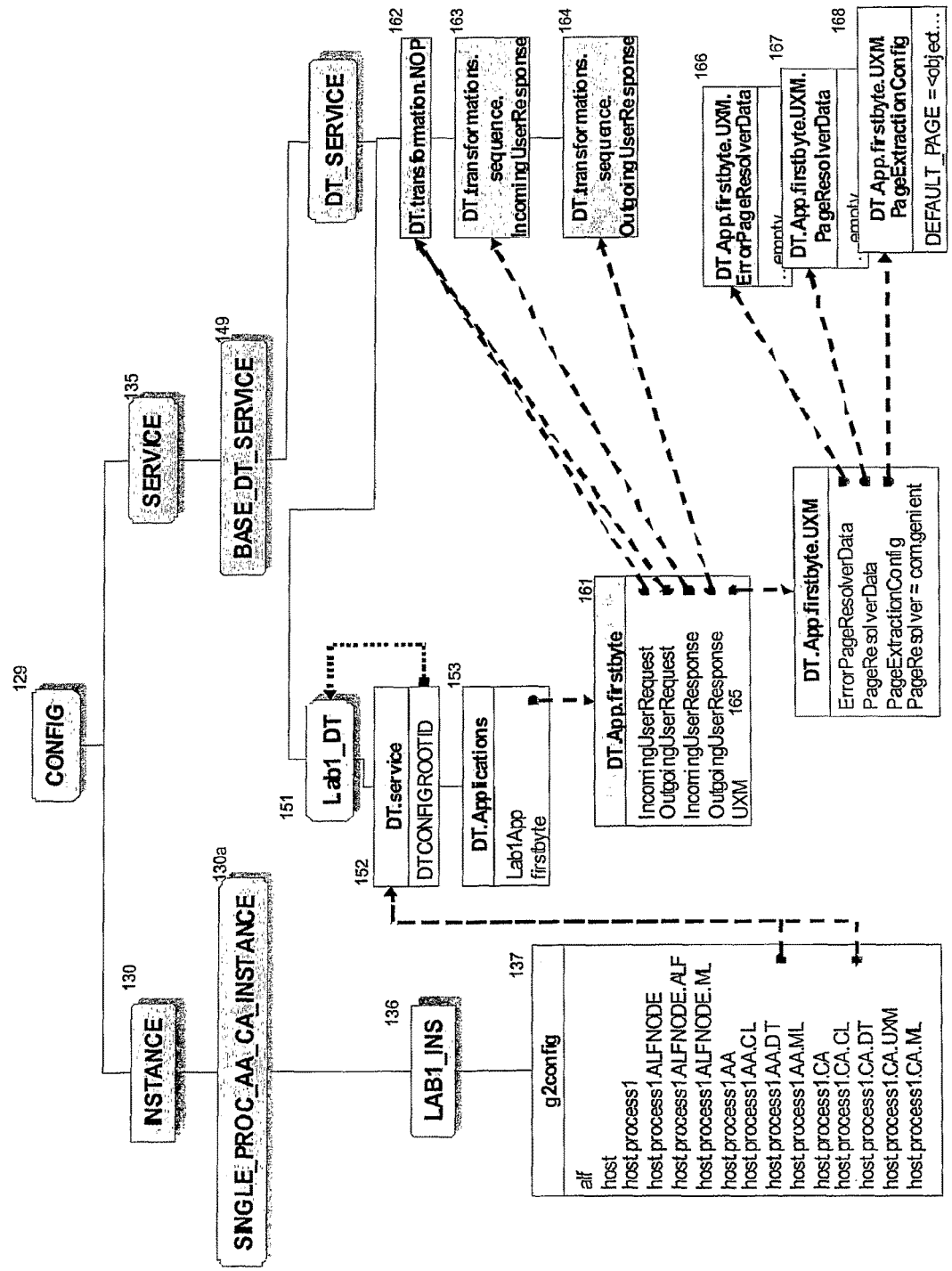

FIG. 23 shows part of the IDM data structure which holds data pertinent to the DT service of the AA node. It can be seen that the firstbyte entry in the DT.Applications data group 153 references a DT.App.firstbyte data group 161, which includes an entry for each data type which the DT service of the AA may be required to handle, that is IncomingUserRequest, OutgoingUserRequest, IncomingUserResponse, OutgoingUserResponse, and UXM objects. It should be noted that although in the example of FIG. 15 only OutgoingUserRequest and IncomingUserResponse messages are processed by the DT service of the AA. However, IncomingUserRequest and OutgoingUserResponse messages are included for the case where the composer simply passes messages between a composite application and a source application without carrying out any processing.

It can be seen that the entries in the DT.App.firstbyte datagroup 161 relating to the four message types reference appropriate data groups 162, 163, 164, which contain the necessary transformation information. The UXM entry references a DT.App.firstbyte.UXM data group 165, which includes four entries. An ErrorPageResolverData entry references a DT.App.firstbyte.UXM.ErrorPageResoverData data group 166 which contains means to recognise various error pages which may be generated by the firstbyte source application. A PageResolverData entry references a DT.App.firstbyte.UXM.PageResolverData data group 167 which contains data indicating how pages of the source applications are recognised, in order to identify necessary transformations. A PageExtractionConfig entry references a DT.App.firstbyte.UXM.PageExtractionConfig data group 168 which contains references to a plurality of Extensible Markup Language (XML) files, which indicate how each page recogniser by an entry in the PageResolverData data group should be transformed by the DT service before being passed to the UXM service of the AA.

Configuration data for configuring the UXM service 121 of the CA node 106 is now described with reference to FIG. 24, which shows the relevant parts of the IDM data structure. The highest level of the illustrated tree structure is a BASE_UXM_SERVICE entity 169 which is a child of the SERVICE entity 135 (FIGS. 20 to 23). The BASE_UXM_SERVICE entity 169 has three child entities, a CA_UXM_SERVICE 170 which represents data relevant to the UXM service 121 of the CA node 106 (FIG. 14), A UXMActionLibrary entity 171 which stores UXM action data, and a UXMPredicateLibrary entity 172 which stores predicate data.

The CA_UXM_SERVICE entity 170 has a child entity named TreeRootNode for each composite application which the UXM is able to handle, and an additional entity 173 to deal with error conditions. A TreeRootNode entity 174 represents a first composite application CompApp1, while a second TreeRootNode entity 175 represents a second composite application. Each TreeRootNode entity 173, 174, 175 has a control data group which specifies a unique identifier. In the case of the data group 176 associated with the entity 173, this identifier is simply "error", while in the case of the data groups 177, 178 an appropriate identifier is set. The control data groups additional include information which can be used to limit a particular nodes usage. Under the TreeRootNode 174 which relates to CompApp1, there are two child TreeNodes which each represent different pages of the composite user interface for CompApp1. A first child TreeNode 178 and its associated data group represent a page customer page CustPg, while a second child TreeNode 179 and its associated data group represent an order page OrderPg. It can be seen that the TreeNode 178 in turn has three child TreeNode entities 180, 181, 182, each of which represent particular parts of the customer page.

It was indicated above that the identifier within the control data group for each composite application must be unique. It should be noted that within a particular application, all identifiers must be unique within that application.

Figure 24:
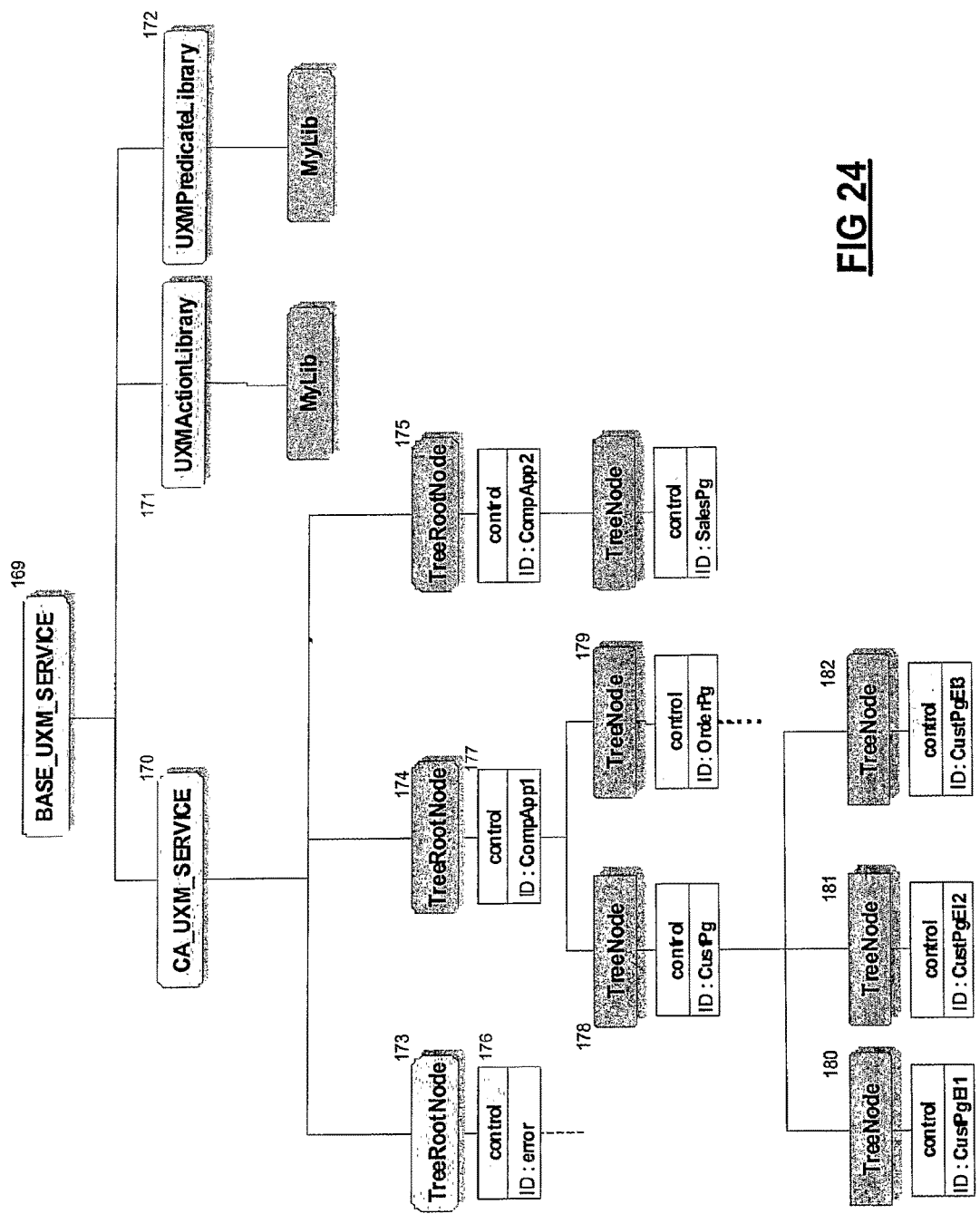
FIGS. 24, 25 and 26 are tree diagrams showing configuration data pertinent to the User Experience Manager (UXM) service of FIG. 14.
Figure 25:
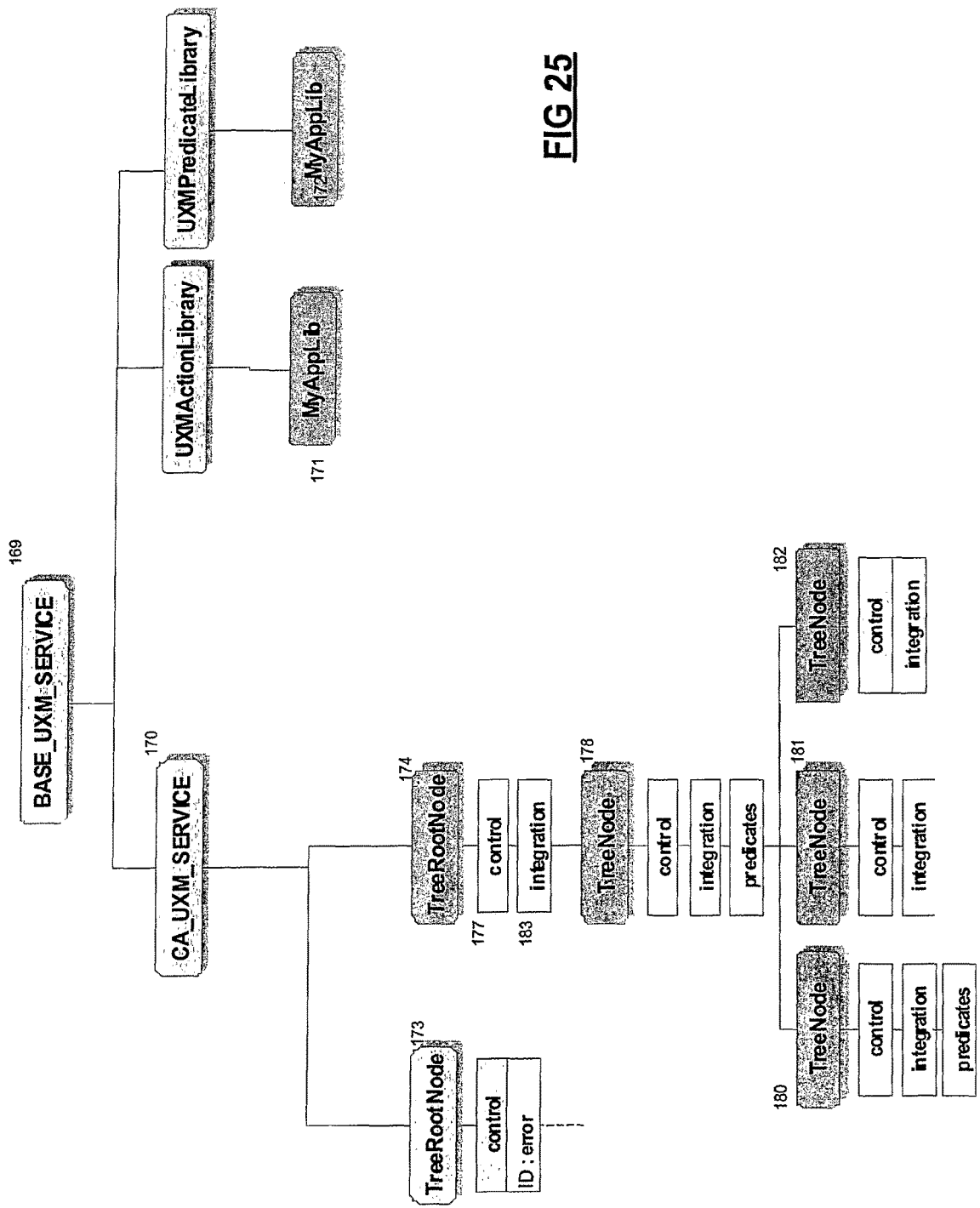

FIG. 25 shows an alternative view of the tree structure of FIG. 24. It can be seen that in addition to the control data groups described above, All TreeRootNode entities 174, 178, 180, 181, 182 additionally include an integration data group 183 which specifies the actions to be taken, if any, when a composite application of the type represented by the TreeRootNode 174 is encountered. This information is determined by data stored in a library located under the UXMActionLibrary entity 171.

Additionally, the TreeRootNode entities 178, 180 comprise a predicates data group which specifies conditions (or predicates) which need to be true for the actions specified in the integration data group to be taken. Each of these predicate data groups references a predicate library located under the UXMPredicateLibrary entity 172.

Figure 26:
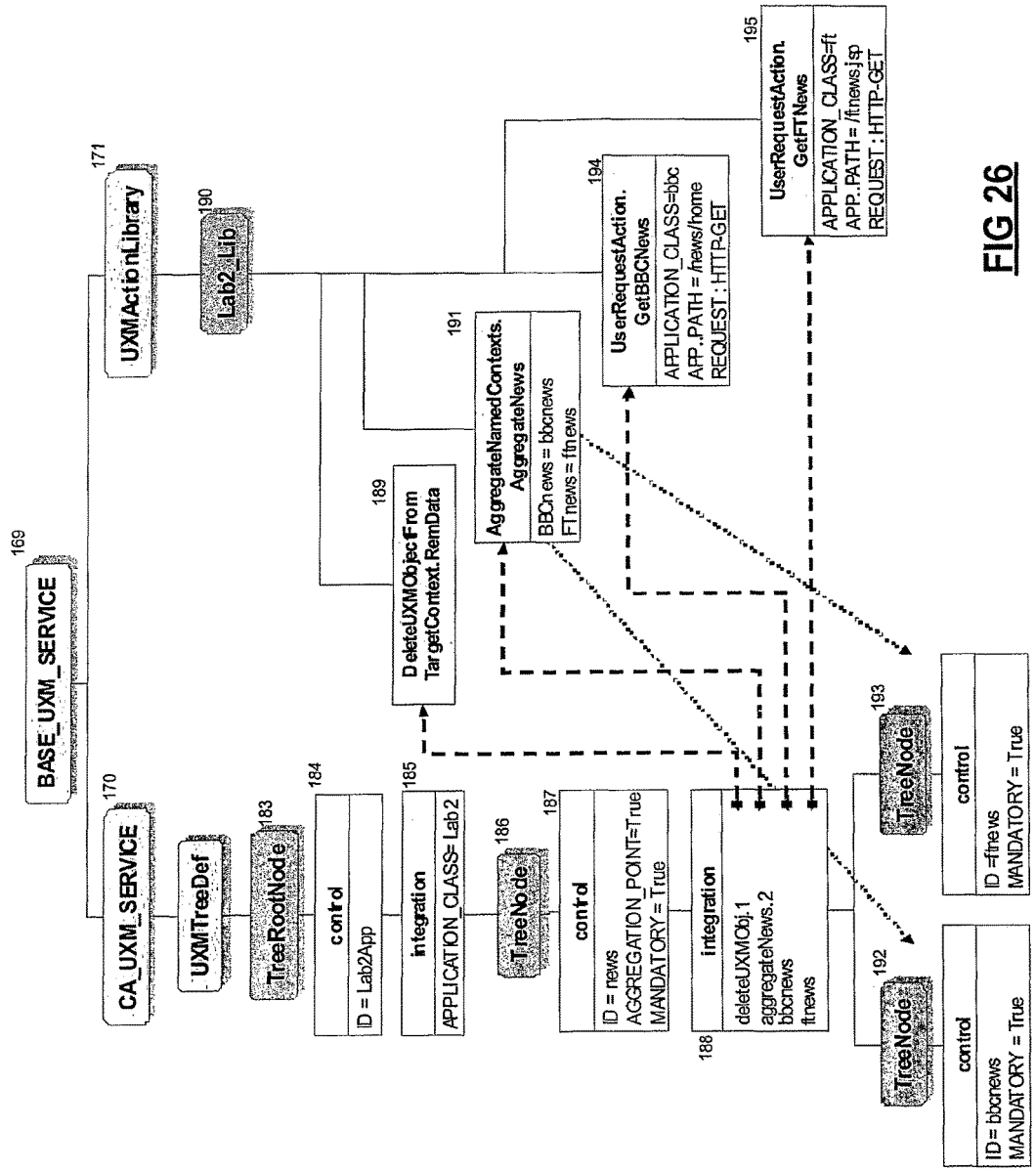

FIG. 26 shows part of the UXM configuration for a composite application Lab2App represented by a TreeRootNode entity 183. It can be seen that the TreeRootNode entity 183 has a control data group 184 and an integration data group 185. A TreeNode 186 specifies UXM data for part of the Lab2App application, and has a control data group 187 and an integration data group 188. The integration data group specifies actions to be taken in response to particular events, and these actions are specified in terms of an appropriate data group. For example, an entry for an action deleteUXMObj.1 references a DeleteUXMObjectFromTagetConext.RemData data group 189 within an action library Lab2_Lib 190 for the Lab2App application. Similarly an aggregateNews.2 entry in the integration data group 188 references an AggregateNamedContexts.AggregateNews data group 191 in the Lab2 Lib library 190. In turn, this data group references two TreeNodes 192, 193 which are child entities of the TreeNode entity 186. The other entries in the integration data group 188 reference corresponding entities 194, 195 in the Lab2_Lib library 190. Operation of the UXM in accordance with the configuration data described above is set out in further detail below.

Configuration of the ML services of the CA node 106 and the AA node 107 (FIG. 14) is now described. As indicated above, communication between processes is accomplished using JMS, and the JMS protocol is encapsulated within the ML services. Referring back to FIG. 20 it can be seen that ML entries of the g2config data group 137 reference an appropriate g2config data group 196, located beneath an ML_SERVICE 197 which is itself located beneath a BASE_ML_SERVICE entity 198. For the most part, configuration of the ML is based upon properties files, not by data within the IDM. These files can be located using invocation parameters, as described above with reference to FIGS. 16 and 17. The ML is configured using properties files instead of IDM data because much of the configuration is required at start up, before the IDM has been accessed. In preferred embodiments of the invention, a common configuration is shared by the CA node 106 and the AA node 107. JMS makes use of the Java Naming and Directory Interface (JNDI) to obtain necessary information. The properties files must therefore contain details which allow connection to the JNDI. Additionally, the properties file must include parameters which specify all necessary configuration data for the JMS implementation used to put embodiments of the invention into effect. In preferred embodiments of the present invention, the SunONE MQ3.0 JMS implementation or the OpenJMS 0.7.2 implementation are used Configuration data required will be well known to those skilled in the art, and is not described in further detail here.

However, it should be noted that some configuration parameters used in preferred embodiments of the present invention provide beneficial results. For example, it should be noted that each process within the system can send broadcast messages using a broadcast topic. Each process will have a single in queue and a broker will manage these queues ensuring that any message is sent to the in queues of all relevant processes. Additionally, each process has a persistence queue, into which messages are delivered if the in queue is unable to accept messages for any reason. This queue provides failover for the system.

Figure 27:
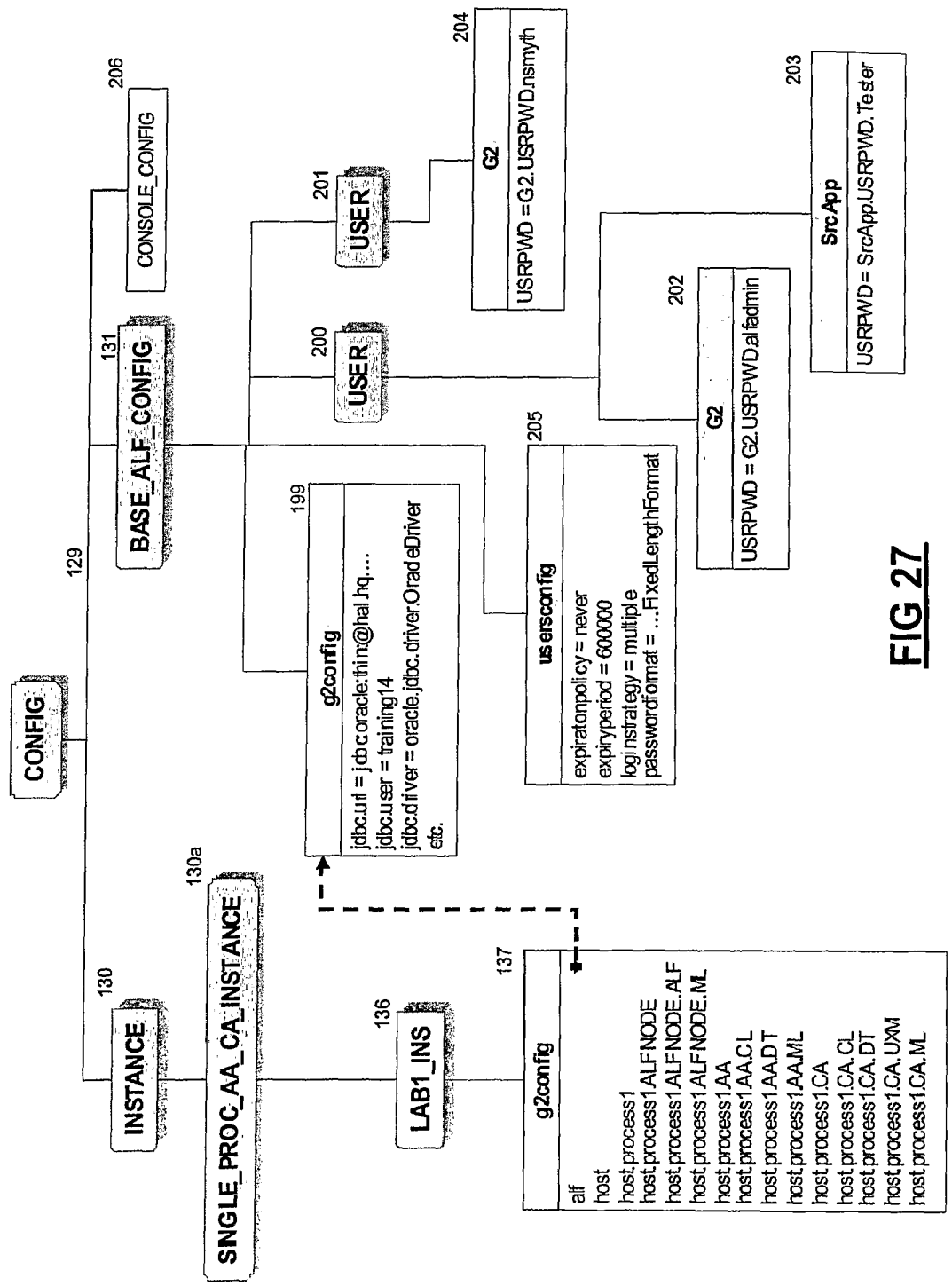
FIG. 27 is a tree diagram showing configuration data pertinent to the Application Lockdown Framework (ALF) illustrated in FIG. 14.

Having described configuration of all services of the CA node 106 and the AA node 107 (FIG. 14), configuration of the ALF service 126 of the ALF node 108 is now described. ALF configuration data is stored in the hierarchical IDM data structure, as illustrated in FIG. 27. The g2config data group 137 for the entity Lab1_INS 136 references a g2config data group 199 located beneath the BASE_ALF_CONFIG entity 131. The g2config data group 199 provides the information necessary to allow the ALF database 110 (FIG. 14) to be located. It can be seen that this data group includes details of a url for the database, a driver to be used with the database (here the Oracle™ JDBC driver) and user name for use when logging onto the database 110. It will be appreciated that other data may be required in order to properly access the database 110 and this too will be stored in the g2config data group 199.

Each user who is authorised to use a composite application will have a user entity 200, 201 which is a child of the BASE_ALF_CONFIG entity 131. The user entity 200 has a G2 data group 202 which includes a user name used by that user when logging on to composite applications provided by the composer. Additionally, the user entity 200 has a SrcApp data group 203 which includes details which are needed to log on to a source application "SrcApp". A similar data group is provided for each source application which a user is able to access. The user entity 301 has a G2 data group 204, and will also comprise one or more entries for appropriate source applications (not shown).

The BASE_ALF_CONFIG entity 131 also has a usersconfig data group 205 which specifies details relating to logging onto to the composite application, for example password format, and a frequency with which passwords must be changed. The values specified in the usersconfig data group 205 provide a default log on configuration, which is inherited by all user entities. However, this default configuration may be overridden by a usersconfig data group located below an appropriate user entity. It should be noted that similar information relating to each source application is stored as part of the configuration of the CL service within the AA node.

The BASE_ALF_CONFIG entity 131 has an additional child entity CONSOLE_CONFIG 206. This entity comprises a plurality of data groups (not shown) which state how configuration data input to the system via the administration terminal 112 (FIG. 14) is converted to ALF commands. Commands are typically received from the web browser based administration terminal 112 as HTTP requests, which are mapped to appropriate ALF commands. The administration terminal 112 is used to add users and perform other necessary administration functions related to the ALF.

Referring back to FIG. 20, it can be seen that the host.process1.ALFNODE entry in the g2config data group 137 references a g2config data group 206 located beneath BASE_ALF_ML_NODE 207. The host.process1.ALFNODE.ALF entry in the g2config data group 137 references a g2config data group 208 located beneath a BASE_ALF_SERVICE entity 209. The g2config data group 208 will allow access to the ALF database identified by the g2config data group 199 located beneath the BASE_ALF_CONFIG entity 131.

Having described configuration of all services contained within the nodes of the server 13, configuration of the listener provided by the web server 12 is now described. As indicated above, a g2listener invocation parameter specifies an entity within the IDM which is used for listener configuration. FIG. 28 shows an appropriate IDM data structure. In this case, the g2listener parameter is set such that:

g2listener=weblistener;

That is, the listener would locate a weblistener data group 210 located beneath a UAconfigs entity 211. The weblistener data group 210 indicates to where incoming requests should be directed (usually a CA service), and the name of a Java class providing authentication functions (in this case custom). The weblistener.custom data group 212 provides a mapping from request parameters to those needed for authentication.

It will be appreciated that means must be provided such that appropriate configuration data can be entered into the IDM database, to create the hierarchies described above. Specification of this configuration data is now described using a predetermined file format.

FIG. 29 shows a file which can be used to configure the CL service 119 of the CA node 106. Text shown in square brackets "[ ]" denotes an entity names within the IDM hierarchy. Text shown in triangular brackets "< >" denotes a name of a data group which is positioned beneath the appropriate entity within the IDM hierarchy. Text shown in curly brackets "{ }" denotes a parameter type. "{GRF}" indicates that a parameter is a reference to another data group. A {GRF} parameter is followed by an appropriate entity name and data group name to which it refers. "{STR}" indicates a string parameter. Parameters specified by "{INT}" and "{BLN}" can also be used, although these are not shown in FIG. 29. "{INT}" indicates an integer parameter, and {BLN} indicates a Boolean parameter.

Referring to FIG. 29, it can be seen that the file specifies a CONFIG entity, having a SERVICE entity as a child, which in turn has a BASE_CL_SERVICE entity has a child. A CA_CL_SERVICE entity is a child of the BASE_CL_SERVICE entity, and has a LAB1_SrcApps entity as a child. The LAB1_SrcApps entity has a single g2config data group which comprises a single group reference entry which references a g2config data group located beneath a FirstByte entity within the hierarchical data structure.

The file of FIG. 29 also specifies that the BASE_CL_SERVICE also has an EXT_APPS entity as a child entity, which in turn has a FirstByte entity as a child. The FirstByte entity has a single g2config data group which specifies two parameters of type string which provide authorization and protocol information relevant to the FirstByte application.

Having described configuration of the architecture shown in FIG. 14, operation of services illustrated in FIG. 14 is now described.

The UXM service 121 is responsible for receiving user requests, and generating one or more source application requests in response to the user request. The UXM service 121 is also responsible for creating composite pages.

It should be noted that the UXM uses an internal data format of UXMObjects to represent composite user interfaces and parts of such composite user interfaces. Using UXMObjects in this way allows the UXM service to operate in a manner independent of output format, and accordingly adds considerable flexibility to the system.

A UXMObject stores unstructured data, as well as attributes describing that data. A tree of UXMObjects is used to represent data for a composite user interface. It can be recalled that the structure of the composite application is described by UXM configuration data within the IDM database (see FIGS. 24 and 25). The tree of UXM objects will typically correspond to the tree structure for the UXM within the IDM, although it is important to note that the two trees are separate data structures which are stored separately.

A UXM object includes unstructured data for a particular entity within the UXM tree of the IDM database, which represents part of a composite user interface. This data is typically stored using an array of bytes. Each UXMObject also has a mode parameter and a type parameter. The mode parameter is used to indicate where within a composite document a UXMObject should be placed relative to other UXMObjects. The mode parameter can therefore take values such as before, after, replace, insert and toplevel. The type parameter is used to differentiate UXMObjects created by the UXM service from UXMObjects created from source application data. UXMObjects can therefore have types of New and Existing. Each object additionally includes a set of attributes which are associated with the unstructured data, and which either describe the data, or are used for data conversion. Each UXM object has a identifier (which can conveniently correspond to an ID within the UXM tree within the IDM, see FIG. 24), and references to parent and/or child objects if appropriate. These references to parent and/or child objects allow the UXMObjects to be used to create a UXM object tree. It should be noted that UXMObjects may also contain nested UXMObjects.

During operation, the UXM maintains a UXM tree (separate from the UXM object tree) which is based upon the configuration data stored in the IDM. This tree includes the actions, predicates and parameters which are present within the relevant entities and data groups of the IDM. Additionally, each entity within the UXM tree includes a state for each user at that node, which corresponds to a user's context.

The context for a user at a particular entity within the UXM tree will hold a state appropriate for that user for all requests which that user may make and all response which that user may receive. This is stored as a set of parameters (typically as NVPs), and by reference to a single object within the UXMObject tree.

In summary, it can be seen that the UXM essentially uses three data structures, the IDM data structure, the UXM tree and the UXMObject tree.

Information indicating how the UXM should operate in response to various requests and responses is configured within the IDM tree which at runtime is used to create the UXM tree. In addition to this information, the UXM tree also stored information relating to state of a particular user at a particular node is stored at a user's context at a particular entity within the UXM tree. Data pertaining to particular pages of the composite user interface is stored within a UXM object, and UXM objects collectively form a UXM object tree, which is separate from both the UXM tree and the IDM data structure. It can be deduced that for every entry in the UXM object tree, there must exist an entity in the UXM tree having the same identifier. The converse is not necessarily true.

Figure 30:
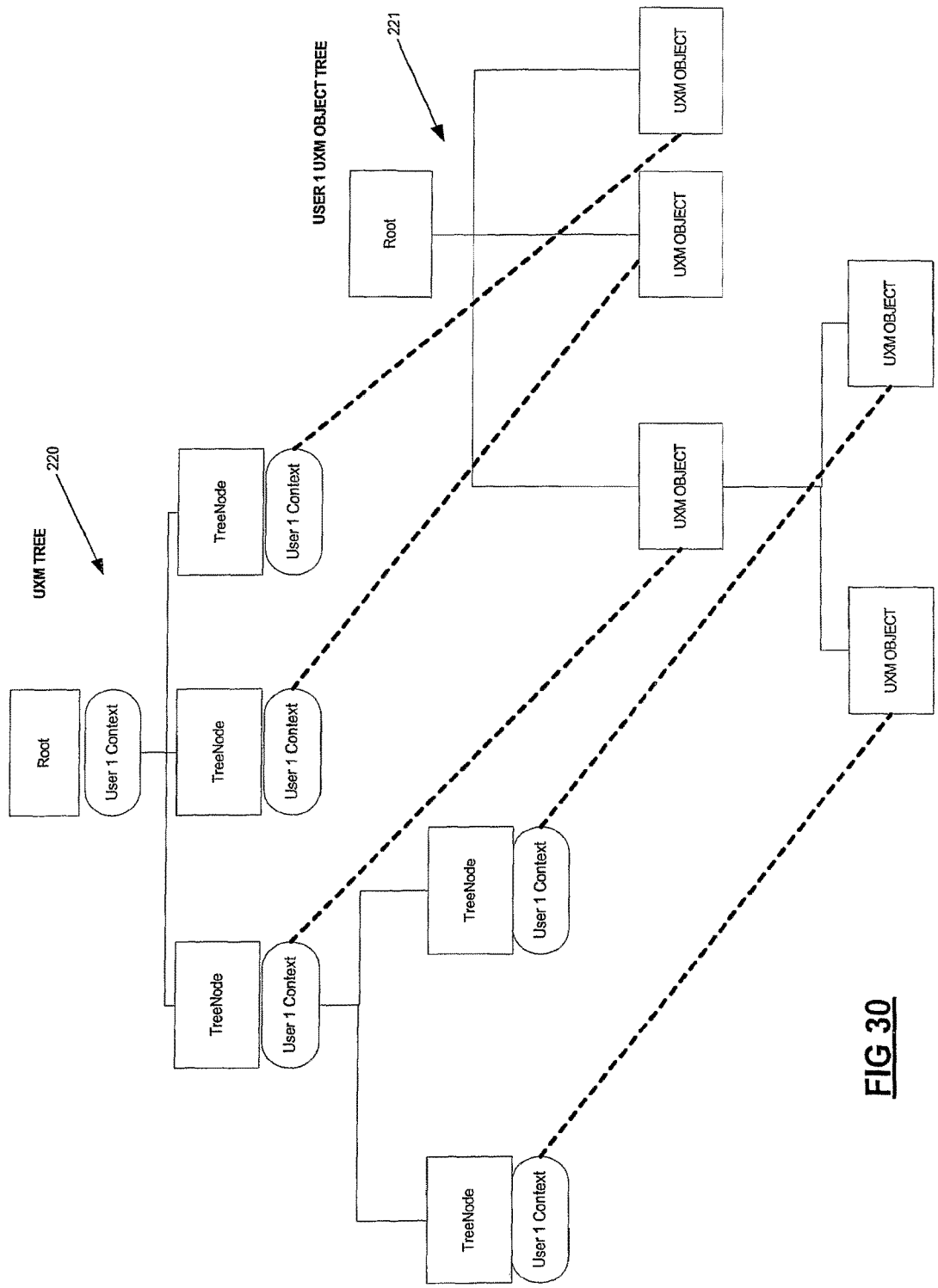
FIG. 30 is a schematic illustration showing a relationship between a UXM tree and a UXMObject tree.

FIG. 30 shows a schematic illustration of part of a UXM tree 220 and a UXMObject tree 221. It can be seen that each entity in the UXM tree 220 includes context information for User 1 The context data associated with each entity in the UXM tree 220 includes reference (denoted by a broken line) to an appropriate instance of a UXMObject in the UXMObject tree 221. It can be seen that the UXM tree 220 and the UXM Object tree 221 have the same structure. It will be appreciated that in many embodiments of the present invention respective context data will be stored for a plurality of users, and each of the plurality of users will have a respective UXM object tree.

When describing the IDM data structure, it was explained that actions were executed if predicates were satisfied. Predicates which may appear in predicate data groups within the IDM are now described.

Some predicates are based on a user's log on credentials. Users may be allocated to one of a plurality of roles, and a RoleAuthorisedGuardCondition predicate entry specifying a particular role may be included in a predicate data group. This predicate will be satisfied only if a user's role matches the specified role. Similarly a RoleNotAurthorisedGuardCondition is satisfied only if a user's role does not match that specified by the predicate.

Some predicates are based on a NVP within a user's context at a given entity within the UXM tree. A CompareNVPValueGuardCondition predicate compares a specified NVP at a specified entity within the UXM tree with a specified NVP at a different entity within the UXM tree. The predicate has a parameter indicating whether it should should evaluate to TRUE for equality or inequality.

A RegexNVPMatchGuardCondition predicate takes a regular expression as a parameter, and evaluates to true if a specified NVP at a specified entity within the UXM tree matches the regular expression.

An NVPEqualsGuardCondition predicate checks a value of a specified NVP in a user's context at the current entity against a value specified as a parameter, and evaluates to TRUE in the case of equality. An NVPNotEqualsGuardCondition predicate performs the opposite function to an NVPEqualsGuardCondition predicate—that is it evaluates to TRUE in the case of inequality.

An NVPExists predicate checks if a specified NVP exists within the user's context at the current entity within the UXM tree. If the NVP does exist, the predicate evaluates to TRUE. An NVPNotFound fulfils the opposite function to an NVPExists predicate, that is, it evaluates to TRUE if a specified NVP does not exist at the current node.

Various other predicates can also be specified. A RemoteServiceCredentialFound-GuardCondition predicate determines whether a user's context at a specified entity within the UXM tree includes log on credentials for a specified external system (e.g. a source application). If the service credential exists, the predicate evaluates to TRUE. A RemoteServiceCredentialNotFoundGuardCondition predicate performs the opposite function, that is it evaluates to TRUE if a user's context at a specified node does not include a service credential for the specified external system.

ExternalIDs are used by the UXM to identify data elements within external applications, such as source applications. Some actions provided by the UXM are concerned with creating and using ExternalIDs. The UXM maintains mappings between ExternalIDs, and internal IDs used within the IDM.

An ExternalIDFoundGuardCondition predicate evaluates to TRUE if a user's context at a specified node includes a specified ExternalID. An ExternalIDNotFoundGuard-Condition predicate evaluates to TRUE if the specified ExternalID is not found. A NodeGuardCondition takes a plurality of entity ID's as a parameter, and evaluates to TRUE if the ID of a specified entity matches one of the plurality of specified IDs.

A DataReady predicate checks if data (usually an UXMObject) is present at a specified entity within the UXM tree. This predicate is used to ensure that data necessary for aggregation (see below) is present at a given entity within the UXM tree.

A FalseGuardCondition predicate, and a TrueGuardCondition predicate may also be specified. A FalseGuardCondition always evaluates to FALSE effectively ensuring that the associated actions are never executed. A TrueGuardCondition always evaluates to TRUE ensuring that the associated actions are always executed.

A first task performed by the UXM service 121 is to generate requests to source applications following receipt of a request for a user. Operation of the UXM in performing this task is now described.

When a UserRequest message is received by the UXM service 121 (usually from the DT service 120), a UXM_MODIFIED parameter within the message is checked. If this is set to FALSE, the message is directed to a source application without processing by the UXM. It this is set to TRUE processing is carried out as follows and a UserRequest event is generated.

The UserRequest event causes the UXM to locate within the IDM the entity specified by the UXM_NODE_ID parameter. This entity then becomes a user's active aggregation point. In this case that node is the TreeNode 178. Any predicates specified in a predicate data group associated with that node are then checked. Assuming that all predicates are satisfied, the actions referenced by the entries of the integration data group (as defined by their respective data groups) are then carried out. The UXM traverses down through the UXM tree evaluating predicates and executing actions associated with each entity, each entity encountered typically providing a list of actions, one or more of which may reference an appropriate source application. Details of actions which may appear in an integration data group are set out below.

Actions are in general associated with a single event type. However, it is possible to override this associated by using an EVENTMASK parameter is an action's data group. This parameter is an N-bit binary value and is set such that each bit represents a different event, and that the action is associated with all events for which the respective bit is set to '1'—four example if four actions are used to trigger actions, the EVENTMASK parameter should be a four-bit binary value.

Actions typically associated with a UserRequest event are now described.

A UserRequestAction is by default associated with a UserRequest event, but may be associated with other events by using the EVENTMASK parameter in the manner described above. This action generates a new source application request which is targeted to the APPLICATION_CLASS of the source application. A request will be a made to each source application which is required to produce the composite page.

The entries in an UserRequestAction data group specify information relevant to creating a request(s) for sending to particular source application(s), however it should be noted that details relating to connection to that application are not included, as these are specified by the CL service 123 of AA node 107. Each source application request will include only information specified by the relevant action data group, and will not necessarily include parameters present in the IncomingUserRequest message.

A source application request will include an APPLICATION_CLASS parameter which specifies an application class name for the source application, and an APPLICATION_PATH parameter, which specifies a path for locating the application. Additionally, a source application request may include a request method indicating how data should be requested. This parameter may take a value such as HTTP_GET in the case of a HTTP request. The message additionally includes a string comprising zero or more parameters which are picked up from the current context. If this parameter is the empty string, then no values are added to the source request.

A DeflectUXMRequest action is again associated with a UserRequest event by default, although this association can be overridden using an EVENTMASK parameter as described above. A DeflectUXM action generates a source application request of the type described above, but here the parameters for that request are obtained from the IncomingUserRequest message, not from the current context. This action is usually triggered to re-use an original user request message, and the UXM merely decomposes the message into parts relating to different pages of the source application.

A UXMRequestLink action is associated with a UserRequest event, and cannot be overridden by using the EVENTMASK parameter in the manner described above. This action triggers a UserRequest event on an entity within the UXM tree identified by a TARGETNODE parameter. The receiving entity will then respond to the UserRequest event as specified by its UXM entries. This action effectively adds an aggregation point to the UXM Tree.

A JumpToTreeNode action is again associated with a UserRequest event, but can be overridden using the EVENTMASK parameter. This action jumps to a different branch of the UXM tree structure, and causes a UserRequest event on an appropriate entity. This differs from the UXMRequestLink action described above in that the current aggregation point is removed, and replaced with the specified target aggregation point.

A number of actions are concerned with manipulating values (typically name, value pairs (NVPs)) within the current UXM context. A CopyNVPAction action is associated with a UserRequest event, but can be overridden using the EVENTMASK parameter as described above. A CopyNVPAction action copies sets an NVP at a specified target node to a value obtained from a specified source entity. The action includes identifiers of both the source and target entities, and details of the source NVP and target NVP within those entities. If a target NVP is not specified, as a default, it is assumed that the target NVP is the same as the source NVP. Optionally, a prefix and/or suffix may be specified which is prepended or appended to the source NVP when it is copied to the target NVP.

A ConcatenateNVPAction action is again associated with a UserRequest event but can be overridden by the EVENTMASK parameter. This action concatenates a plurality of NVPs at a source entity and copies these to a specified NVP at a target entity. The action takes as parameters a source entity identifier (which defaults to the current entity if not specified), a target entity identifier, a comma separated list of names from NVPs which are to be concatenated, and the name of an NVP to be created at the target entity. The value assigned to the created NVP will be the concatentation of the values from the NVPs in the comma separated name list.

An AddSequenceListener action is associated with a UserRequest event but can be overridden using the EVENTMASK parameter if necessary. This action sets the context of the current entity as a sequence listener of an entity specified by a TARGETNODEID parameter.

A StoreRemoteServiceCredential action is associated with a UserRequest event but can be overridden using the EVENTMASK parameter if necessary. This action allows information about a remote service (e.g. a source application) to be stored as a parameter in the context of the current entity. The information is stored as a NVP, and is typically security information related to a source application. The action includes a REMOTE_SERVICE parameter which is an identifier for a remote service (e.g. a source application), and a CRED_TYPE parameter which is used to indicate the type of credential being stored. The CRED_TYPE parameter can be set to USRPWD or IDONLY. If CRED_TYPE is set to USRPWD, the NVP stores both a username and a password. If it is set to IDONLY, only a username is stored. The name of the NVP is of the form "credential.<remote_service>.username|password", where <remote_service> is an identifier obtained from the REMOTE_SERVICE parameter.

Having generated one or more source application requests in response to UserRequestAction actions and/or DeflectUXMRequest actions (in addition to carrying out any other actions which may be nessary), the created source application requests are used to create OutgoingUserRequest messages which are then usually targeted to a DT service 124 of an AA node.

A second function of the UXM is to compose responses received from source applications to form the composite application. The UXM service of the CA node generally receives source application responses from the DT service 124 of the AA node 107. An outline of the actions carried out by the DT service 124 of the AA node 107 is now presented, to aid understanding of the operation of the UXM.

The DT service 124 of the AA node 107 recognises pages returned by source applications using predefined rules. The recognition process is described in further detail below, but it should be noted that the DT attempts to recognise normal pages first, then error pages. Assuming that the page is recognised a UXM object tree representing that page is generated.

Figure 31:
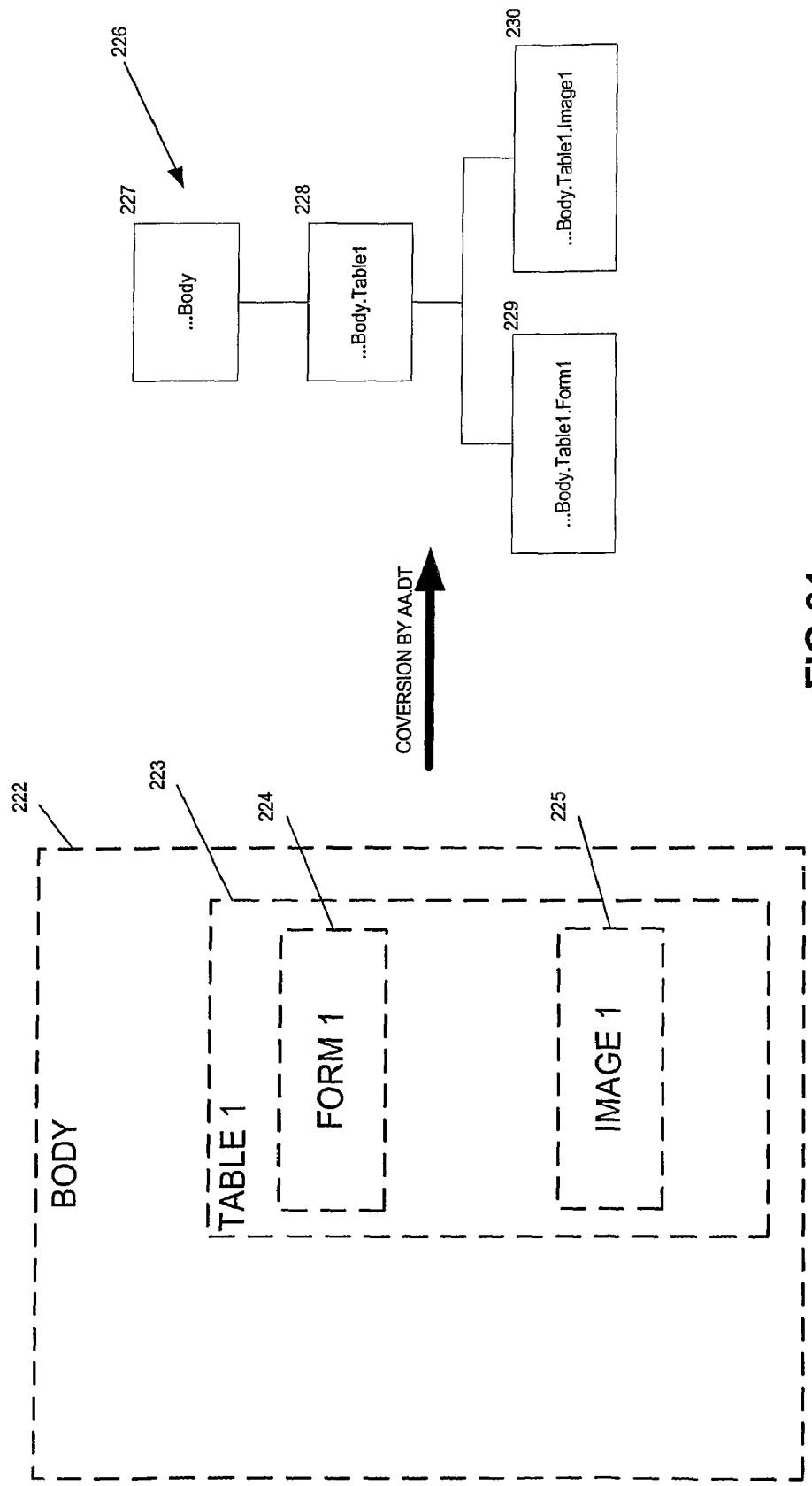
FIG. 31 is a schematic illustration showing how a HTML document may be converted into a plurality of UXM objects.

Referring to FIG. 31, there is illustrated a simple example conversion which may be carried out by the DT service 124 to generate an appropriate UXM object tree. A HTML document 222 comprises a table 223, which in turn comprises a form 224 and an image 225. The DT service generates a UXM object tree 226 from this HTML document. The UXM object tree 226 comprises four UXM objects, one for each element of the HTML document 222. It can be seen that these UXM objects are hierarchically arranged such that a . . . Body object 227 is at the root of the tree, a . . . Body.Table1 object 228 is a child of the . . . Body object, and a . . . Body.Table1.Form object1 229 and a . . . Body.Table1.Image1 object 230 are children of the . . . Body.Table1 object 228. Thus, the hierarchy of the UXM object tree 226 mirrors that the of the HTML document 222. It should be noted that each entry in the UXM object tree 226 is prefixed by " . . . " to indicate that in practical embodiments of the invention, the names of entries are prefixed by an appropriate source application name. Operation of the DT service 124 is described in further detail below.

Having created the plurality of UXM objects, these are sent to the UXM service 121 of the CA node 106.

A message is received by the UXM from the CA service of the AA node 107. If the message comprises one or more UXM objects, a UserResponse event is generated by the UXM. UXM objects may be nested within a received message, and in such a case the UXM unnests the received UXM objects to create individual UXM objects as appropriate. The created individual UXM objects are then copied to the user's context at the appropriate entity of the UXM tree structure and form the UXMObject tree. The appropriate entity can be identified using the ID parameter of the received UXMObject which, as described above, will correspond to the ID of an entity within the UXM tree.

The UserResponse event causes the UXM to traverse the UXM tree beginning at the entity specified by the ID parameter of the received UXMObject. For each entity within the tree which is processed in this way, the UXM determines if all predicates (specified in appropriate predicate data groups) are satisfied for each entity. If the predicates are satisfied for a given entity, the actions associated with that entity (as specified in an actions data group) are executed. Details of actions which are generally associated with UserResponse events are now described.

A RegexTransformNVPValue action is by default associated with a UserResponse event, although this association can be overridden using the EVENTMASK parameter as described above. This action sets a NVP within the user's context, for a target entity within the UXM tree. The action specifies a SOURCENODEID parameter which defaults to the current entity if not specified, an a mandatory SOURCENAME parameter which specifies an NVP within the source entity. The action may optionally specify TARGETNODEID parameter identifying a target entity and a TARGETNAME parameter identifying a NVP within the target entity. If these are not specified, the TARGETNODEID is set to be equal to the SOURCENODEID and/or the TARGETNAME is set to the equal to the SOURCENAME. The action also includes a REGEX parameter which specifies a regular expression which is applied to the source NVP to generate the target NVP.

Regular expressions will be well known to those skilled in the art as a way of manipulating strings within computer programs. In the case of the present invention regular expressions of the type used in the Perl5 programming language are preferably used, although it will be readily apparent to those skilled in the art that regular expressions of different formats can also be used in embodiments of the present invention.

A CopyUXMObjetValueToTargetContext is again associated with a UserResponse event, but can again be overridden using the EVENTMASK parameter as described above. This actions sets an NVP in a user's context at target entity within the UXM tree. The value to which the NVP is set is taken from a UXM object at a source entity. The action takes SOURCENODEID and TARGETNODEID parameters which respectively specify source and target entities within the UXM tree. If these parameters are not set, by default the current entity is used. The action has a mandatory TARGETNAME parameters which specifies an NVP within the target node which is to be set.

A SetUXMObjectProperties action is again associated with a UserResponse event, but can be overridden as described above. The action specifies a plurality of NVPs which are set within the UXM object at the current entity of the UXM tree.

A SetTargetUXMNode action is associated with a UserResponse event, but can be overridden using the EVENTMASK parameter. This action sets attributes of a UXMObject at an entity specified by an ACTIONTARGET parameter, which defaults to the current entity if no value is specified. The UXM object specified by the ACTIONTARGET parameter is updated so that it points to a UXMTreeNode relating to a different entity within the UXM object tree specified by a mandatory TARGETNODE parameter.

A CopyUXMObjectToTargetContext action is again associated with a UserResponse event but can be overridden. This actions sets the UXMObject at an entity specified by a SOURCENODEID parameter to point to the UXMObjects specified by an entity given in a TARGETNODEID parameter. The SOURCENODEID parameter is optional, and defaults to the current entity if not specified.

A RelocateUXMObject action is associated with a UserResponse event and cannot be overridden using the EVENTMASK parameter. This action sets the mode parameter within a UXM object associated with an entity specified by a TARGENODEID to "Relocate", and results in the object being relocated (i.e. moved rather than copied) to a new parent.

A DeleteUXMObjectFromTargetContext action is again associated with a UserResponse event but can be overridden. This action deletes the UXM object associated with the entity specified by a mandatory TARGETNODEID parameter.

A ConditionalCopyOfUXMChildObjectToTargetContext action is associated with a UserResponse event but can be overridden. This action compares a value of an NVP specifed by a SOURCENVPNAME within the context of the current entity with the same NVP in an entity referenced by a CHILDNODETOCOMPARE parameter. If the comparison is such that a predetermined condition is satisfied, a UXM object identified by a CHILDNODETOCOPY parameter is copied to the context of an entity identified by a TARGETNODEID parameter. It should be noted that the parameters CHILDNODETOCOMPARE and CHILDNODETOCOPY are specified relative to the current entity, and not as absolute path names.

A CopyUXMObjectValue action is again associated with a UserResponse event and cannot be overridden using the EVENTMASK parameter. This action copies values from a UXM object present at an entity identified by a SOURCENODEID parameter to a UXM object present at an entity identified by a TARGETNODEID parameter.

A CopyUXMObjectValueFromTargetContext is again associated with a UserResponse event but can be overridden. This action will copy a value of an NVP identified by a SOURCENVPNAME parameter in the context of an entity identified by a SOURCENODEID to a UXM object at an entity identified by a TARGETNODEID parameter.

A RegexTransformUXMObjectValue is by default associated with a UserResponse event but this can be overridden using the EVENTMASK parameter. This action retrieves a UXM object from an entity identified by a SOURCENODEID parameter, applies a regular expression specified by a REGEX parameter and writes the resulting value to an entity identified by a TARGETNODEID parameter.

A UXMObjectNotification action is associated with a UserResponse event and cannot be overridden. It takes no parameters. It copies a UXMObject from a current context to the child of an active aggregation point having the same name. For example, if the action is associated with an entity having a path S1.A1.A2 and the active context is S1.C1, the id of the current entity (i.e. A2) is used to locate an entity within the active context which should refer to the UXM object. In this case, that is S1.C1.A2.

Those actions which relate to manipulation of ExternaIIDs and which are by default associated within a UserResponse action are now described.

A LoadExternalID action can have its association overridden using the EVENTMASK parameter described above. This action retrieves an ExternalID which is specified by an EXTERNALENTITYCLASS parameter and an APPLICATION_CLASS parameter from the current context, and writes this value to a UXM object associated with the current context.

A StoreExternalID action can again have its association overridden by use of the EVENTMASK parameter. This action saves the value of the UXM object associated with the current entity as an ExternalId having an application class identified by an EXTERNALENTITYCLASS parameter.

A ClearExternalIDs actions can be overridden, and clears all external ID's from the context of an entity identified by a SOURCENODEID parameter.

Having traversed the tree, and executed all actions for which predicates are satisfied, execution returns to the user's active aggregation point (i.e. the entity within the UXM tree which received a UserRequest event to trigger the source application requests which in turn generated the response from the AA). Each node of the UXM tree beneath the node which received the UserRequest event is interrogated to ascertain whether or not it has received its UXM object. When all entities beneath the entity which received the request have received their objects, a UXMAggregate event is created to cause aggregation.

It should be noted that in preferred embodiments of the present invention, each node in the UXM tree can specify that a UXM object is mandatory or optional within its control data group using a Boolean is Mandatory variable, which defaults to FALSE where not specified. In such embodiments, a UXMAggregate event is created as soon as all mandatory UXMObjects are present. However, in alternative embodiments of the invention it may be desired to await all mandatory UXM objects, then apply a predetermined time out, after which aggregation is carried out using those objects which have been received.

A UXMAggregate event causes the UXM to traverse all entities which are children of the current entity, and execute all actions specified in the integration data group which are triggered by a UXMAggregate event. Some actions which are associated with UXMAggregate events are now described.

An AddUXMObjectAction action is by default associated with a UXMAggregate event, but this can be overridden using the EVENTMASK parameter described above. This action creates a new UXMObject and adds this to an entity identified by a TARGETNODEID parameter. This action therefore allows UXMObjects to be created at any point in the UXM tree. An OBJECTID parameter specifies a name for the new UXMObject, and OBJECTTYPE and MODE parameters specify the created object's type and mode as described above. A RELATIVETO parameter allows the TARGETNODEID to be specified relative to a an entity specified by the RELATIVETO parameter, although if RELATIVETO is not specified, it defaults to the top level.

As described above, the AddUXMObjectAction action creates a new UXM object at a target entity. An INSIDE-TARGET parameter allows configuration of what should happen if a UXM object already exists at the target entity. If the parameter is not specified, and the UXM object already at the target entity is of type "container" the current object is provided as a child of the existing UXM object at the target entity. If the INSIDETARGET parameter is set to TRUE, the new UXMObject is set as a child of the existing UXM object. If the INSIDETARGET parameter is set to FALSE, the existing UXM object becomes a child of the new UXM object at the target entity.

A CreateUXMObject action is by default associated with a UXMAggregate event, but this can be overridden using the EVENTMASK parameter as described above. This action creates a new UXMObject and adds it to the user's context at the targeted entity. It should be noted that everything which can be achieved using a CreateUXMObject action can be created by an AddUXMObjectAction which has appropriate parameters. That is the CreateUXMObject action can be thought of as an AddUXMObjectAction with some hard-coded parameter values.

An AggregateChildObjects action is by default associated with a UXMAggregate event. This cannot be overridden using the EVENTMASK parameter described above. This action is essential to creating composite user interfaces. It aggregates all UXMObjects at contexts of entities which are children of a target entity, and creates a new UXMObject at the targeted context. Any UXMObjects which have a mode set to delete are ignored for the purposes of this action, all others are inserted as nexted UXMObjects. A parameter for the action specifies the target entity.

An AggregateNamedContexts action is by default associated with a UXMAggregate event, but this can be overridden using the EVENTMASK parameter described above. This action allows zero or more entities to be specified, and the UXMObjects associated with each of those entities are aggregated to form a new UXMObject at an entity specified by a TARGETNODEID parameter.

A DeleteUXMObjectAction action is by default associated with a UXMAggregate event, but this can be overridden using the EVENTMASK parameter described above. This action will set any UXMObjects present at an entity defined by a TARGETNODEID parameter to have a Mode of Delete, meaning that it will not be included in aggregation actions (see above). It should be noted that this action does not delete objects, but simply sets their mode parameter to have a value delete.

An AddHTMLElementAction action is by default associated with a UXMAggregate event, but this can be overridden using the EVENTMASK parameter described above. This action is used to inset a HTML element into a UXMObject in the context of an entity identified by a TARGETNODEID parameter. In order for this action to work, the UXMObject must have a type parameter as specified by an ENUMERATED_HTML_ELEMENT_TYPE parameter within the AddHTMLElementAction action. Possible values for the ENUMERATED_HTML_ELEMENT_TYPE parameter are html_radiobuttongroup, html_checkboxgroup and html_dropdownlist. An AddHTMLElementAction also takes parameters which specify a name, a value and text for the HTML element. For each type of HTML element further parameters relvenat to that element may be specifed by the AddHTMLElementAction.

If a UXMObject at a target context has a type of html_radiobuttongroup, an AddHTMLRadioButton action is by default associated with a UXMAggregate event, but this can be overridden using the EVENTMASK parameter described above. This action adds a radio button to the radio button group represented by the UXMObject.

Having executed all actions appropriate to a UXMAggregate event, the entity within the UXM tree which received the user's request has a UXMObject which represents the requested composite page, which can be passed to the DT service 120 of the CA node 106.

It should be noted that UXMObjects are passed between services by creating an XML representation which is then used as a payload of a message to be transferred between services. This is achieved using a to XML method provided by a UXMObject.

It should be noted that the UXM comprises further functionality in addition to that which is described above. Actions triggered by various events have been described above. It should be noted that some actions may by default be associated with no particular event, and in such cases the EVENTMASK parameter must be used to determine association.

The UXM service 121 allows JavaScript scripts to be associated with given entities within the tree, and these scripts can be executed by inclusion in an action data group, in the manner described above. The JavaScript is interpreted by the UXM at run time, and executed to perform the necessary functions. It will be appreciated that scripts may need to communicate with the UXM to obtain relevant data. This is achieved by providing a UXMRUNTIME object which can be accessed by scripts.

Methods exposed by a Java object can be invoked directly from a script, assuming only that the script has the Java object's identifier. The methods exposed by a UXMRUNTIME object allow scripts to be effectively created.

A UXMRUNTIME object allows various operations to be carried out on UXM objects specified by a path within the UXM tree. This path is a string comprising the name of an entity prepended by a '.' prepended by the name of its parent entity, which in turn is prepended by a '.' and its parent entity name. For example the string "MyTRN.page1.FormElement" denotes an entity "FormElement" which has as its parent an entity "page1" which is a child of a TreeRootNode entity "MyTRN". It should be noted that fully specified paths must always be used within UXM scripts. This is because a UXM script is not considered to be executed from a particular entity within the UXM tree, and accordingly a relative path will have no well defined meaning.

Methods provided by the UXMRUNTIME object are now described.

A prepareUXMObject method takes a path of the form described above as a parameter and allows the UXMObject specified by the path to be accessed by the script. The thread in which the script is executing is blocked until the UXMObject is returned, and the UXMObject's availability can therefore be assumed. This method will effectively trigger a UserRequest event on the node specified by the path parameter, and it is therefore important to ensure that nodes which are to be used in this way by scripts are provided with actions triggered by UserRequest events. An entity targeted by this method is typically a source page, and this method effectively creates a request to fetch the source page, which is subsequently provided to the script. If the UXMObject cannot be provided to the script for any reason, an error field within the UXMRUNTIME object will contain details of any exception which was thrown. The error field of the UXMRUNTIME object should therefore be checked (see below) before attempting to the use the requested UXMObject. A prepareUXMObjects method functions analogously to prepareUXMObject, but takes an array of paths as its parameter, and returns all requested UXMObjects.

A getUXMObject method retrieves a UXMObject from an entity specified by a path parameter. A setUXMObject method sets a UXM object at a specified entity to a UXMObject provided by a parameter of the method.

The UXMRUNTIME object provides various methods for accessing and manipulating NVPs at a given entity within the UXM tree. A setNVP method allows a specified NVP to be set to a specified value at a specified entity within the UXM tree. A getNVP method allows the value of a specified NVP to be obtained from a specified entity. A clearNVPs method allows all NVPs to be cleared from a specified entity. A getRequestParameter returns the value of a request parameter at a specified entity in the UXM tree.

It was mentioned above that the UXMRUNTIME object includes a field in which details of any errors are stored. A hasException method returns a value indicating whether or not an exception occurred during processing, and a getException method returns details of any exception that occurred.

Error details may also be stored within a user's context at an entity of the UXM tree. Various methods are provided to access such error details A getErrorDetail method gets details of such an error message from an entity specified by a path parameter. A requestHadError method returns a value indicating whether or not an error occurred. A getErrorLodation returns the name of a service (e.g. UXM, DT, CL) at which the error occurred.

A getErrorMessage method returns details of the error message generated, and getMajorErrorCode and getMinorErrorID methods return details of error codes. All these methods take a path specifying an entity within the UXM tree as a parameter.

In general terms, scripts can be used to replace the mechanisms described above for carrying out aggregation. When a script is used an integration data group will typically contain a single entry referencing an action data group for the script within an action library which contains a script name and details of the script.

If a script is used for aggregation, it will be appreciated that it is important to ensure that a mechanism is provided such that the script knows when all necessary source pages have been received by the UXM as UXMObjects. This is provided by a ScriptResponseNotification action, which is provided in an action library, and included in the integration data group of each source page, and which is triggered after processing of a UserRequest event.

The runtime memory space of the script will include details of all requested source pages. When a UXMObject corresponding to a source page is received by the UXM the UXMRUNTIME object is updated by the ScriptResponseNotification. The UXMRUNTIME object in response to the ScriptResponseNotification then updates the runtime memory space of the script.

It should be noted that when scripts are used, two parameters which may be specified in the control data group associated with an entity are of some importance. An EVENTORDER parameter controls the order in which child entities are processed. A HANDLEERROR parameter needs to be set to TRUE, so as to allow the script to process any errors that may occur during execution, instead of the global error handling generally provided by the composer.

The scripting functions described above are provided by the Bean Scripting Framework (BSF) which is provided by the Java programming language. This framework allows a number of different scripting languages to be used, although as described above, JavaScript is used in preferred embodiments of the present invention. It should be noted that on first execution the JavaScript script will be complied to generate Java Byte Code which can be interpreted by a Java Virtual Machine. It will therefore be appreciated that a script will take longer to execute on its first execution.

Operation of the DT service is now described. The DT service includes a plurality of transformation engines which may be applied to data to cause data transformations. The transformation engines are stateless, and a single instance of each engine exists within a particular DT service. These transformation engines are now described in further detail.

An APICallExternalizer translates data from internal representations to external representations using ExternalIDs described above and such data can then be used by the CL service to generate API calls. A DOMtoString transformation engine converts a DOM object representing an HTML file (typically received from a source application) into a string.

An IDExternaliser transformation engine and an IDInternalizer transformation engine respectively convert internal IDs to external IDs and external IDs to internal IDs. The DT service includes some transformation engines to process and correct HTML provided to it. A HTML TagBalancer tag balances incoming HTML to produce well formed HTML as output. A HTMLTidy transformation engine makes use of Jtidy to correct malformed HTML, and ensures that the output is XHTML compliant.

A JavaSpecializedEngineExecutor transformation engine executes specialized transformations that are hardcoded into a Java class. The Java class specified for this engine must implement a predefined JavaEngine interface specifying a single execute( ) method which is used to transform data, so that it can be known that the Java class will include this method which is required for transformation.

A Marshaller transformation engine makes use of the Castor framework to convert Java objects into XML, as described at http://castor.exolab.org. This engine can be used for generic transformations.

A PageResolver transformation engine recognizes response pages and applies appropriate extraction configuration. It first tries to recognize normal pages, then error pages and finally applies a default extraction if no match is found.

A RegEx transformation engine takes a string input, applies a regular expression to it and returns a string as output.

A RegexAggregator transformation engine is used to insert new user interface elements into a user interface. The configuration of this engine is a single regular expression string. Some regular expressions have special meanings, and will be substituted before the regular expression is applied:

_VALUE_ is replaced by the value of the OBJECT ID parameter in the engine definition data-group.

_NAME_ is replaced by the value of the NAME parameter in the engine definition data-group.

A RegexExtractor transformation engine is used to extract user interface elements in UXM format using regular expressions. It also marks up the input string where the string fragment was extracted.

A UIAggregator transformation engine is used to aggregate the UXM user interface data into a form suitable to return to the user. It is typically only used in the CA.DT. A UIExtractor transformation engine converts the incoming response page into UXM Objects which can be forwarded to the UXM service. This is used in the AA.DT.

An Unmarshaller transformation engine makes use of the Castor framework to convert XML into Java. A UxmObjectDecomposer transformation engine is used in the process of aggregating UXM user interface data. It decomposes complex UXM objects into simpler ones so that the aggregation can take place in later stages. A UxmObjectToString extracts the data from a UXMObject and returns it as a string.

An XMLParser transformation engine takes a string as input and parses it into a DOM tree. The resulting XML tree is the output of the engine. An XpathExtractor transformation engine is used to extract user interface elements in UXM format using XPath. It also marks up the input string where the string fragment was extracted. It is used primarily in the UXM. An XSLTransformer transformation engine takes an XML document as input, applies a XSL style sheet to it and returns an XML document as output.

The transformation engines outlined above provide a variety of basic functions which are required by a DT service. The transformation engines are used by transformation actors which act on the data to transform it. There are essentially two types of transformation actors: atomic actors make use of transformation engines directly, while group actors use other transformation actors.

An atomic actor holds configuration data indicating how a transformation engine should be used to carry out the necessary transformation. For example, an atomic actor using an XSL transformation engine may be configured using an XSL style sheet. The output will then be a DOM object (see above). When called, the actor will pass the input data and the configuration data to the transformation engine to cause the transformation to be effected.

An atomic actor has a type parameter which is set to "base" which indicates that the transformation actor is an atomic actor. It has a textual description of the transformations which it carries out. It has a EngineID parameter which identifiers one of the transformation engines set out above which is to be used by the actor. A configuration parameter is represented by a string. This will typically be a regular expression or alternatively a file name of an XSL style sheet. Some actors will have multiple outputs, while other actors will always have a single output value. This is represented by a MultipleOutputs parameter which is set to TRUE if multiple outputs are allowed, or FALSE if MultipleOutputs are not allowed. If an actor for which MultipleOutputs is set to FALSE produces multiple output data at run time, the data is merged using a Java class specified by a DataMerger parameter. A Timeout parameter provides a timeout, preferably in milliseconds.

A group actor combines one or more other transformation actors. The transformation actors being grouped may be atomic actors or group actors, and can be executed either in parallel or sequentially, or as alternatives.

A group actor has a type parameter which is set to "group", a description parameter specifying a textual description, and a parameter TransformationIDs which is a list of actors contained within the group actor. A GroupType parameter can take values of "sequence", "parallel" and "switch". If the GroupType parameter is set to "sequence" all the contained transformation actors are executed sequentially, in the order in which they are listed in a Transformation IDs parameter. If the GroupType parameter is set to "parallel", all the contained transformation actors are executed in parallel. If the GroupType parameter is set to switch, a single actor will be chosen at run time to act upon the passed input data. A LateInitialization parameter takes a Boolean value indicating whether or not late initialisation should be used. That is, this parameter indicates whether the transformation engine should be initialised at start up (if LateInitialization is set to FALSE), or when the transformation engine is used for the first time (if LateInitialization is set to TRUE). A group actor also has MultipleOutputs, DataMerger and Timeout parameters, as described above with reference to atomic actors.

In preferred embodiments of the present invention some atomic actors and some group actors are provided by default. Details of these transformation actors are now described.

Atomic actors provided by default are as follows. A NOP actor performs no operation, which can be necessary in the DT in cases where no transformation is required. Three further atomic actors simply make transformation engines described above available as actors. A HTMLTagBalancer actor makes the HTMLTagBalancer transformation engine available as an actor, a UXMObjectDecomposer actor is used by the DT service of the CA and makes the UXMObjectDecomposer transformation engine available as an actor. A UXMObjectToString actor makes the UXMObjectToString transformation engine available as an actor, and an XMLParser actor makes the XMLParser transformation engine available as an actor.

A PageResolver actor is used by the DT service of the AA to recognise pages returned by source applications. It picks up details of the pages to be recoginsed from the appropriate parts of the IDM, as described above. A UIExtractor actor is used by the DT service of the AA to convert pages into UXMObjects, again appropriate configuration information is provided by the IDM.

A UIAggregator actor is used by the DT service of the CA to convert UXM objects into a form suitable for returning to a user as part of a composite application. A URLRewrite actor is used to update any necessary URLs, forms and/or frames in a page which is to be returned to a user.

A plurality of group actors are also provided by default. A sequence.IncomingUserResponse actor is a sequence of transformation actors which can be applied to a typical incoming user response message, to convert the page response into UXM form. It applies the PageResolver actor and the UIExtractor actor described above.

A sequence.OutgoingUserResponse actor is sequence of transformation actors to apply to a typical outgoing user response message to convert the UXM Object tree into the resulting page to return to the user. It applies an actor to convert a marshalled UXMObject tree into a XML tree and then aggregates the various components according to information in the XML tree. The result is converted to a string representing the page which is returned to the user.

A sequence.UTAggregation actor comprises a sequence of transformation actors to apply to aggregate the components of a page into the final page. It applies other transformationa actors to decomposes and aggregate and then uses the atomic actor.UIAggregator described above.

A sequence.UIAggregation.DecomposeAndAggregate is a sequence of transformation actors which are applied to get the page elements ready for aggregation. It first decomposes the top most UXMObject using the UXMObjectDecomposer actor. It then recursively goes down through the tree repeating the same action.

A switchgroup.UIAggregationRecursion is a switch group of transformation actors. It goes down through the UXMObject hierarchy, choosing at each stage whether the UXMObject contains other UXMObjects or not.

A sequence.UIExtraction actor comprises a sequence of transformation actors which are applied to extract the components of a page into a UXMObject tree. It decomposes and aggregates, then uses the atomic actor UIAggregator A switchgroup.UIExtractionRecursion actor is a switch group of transformation actors. It goes down through the UXMObject hierarchy, choosing at each stage whether the UXMObject contains other UXMObjects or not.

Figures 32, 33:
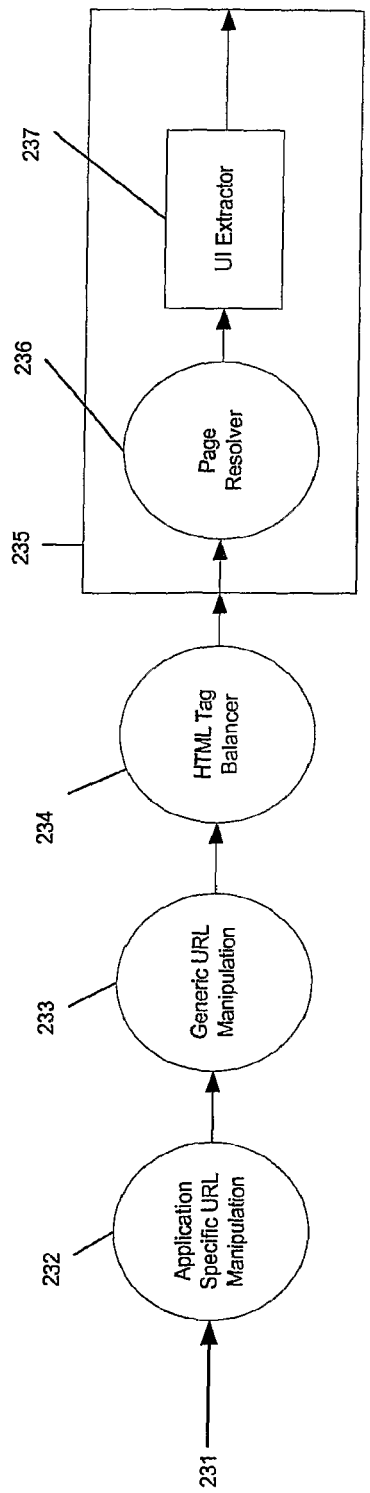
FIG. 32 is a schematic illustration of operation of the DT service for a particular source application.
FIG. 33 is a HTML code fragment which can be used to generate an IncomingUserRequest message.

Operation of the DT service within the AA node for a particular source application is illustrated in FIG. 32. Data is received from a source application is denoted by an arrow 231. This data is first passed to a transformation engine 232 which makes any necessary amendments to URL references included in the received source data. This can be achieved using, for example, the RegEx transformation engine described above. A second transformation engine 233 performs any generic URL amendments that may be necessary, and can again be the RegEx transformation engine described above. A HTML tag balancer transformation engine 234 (of the type described above) is then used to ensure that the produced HTML is well formed.

The output of the HTML tag balancer is input to a group actor 235 which is configured to recognise and process the received source page. The group actor 235 comprises a suitable PageResolver transformation engine 236 which is configured to recognise predefined pages, and a group actor 237 which comprises one or more of the transformation engines described above, which together act to extract user interface elements from recognised pages.

Having described configuration of the composer, and the key services contained within its nodes, its operation in providing composite applications, as outlined above with reference to FIG. 15, is now described in further detail, referring again to FIGS. 14 and 15.

Processing typically begins when a user using the web browser 126 makes a HTTP request which is subsequently directed to the web server 12. The servlet 117 operating on the web server 12 determines whether or not the URL entered relates to a page provided by the composer. If it is determined that the URL does not involve the composer, the web server obtains and displays the requested web page in a conventional manner. If the URL is to be provided by the composer, the servlet 117 intercepts and processes the HTTP request. This involves converting the HTTP request into an IncomingUserRequest JMS message.

It will be appreciated that some requests will require authentication. Authentication is handled using cookies. When a user first attempts to access a page requiring authentication the request will be intercepted by the CL service of the CA node, and this service will determine whether or not the request includes any required cookie. If no such cookie is present in the request, the user will be presented with a page into which suitable authentication data (e.g. username and password) is entered. This data is sent to the web server, and onwards to the ALF service 126 of the ALF node 108, where the input authentication data is checked against data stored in the ALF database. Assuming that this authentication process is successful, the user's original request is processed. A cookie is stored on the user's computer, and in the case of subsequent requests, this cookie is read by the web server, forwarded to the CL service of the CA node, and then forwarded to the ALF service 126 to enable authentication using the ALF database 110. The following description assumes that all necessary authentication has been successfully carried out.

Creation of the JMS message is carried out as specified by the appropriate configuration data within the IDM. Having created an appropriate IncomingUserRequest message, and determined to where it should be sent using the target parameter within the weblistener data group 210 (FIG. 28) it is then necessary to locate an appropriate instance of the target service which can accept the created message.

The listener performs load balancing over JMS, so that a plurality of instances of a target service can be used concurrently, and requests can be effectively distributed between the plurality of composers. The JMS properties file for the listener (described above) includes a resolverprotocol.roundrobin.target parameter which specifies a load balancing algorithm which is to be used such as, for example the round robin algorithm. This parameter will also specify how many instances of the target (in this case the CL service of a CA) to expect.

When an instance of the target service starts up, it declares itself using an appropriate JMS message, and the listener will then know that messages can be sent to that instance of the target service. When a listener needs to send a message to an instance of the target service (e.g. to the CL service of a CA) a broadcast message is sent to all instances of the service registered with the listener. The listener will then await a response from all registered targets, any responses from non-registered targets are simply ignored. When all expected responses have been received, the listener chooses one instance of the target service in accordance with the specified algorithm, and the IncomingRequestMessage is sent to the selected instance.

Having selected a target to receive messages from a particular user, the listener ensures that subsequent messages from that user are directed to the same composer. This need not necessarily be the case, and is determined by an add_affinity parameter within the IDM. Similarly, the IDM configuration for the composer has an add_listener_affinity parameter which ensures that messages for a particular user are always directed to the same listener.

The transmitted IncomingUserRequest JMS message will be received by the CL service 199 of the CA node 106 via its ML service 118 which is responsible for JMS messaging. On receipt of the IncomingUserRequest message, the CL may perform authentication using log on parameters specified in the IncomingUserRequest message, by using the ALF service of the ALF node in the manner described above. Assuming that authentication is successful, the message is simply passed to the DT service 120 of the CA node. The passage of messages between services, is determined by data stored within the message objects, as described above.

The DT service 120 retrieves configuration data pertinent to the actions required in response to receipt of an IncomingUserRequest message. The data is retrieved by accessing the IDM data structure (FIG. 22), and locating the DT.Applications data group 153. The data group 154 pertinent to the composite application specified in the IncomingUserRequest message is then located, and the action referred 158 referenced by the IncomingUserRequest message in the data group 154 is then identified and carried out. On receiving an IncomingUserRequest message, no transformation is usually required, and the DT service 120 therefore performs no operation, as specified by the data group 158. The message is then passed to the UXM service 121 of the CA node 106.

The IncomingUserRequest message is typically generated from a HTTP request as described above. A suitable HTML fragment for such a request is shown in FIG. 33. It can be seen that the third line specifies that the composite application's application class name is "CompApp1". The fourth line specifies that the request requires modification by the UXM, the fifth line specifies a node in the IDM tree structure relevant to the application, and the sixth line specifies a node in the IDM relevant to the page which generated the request. All this data is encapsulated within the IncomingUserRequest message.

The UXM will locate a "CompApp1" node within the UXM tree, and traverse down the tree structure, executing any actions for which the predicates are satisfied. These actions will typically involve creating one or more OutgoingUserRequest messages directed to appropriate source applications, which are forwarded to the source applications via the AA node 122, and these messages are therefore forwarded to the AA node.

In the present example, an AA node is present within the same process as the CA, and can therefore be located without problems. However, if no such node exists within the current process. The message(s) are forwarded to the ML service 118 of the CA node 106 and the ML service then attempts to locate an appropriate AA node within a different process using JMS, as described above with reference to FIG. 12D. When a suitable node has been located, the message(s) are forwarded to the ML service of that node, and onwards to the CL service of that node. Using JMS in this way allows convenient inter-process communication, regardless of the distribution of processes between physical machines.

An OutgoingUserRequest message is received by the DT service 124 of the AA node 107. The DT service must transform the OutgoingUserRequest into a form understandable by the target source application. In many cases, there will be no action required by the DT at this stage as shown in the example configuration of FIG. 23, where it can be seen that the OutgoingUserRequest entry of the DT.App.firstbyte data group 161 references a no operation action 162. The OutgoingUserRequest message is therefore forwarded to the CL service 123 of the AA node 107.

The CL service 123 uses configuration data stored within the IDM to locate a data group representing the correct source application (e.g. the g2config data groups 145, 147 of FIG. 21). This data group will specify any authentication information which must be included in a request to that source application. In order to obtain such authentication information the CL service 123 requests authentication data from the ALF service 126 of the ALFNODE 108, and this data is then fetched from the ALF database as indicated by data in the IDM.

As described above, the IDM configuration for a CL service also specifies parameters which are used to connect to the appropriate source application (specified in a connection data group). The CL service will use these parameters to determine the format of request which should be generated for onward transmission to the source application. For example, this may be a HTTP request directed to a particular port of a particular host. This request is then transmitted to the source application.

The source application will process received request messages in a conventional manner, and data output in response to the request is in turn received by the CL service 123 of the AA node 107.

The CL service 123 receives the data from the source application, and forwards this data to the DT service 124 of the AA node 107. At this stage the DT service 124 must act upon the received data to transform it into a form suitable for sending to the UXM service 121 of the CA node 106. This processing will be of the type illustrated in FIG. 32 above.

The created UXMObjects are then forwarded to the UXM service 121 of the CA node 106. The UXM will record the received objects within the UXM Tree as described above, and when all necessary data has been received, aggregation will occur to create one or more UXMObjects representing the requested composite page. The created UXMObjects are then forwarded to the DT service 120 of the CA node 106, in one or more messages containing XML versions of the created UXMObjects.

The DT service 120 of the CA node 106 must then receive the messages, recreate the UXMObjects, and use data from the IDM configuration to determine how to convert the received UXMObjects into a form suitable for output to the user. Suitable forms may include HTML, or plain text.

It should be noted that by using an internal form until the composite page is processed by the DT service 120 of the CA node 106, the system described above can easily by adapted to handle different output types, simply by adding appropriate configuration data to the IDM for the DT service 120. This allows an effective decoupling of the composer from the output format required. Similar decoupling can be provided when handling input data.

The created output data is then forwarded by the DT service 120 to the CL service 119. The CL service uses the IDM data structure to determine the protocol which should be used to return the composite page to the user, usually via the servlet 117 of the web server 12.

Referring back to FIG. 14, operation of the administration terminal 112 which is connected to the service 13 by means of the connection 113 is now described. It is preferred that the administration terminal 112 is connected to the server by a network connection, and a conventional Transmission Control Protocol/Internet Protocol (TCP/IP) connection of the type used in Internet networks can suitably be used. The administration terminal may operate by running a web browser and accessing an adminconsole HTML document which is provided on a suitable port number of the server (e.g. port 8080).

When a user has logged onto the administration server, it is possible to create users, and roles. Users are allocated to roles, and the roles to which a user is allocate determine the actions which may be performed by that user. Roles specify commands which may be executed by their users and may also specify child nodes which inherit their properties. When roles have been created users can be allocated to created roles. Users can be removed from roles as necessary, and deleted if no longer required. If a role is deleted, data for all users allocated to that role is automatically updated. The administration terminal can also be used to set up a user's service credentials, that is the security data needed by a user to access various source applications used within the composite applications.

It has been described above that the UXM and other services of the composer together process user requests from a composite application and generates appropriate requests to source applications. It has also be explained that the IDM contains configuration data, and that this data can be specified using a file such as that illustrated in FIG. 29. However, specifying configuration data in this manner is relatively difficult and requires experienced users who are able to create and manipulate the configuration data files. The embodiment of the present invention provides a mechanism for automatically generating configuration data files from models. Models are created representing each source application, and these models are combined to model behaviour of the composite application.

Figure 34:
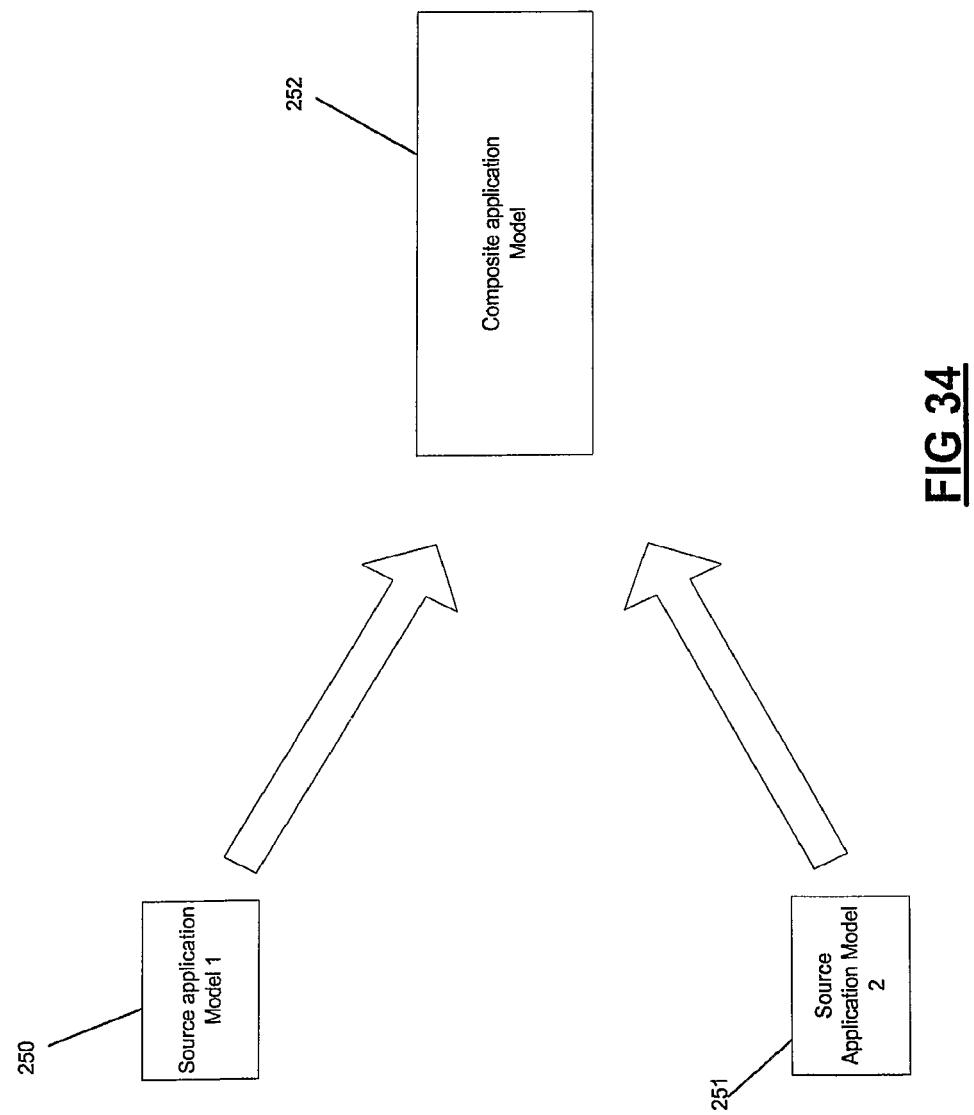
FIG. 34 is a schematic illustration of application modelling in accordance with an embodiment of the present invention.

FIG. 34 represents an overview of such modelling. A first source application is represented by a first source application model 250, and a second source application is represented by a second source application model 251. These models represent all or part of the respective user interfaces provided by the first and second application. These models are combined to create a composite application model 252, and this model is used to generate configuration data for inclusion in the IDM.

Models can conveniently be implemented by specifying appropriate Java classes, and creating objects which are instances of such classes.

Figure 35:
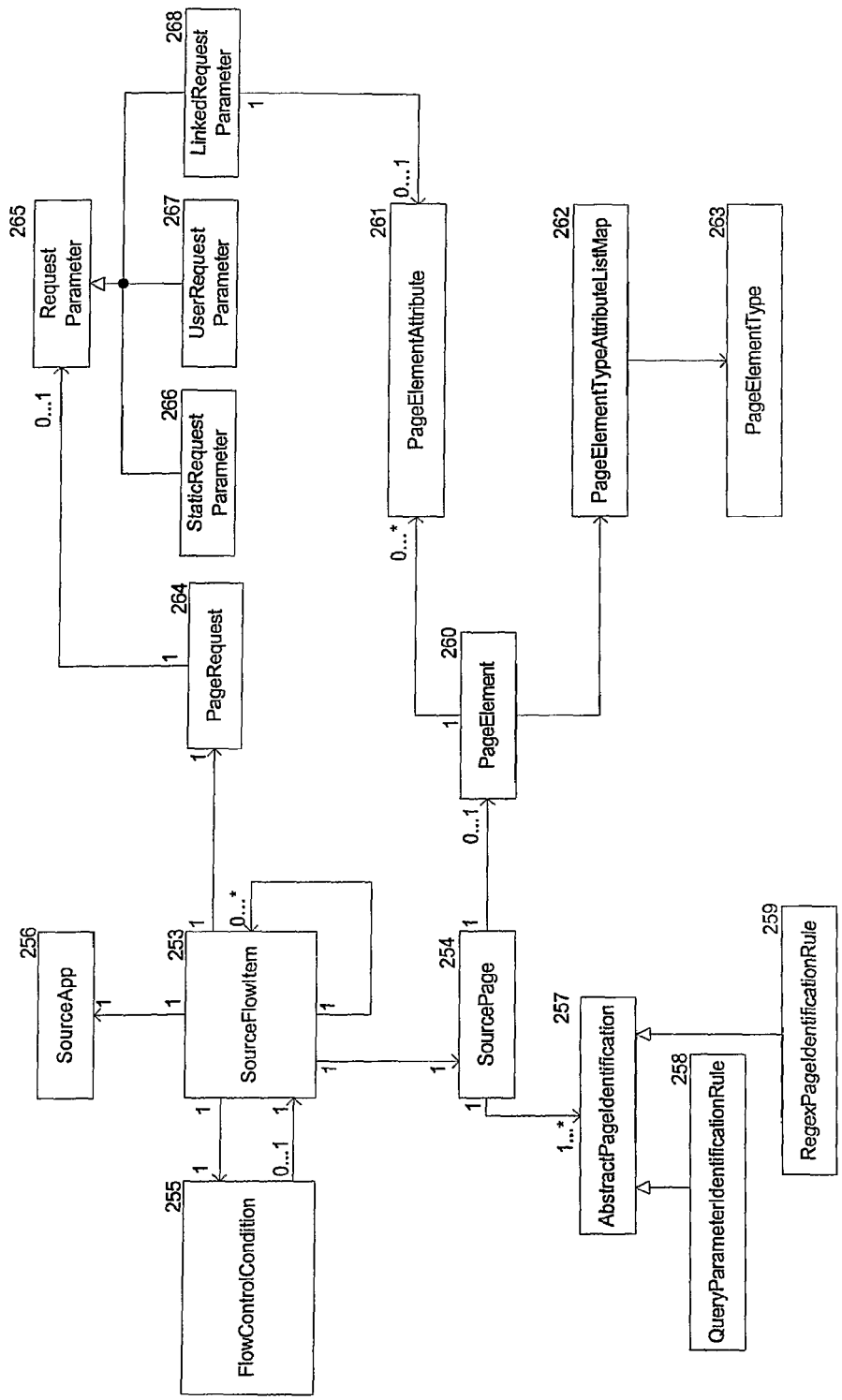
FIG. 35 is a class diagram showing classes used to model source applications in embodiments of the present invention.

FIG. 35 illustrates classes used to create a source application model. A key component of all source application models is a SourceFlowItem class 253. Each source application model contains at least one SourceFlowItem object. A first SourceFlowItem object always represents the entire application flow of a source application, without defining details. This object represents an entry point into that source application's user interface. Further SourceFlow objects then define further details. Instances of the SourceFlowItem class refer to other instances of the SourceFlowItem class by means of an array Next which specifies one or more further SourceFlowItem objects which can be used to model application flow, by means of a graph of SourceFlowItem objects.

Each SourceFlowItem object will also refer to an instance of a SourcePage class 254 by means of an ItemEntryPage variable, which represents a known source page within the source application, as described in further detail below. The SourceFlowItem class 253 also comprises an ItemEntryConditions array which references one or more instances of the FlowControlCondition class 255, and a SourceApplication variable which references an instance of the SourceApp class 256, representing the source application to which the SourceFlowItem refers.

Further details of the FlowControlCondition class 255 are now described. Each FlowControlCondition object can specify one of three categories of condition. A UserinRole condition is used to model user role enforcement. A SourceFlowItemExit condition is used to ensure that some SourceFlowItem objects are accessed only by following a well defined path through an application. Two final conditions relate to parameter values within a user request. A RequestParameterExists condition ensures that a specified parameter exists, while a RequestParameterValue condition ensures that a specified parameter has a specified value.

Instances of the SourcePage class 254 reference one or more instances of a subclass of an AbstractPageIdentification class 257 to allow identification of a source page. An instance of a QueryParameterIdentificationRule class 258 is used to specify configuration data for recognising the page. An instance of a RegexParameterIdentificationRule class 259 is used to specify a regular expression which is used to enable recognition.

Instances of a PageElement class 260, represent an extractable element within a source page. Instances of the PageElement class are references from appropriate SourcePage objects. For example, a PageElement object may represent some text or an image within a user interface provided by a source application. PageElement objects in turn reference zero or more instances a PageElementAttribute class 261 which are used to store data such as background colour, text box names and labels associated with particular page elements. PageElement objects may be allocated to a plurality of types which are represented by an instance of a PageElementTypeAttributeListMap class 262, which in turn contains zero or more instances of a PageElementType class 263.

Instances of the SourceFlowItem class 253 also reference an instance of a PageRequest class 264 which is used to model details of retrieving the referenced SourcePage object. The PageRequest class includes a string indicating how the request should be effected (e.g. HTTP GET or HTTP POST), and a further string which provides a path to which the request should be directed. A PageRequest object also references an instance of a RequestParameter class 265 which represents parameter(s) associated with the request by means of three sub classes. A StaticRequestParameter class 266 is used to represent a fixed NVP, a UserRequestParameter class 267 represents a user specified parameter, and a LinkedRequestParameter class 268 represents a parameter which references an instance of the PageElementAttribute class 261.

Having described the structure of a source application model, a composite application model is now described with reference to FIG. 36. A composite application is represented by one or more instances of a CompositeFlowItem class 269. This class provides a variable to allow a CompositeFlowItem object to reference zero or more further instances of that class, and thus a flow of CompositeFlowItem objects can be created. Again, a first instance of the CompositeFlowItem class 269 will represent the entire compsite page flow without defining any details. CompositeFlowItem objects refer to an instance of the FlowControlCondition class 255 as described with reference to FIG. 35, although it should be noted that no SourceFlowItemExit can be specified, as composite application do not enforce a page flow.

The CompositeFlow item class 269 is a superclass for an ExistingFlowItem class 270 and a NewFlowItem class 271. The ExistingFlowItem class 270 is used to include part of a source application within a composite application without modification. This can be either a part or whole of a modelled source application. The ExistingFlowItem class 270 references an instance of the SourceFlowItem class 253.

The NewFlowItem class 271 is used to model composite pages which form composite applications. It has a single variable which is used to reference an instance of a CompositePage class 272. The CompositePage class 272 comprises an array of PageElement objects which are used to create a composite page. Such PageElement objects can represent page elements from a plurality of different source applications. The CompositePage class 272 also comprises an array of instances of a RequestParameterMapping class 273, which is used to identify parameters used to receive the CompositePage, and their mappings to request parameters which are used to retrieve source pages required to provide the necessary PageElement objects. The CompositePage class 272 also references a PageElementManipulation class 274 which is used to manipulate PageElements to create composite pages. The PageElementManipulationClass is a superclass for all manipulations. It specifies a CompositePage object which is being created, and a PageElement object which is to be manipulated. The PageElementManipulation class also references an instance of the PageElementLocation class 275 which provides a location for the page element after manipulation. Location can be specified as UNCHANGED, in which case the parent of the element in the manipulation will determine location. Alternatively, location can be set as AFTER, BEFORE or REPLACE, all relative to a specified PageElement object. Location can also be specified as TOPLEVEL, in which case the element is positioned at the highest level within the composite page.

Details of subclasses of the PageElementManipulation class 274 are now described, which subclasses are used to represent specific manipulations. A DeletePageElement class 276 is used to delete a page element, and specifies no additional variables. An InsertPageElement class 277 is used to insert a page element at the specified location, and specifies no further variables.

A MergePageElements class 278 is used to represent a manipulation which merges the PageElement object specified within the PageElementManipulation class with a further specified PageElement object. This class also uses a MergeDetailEnumeratedList class 279 to specify location of the PageElement object specified within the MergePageElements class 278 relative to that specified within the PageElementManipulation class 274. The MergeDetailEnumeratedList class 279 can take values of AFTER, BEFORE and TOPLEVEL.

A SetActionElementTarget class 280 is also a subclass of the PageElementManipulation class 274. This class is used to amend a PageElement such that its target points to an instance of the CompositeFlowItemClass 269. This allows existing PageElement objects to be used while amending the flow as required by the composite application.

A SetElementAttributeValue class 281 is an abstract class which has a ValueFromPageElementAttribute class 282 and a ValueFromRequestParameter class 283 as subclasses. The SetElementAttributeValue class provides a variable which is used to refer to a target PageElementAttribute object. The ValueFromPageElementAttribute class 282 is used when the target PageElementAttribute is to be set using a PageElementAttribute specified within a suitable variable. The ValueFromRequestParameter class 283 is used when the target PageElementAttribute is to be set using a request parameter.

Having described Java classes used for source and composite application modelling, creation of such models is now described by reference to an example composite application which is made up of two source applications.

Figure 37:
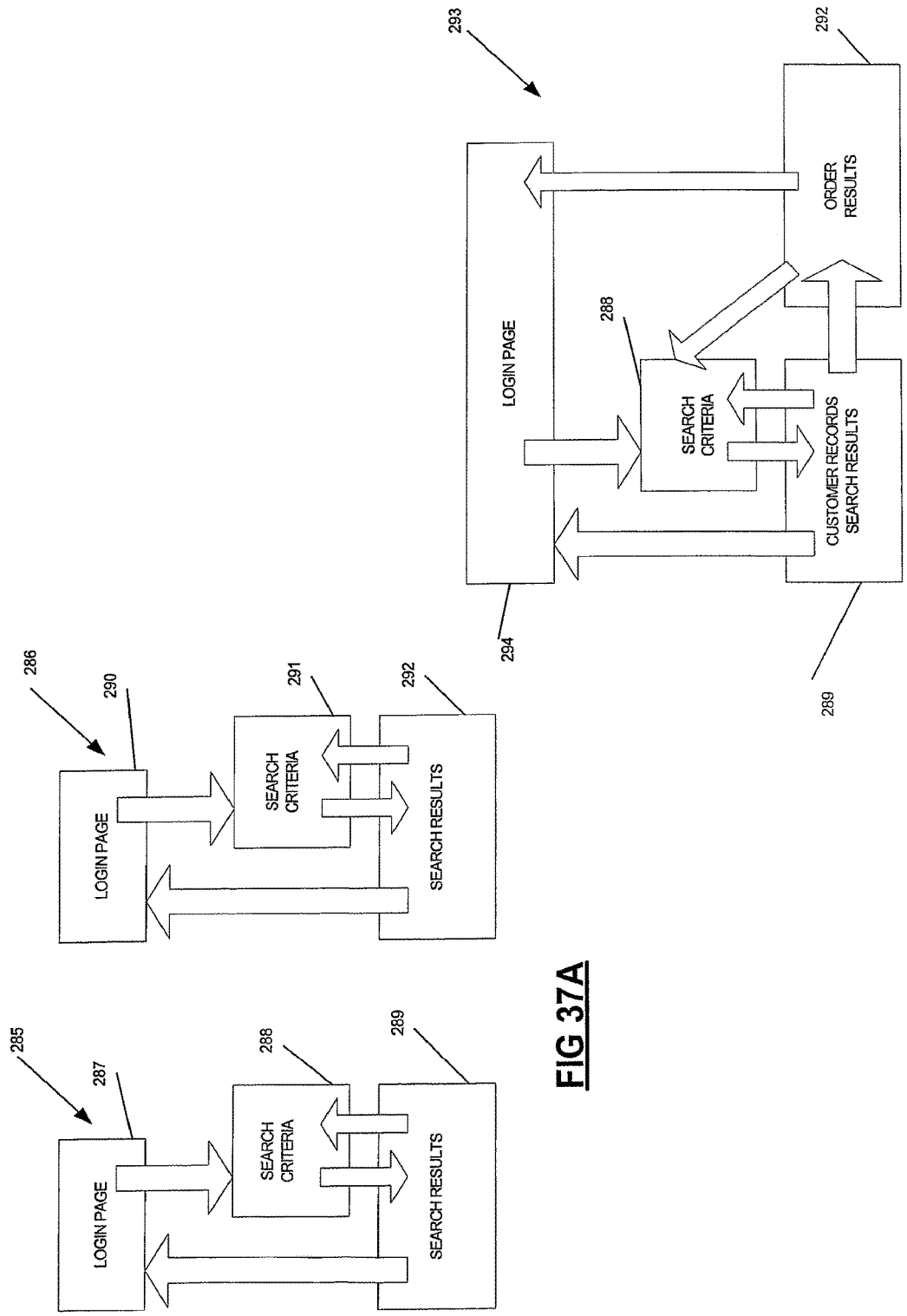
FIG. 37A shows process flow within two source applications.
FIG. 37B shows a composite application built from the composition of the applications illustrated in FIG. 37A.

Referring to FIGS. 37A and 37B, a business enterprise uses two software packages which are to be integrated—a customer records system (CRM system) 285, and an order system 286. As illustrated in FIG. 37A, before implementation of a composite application solution, a user uses the CRM system 285 and the order system 286 independently. To use the CRM system a user inputs login details to a login page 287, and assuming successful validation, the user is presented with a search criteria page 288. Search criteria can then be entered, and search results are then displayed on a search results page 289. From the search results page the user can log out to return to the login page 287 or reset the search criteria and return to the search criteria page 288.

To use the order system 286, the user again enters login details into a login page 290, and after suitable validation, search criteria may be entered onto a search criteria page 291 and search results can then be displayed on a search results page 292. The user can then logout to return to the login page 290 or reset the search criteria to return to the search criteria page 291.

By analysing usage of the applications 285, 286 it can be determined that productivity will be increased by providing a single login procedure covering both the CRM system 285 and the order system 286. Additionally a button can be provided within the search results page 289 of the CRM system 285 to allow order information to be retrieved using the search criteria input to the search criteria screen 288. FIG. 37B illustrates a composite application 293 which provides these features. The composite application 293 provides a login page 294 which allows login to the CRM system 285 and the order system 286. After login the search criteria page 288 of the CRM system 285 is displayed, and search results are then displayed using the search results page 289 described above. However, using the composite application 293 it is possible to display the order results page 292 without logging in again, but instead by pressing an appropriate button provided on the CRM search results page 289.

Figure 38:
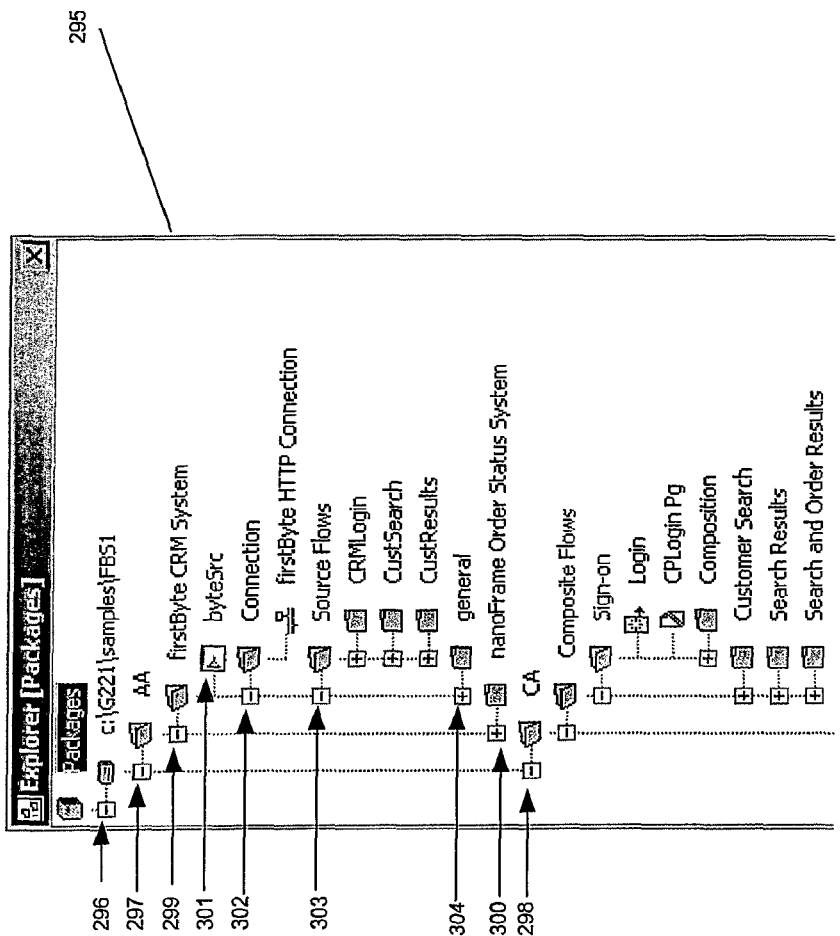
FIG. 38 is a screenshot of a dialog box showing a model for a composite application.

Specification and creation of the composite application 293 is now described. Creation of the model is effected using application software which provides a graphical user interface (GUI). FIG. 38 illustrates an explorer window 295 which forms part of the part of the GUI, and which allows component parts of a composite application to be viewed and edited. The composite application is displayed as a tree structure made up of folders and objects. At the highest level, the composite application is represented by a project 296 entitled "FBS1". The project comprises an AA folder 297 which is used to specify details of source applications (given that the AA node is concerned with source applications, as described above), and a CA folder 298 which is used to specify details of the composite application. Both the AA folder 297 and the CA folder 298 comprise a number of folders and objects which are used to model different parts of the composite application. These are described in further detail below.

In creating a composite application, a project must first be established by selecting a project option on a file menu provided by a menu bar. A package must also be established which provides storage space in one or more directories where data relating to the project is stored. The source and composite applications are then configured. Configuration of the source applications is now described.

Referring again to FIG. 38, it can be seen that the AA folder 297 comprises a CRM system folder 299 which stores data related to the CRM system 285 (FIG. 37A) and an order system folder 300 which stores data related to the order system 286 (FIG. 37B). The CRM system is defined by a source application object 301, a connection folder 302 a source flows folder 303 and a general folder 304. In order to create the source application icon 301 a user selects a new button provided by the GUI.

Figure 39:
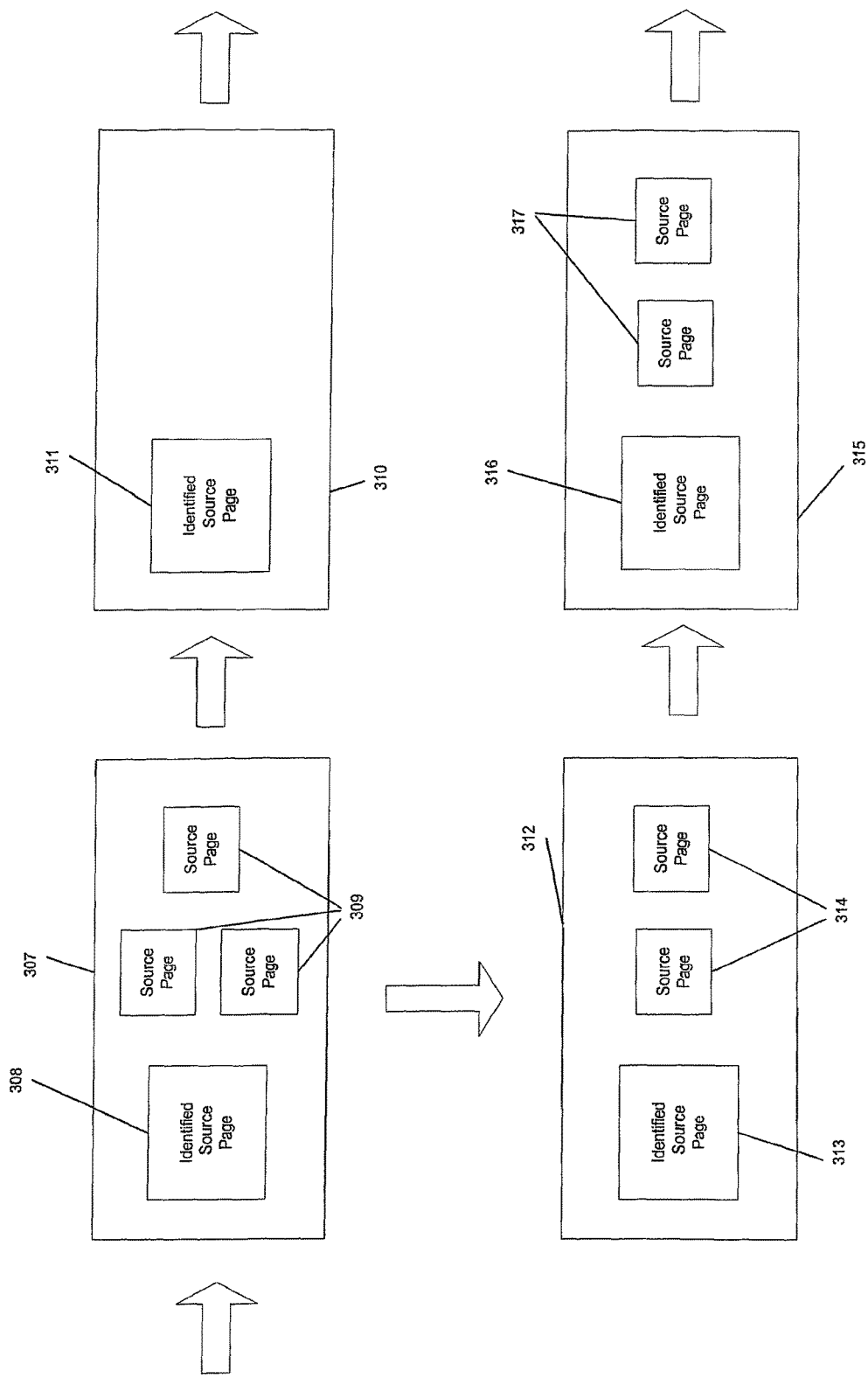
FIG. 39 is a schematic illustration of source flows within a source application.

Source flows represent possible flows through parts of a source or composite application. Source flows effectively act as holders for source pages. Each source flow begins with an identified source page, and there may then be one or more other source pages with which a user interacts, but of which the composite application has no knowledge. For example, referring to FIG. 39, it can be seen that an application is defined in terms of four source flows. A first source flow 307 comprises an identified source page 308 and three other source pages 309. A second source flow 310 comprises only a single identified source page 311, and a third source flow 312 comprises an identified source page 313 and two further source pages 314. A fourth source flow 315 comprises an identified source page 316 and two further source pages 317. By allowing source flows to contain some unidentified pages, only some parts of each source application of interest need be explicitly modelled.

Figure 40:
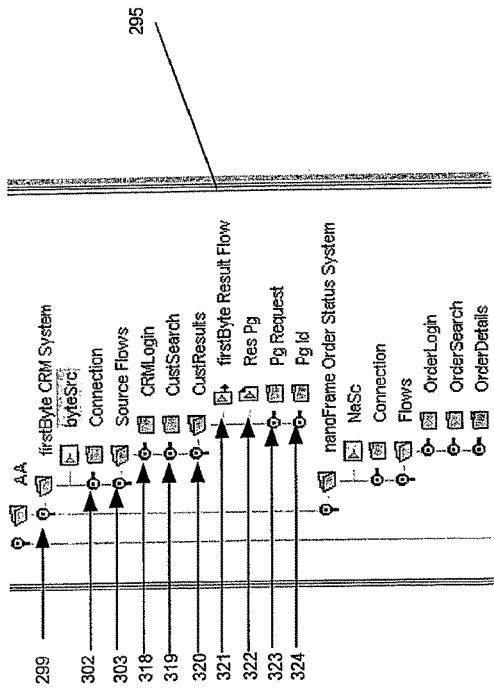
FIG. 40 is a screenshot showing part of the dialog box of FIG. 38 in further detail.

FIG. 40 illustrates a further view of part of the explorer window 295 in which objects within the source flow folder 303 are illustrated. It can be seen that the source flows folder 303 comprises details for a login source flow within a login folder 318, a search source flow within a search folder 319 and a results source flow within a results folder 320. These folders each comprise a single identified source page, and no unidentified source pages. Each source flow corresponds to a respective page of the CRM system 285 as illustrated in FIG. 37A.

FIG. 40 illustrates the contents of the results folder 320. It can be seen that the folder comprises a result flow object 321 which represents the source flow, a result page object 322 which represents the identified source page within the result flow object 321, a page request folder 323 and a page id folder 324.

Figure 41:
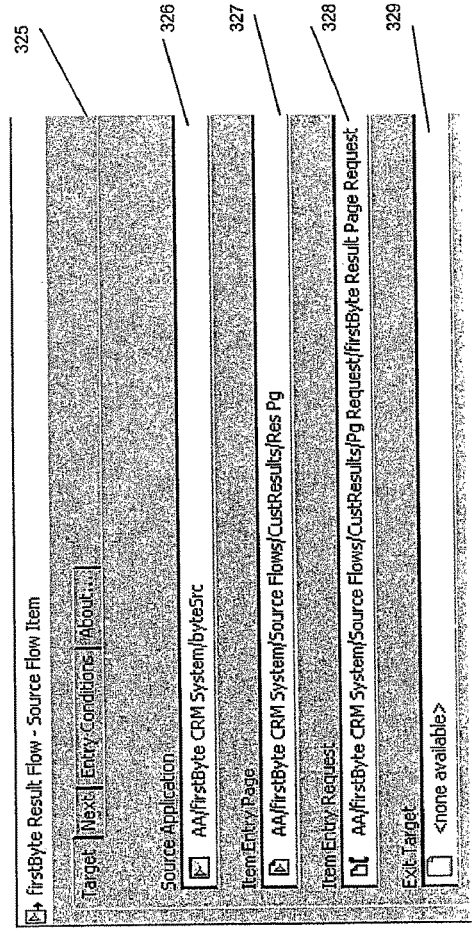
FIG. 41 is a screenshot of a dialog box used to configure a source flow item.

A source flow object is created and its details are specified using a dialog box 325, part of which is illustrated in FIG. 41. A text box 326 is used to specify a source application with which the source flow is associated. In this case it can be seen that entered application corresponds to the CRM system folder 299. A text box 327 is used to specify an entry page which represents the identified source page within the source flow. In this case it can be seen that the entered data references the result page object 322. A text box 328 is used to refer to data which indicates how the source page specified in the text box 327 is obtained. In this case, the entered data refers to an object within the page request folder 323, which is described in further detail below. A text box 329 is used to specify an exit target, and can be used to allow the creation of stateful flows. For example, if a source application comprises a first page A and a second page B, and is arranged such that page B can be displayed only after page A, page B will have an exit target set to page A. This allows composite applications to correctly use combinations of pages from a particular source application.

The dialog box 325 can additionally be used to specify one ore more successor flow items (by entering data pointing to an appropriate source flow object within the source flows folder 303), and also to enter details of entry conditions which are to be enforced before the specified source page is displayed.

Figure 42:
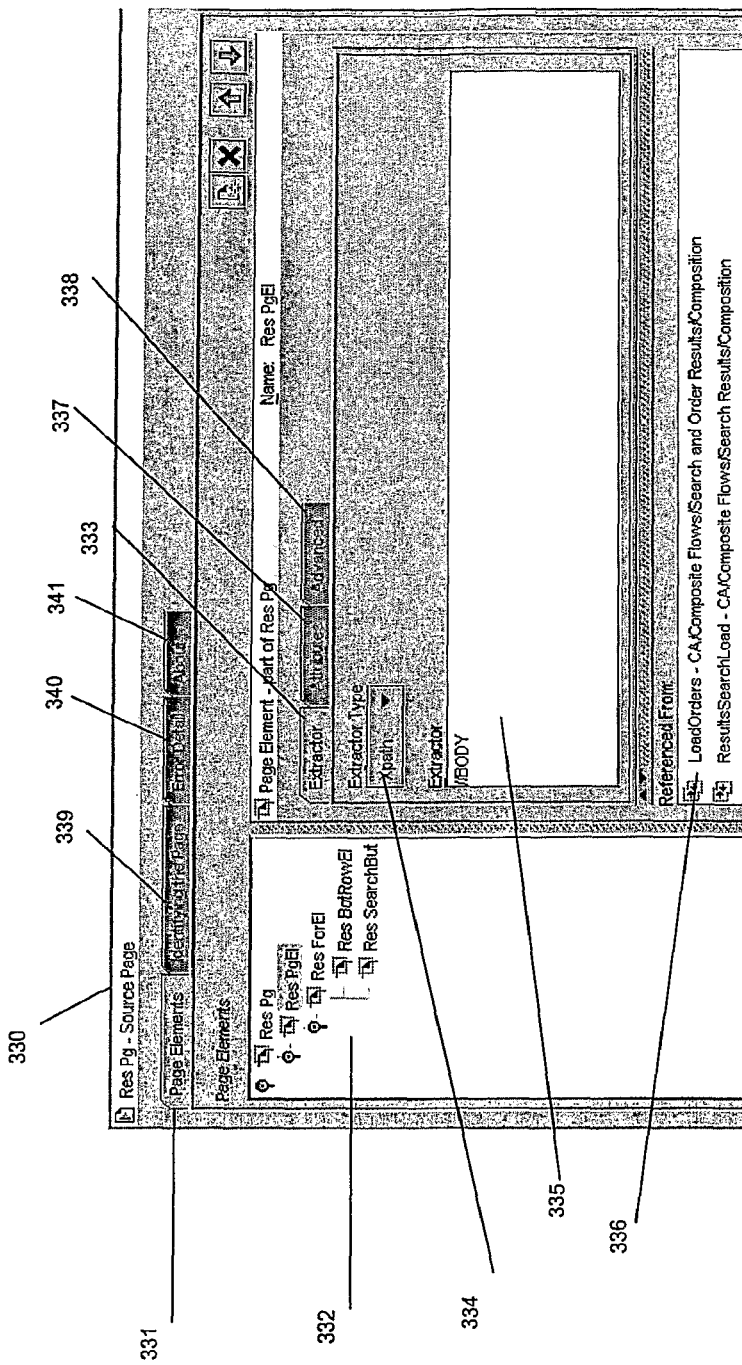
FIG. 42 is a screenshot of a dialog box used to configure a source page.

The result page object 322 is defined using a dialog box 330 illustrated in FIG. 42. On a page elements tab 331, a panel 332 is provided which shows that ResPg comprises a plurality of user interface elements arranged in a hierarchical manner. In order to create a definition of a source page in this way, a user first creates an object representing the entire page, and then creates child objects which represent the various page elements. The tab 331 additionally provides an extractor tab 333 which specifies an extractor type in an area 334 (e.g. regular expression or path based) which can be chosen from a pull down menu. An area 335 displays details of the extractor and an area 336 shows where the extractor is used within the composite application.

An attributes tab 337 displays data relating to attributes within a particular source page. An advanced tab 338 allows a page element type to be specified such that passive objects which are simply displayed to a user are differentiated from those which perform actions (e.g. buttons). Additionally, the advanced tab 338 allows data to be entered indicating whether a copy should be made of a source page, or whether the source page itself should be used within the composite application.

The dialog box 330 additionally provides a page identification tab 339 which is used to provide details of how the page is identified. This can take the form of a suitable regular expression which, for example, investigates the title of a source page to perform identification. An error detail tab 340 is used to specify details of relevance to handling error pages, and an about tab 341 is used to present a marked up version of the source page (e.g. stored as an image file such as a JPEG or GIF) showing the constituent page elements.

Figure 43:
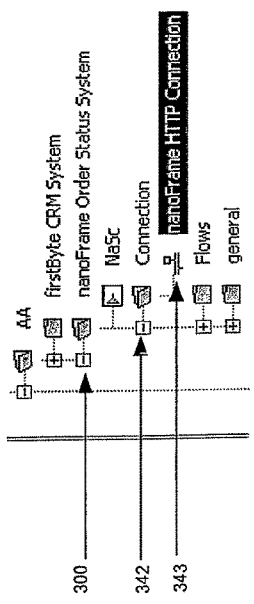
FIG. 43 is a screenshot showing part of the dialog box of FIG. 38 in further detail.
Figure 44:
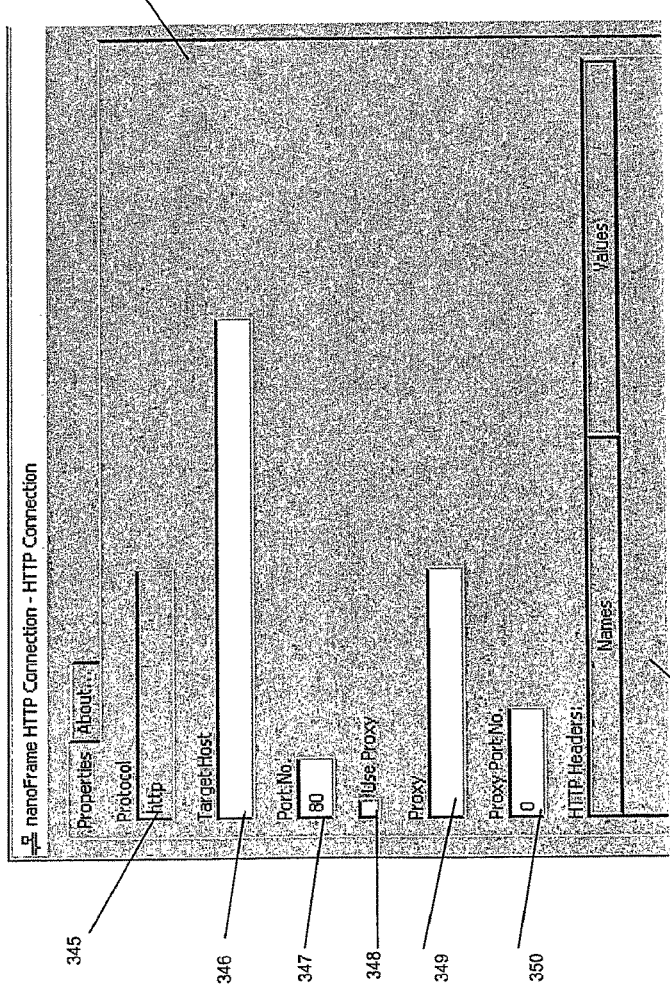
FIG. 44 is a screenshot of a dialog box used to configure a connection object.

Referring to FIG. 43, a view of a connection folder 342 within the order system folder 300 is illustrated (the connection folder 302, FIG. 38, provides similar functionality for the CRM system). It can be seen that the connection folder 342 comprises a single connection object 343 which represents a HTTP connection used to communicate with the order system. The connection object 343 is configured using a dialog box 344 illustrated in FIG. 44. A text box 345 specifies the connection protocol, which in this case is HTTP. A text box 346 is used to specify an IP address or a base URL for the server hosting the source application, and a text box 347 is used to specify a port number on that server, usually port 80 for non-secure HTTP connections. The dialog box 344 also allows data to be entered indicating that a proxy server should be used. Use of a proxy is indicated in a tick box 348, a URL or IP is entered into a text box 349 and a proxy port number is entered into a text box 350. An area 351 is used to specify HTTP headers which can be used when communicating with the source application.

It will be appreciated that in addition to communication using the HTTP protocol described above, various other connection protocols can be used including authenticated HTTP, JDBC, and SOAP Referring back to FIG. 40, configuration of the source application object 301 is now described. In general, interface pages and elements provided by the source application will contain references to other user interface elements provided by the source application. Such references will often be presented in a relative rather than an absolute manner. In order to ensure that such references can still be used when the source application interface elements are used in a composite application it is necessary to amend such references. For example:

<img src="/images/somepicture.jpg" . . . > may become:

<img src="http://www.sourceappserver.com/images/somepicture.jpg" . . . >

Figure 45:
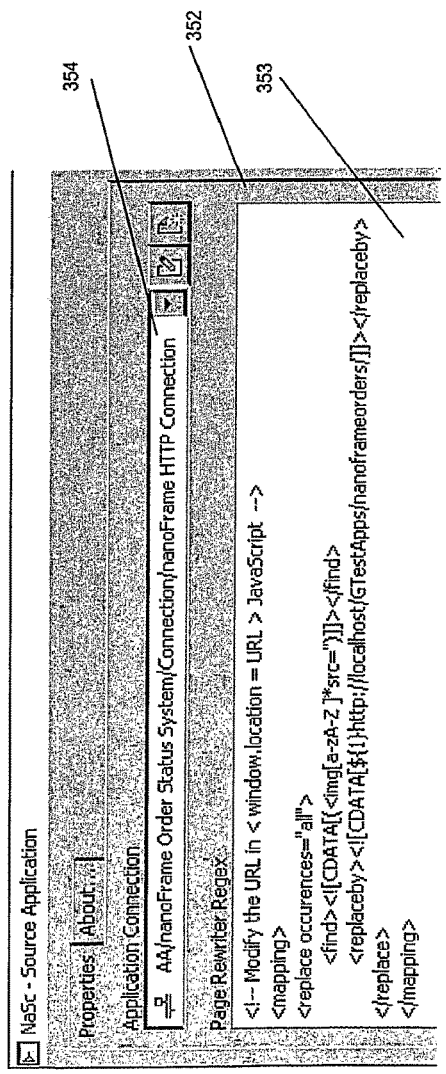
FIG. 45 is a screenshot of a dialog box used to configure a source application object.

Such rewriting can be specified by a dialog box 352 as illustrated in FIG. 45, where appropriate regular expression data can be input to a text box 353 to cause appropriate rewriting to occur. The dialog box 352 additionally provides a text box 354 which is used to reference the connection object 343 (FIG. 43) used for communication with the source application.

Figure 46:
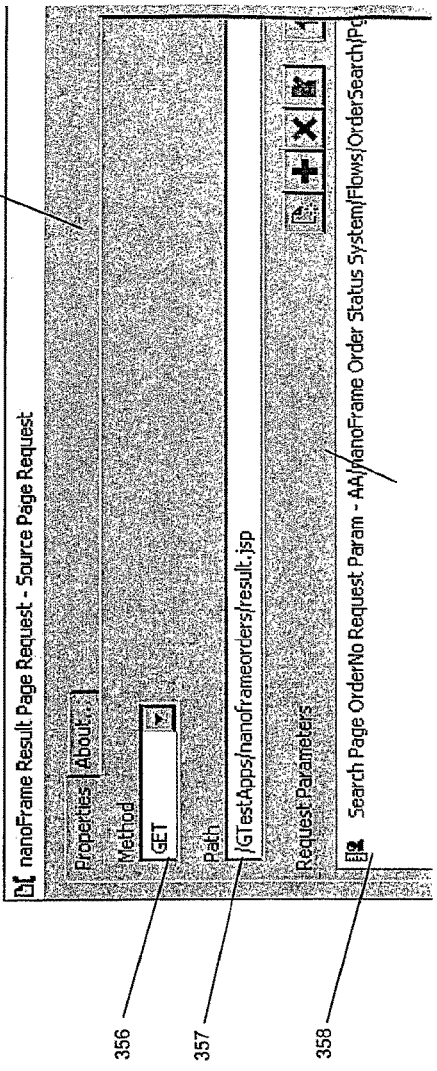
FIG. 46 is a screenshot of a dialog box used to configure request data.

Referring back to FIG. 40, the page request folder 323 comprises a plurality of objects indicating how source pages included within the customer results source flow folder 321 should be requested. Each of these request objects can be configured using a dialog box 355 illustrated in FIG. 46. It can be seen that the dialog box 355 provides a selection box 356 which can be used to select a HTTP method used to select the source page (often GET, as in this case), a text box 357 into which a path to which the request should be directed is input, and a text box 358 into which parameters for the request can be specified.

Having described entry of data relevant to modelling a source application, configuration of the composite application is now described. FIGS. 47 and 48 illustrate some parts of the explorer window 295 shown in FIG. 38 in further detail. FIG. 47 shows the contents of the CA folder 298. It can be seen that the CA folder comprises a composite flows folder 359 which contains details of all composite flows within the composite application. It can be seen that the composite flows folder 359 comprises a sign-on folder 360 a customer search folder 361, a search results folder 362 and a search and order results folder 363.

The contents of the search and order results folder 363 is shown in FIG. 48. It can be seen that the folder 363 comprises a objects defining a composite flow. It will be recalled that a composite flow can either be a new flow defined by the composite application, or alternatively a reused source flow. In the case of the example described here, only new flows are used. It can be seen that the search and order results folder 353 comprises a new flow item object 364 entitled customer order, and a composite page object 365 which is the page displayed within the search and order composite flow. The search and order results folder 363 additionally comprises a composition folder 366 which is described in further detail below.

Figure 49:
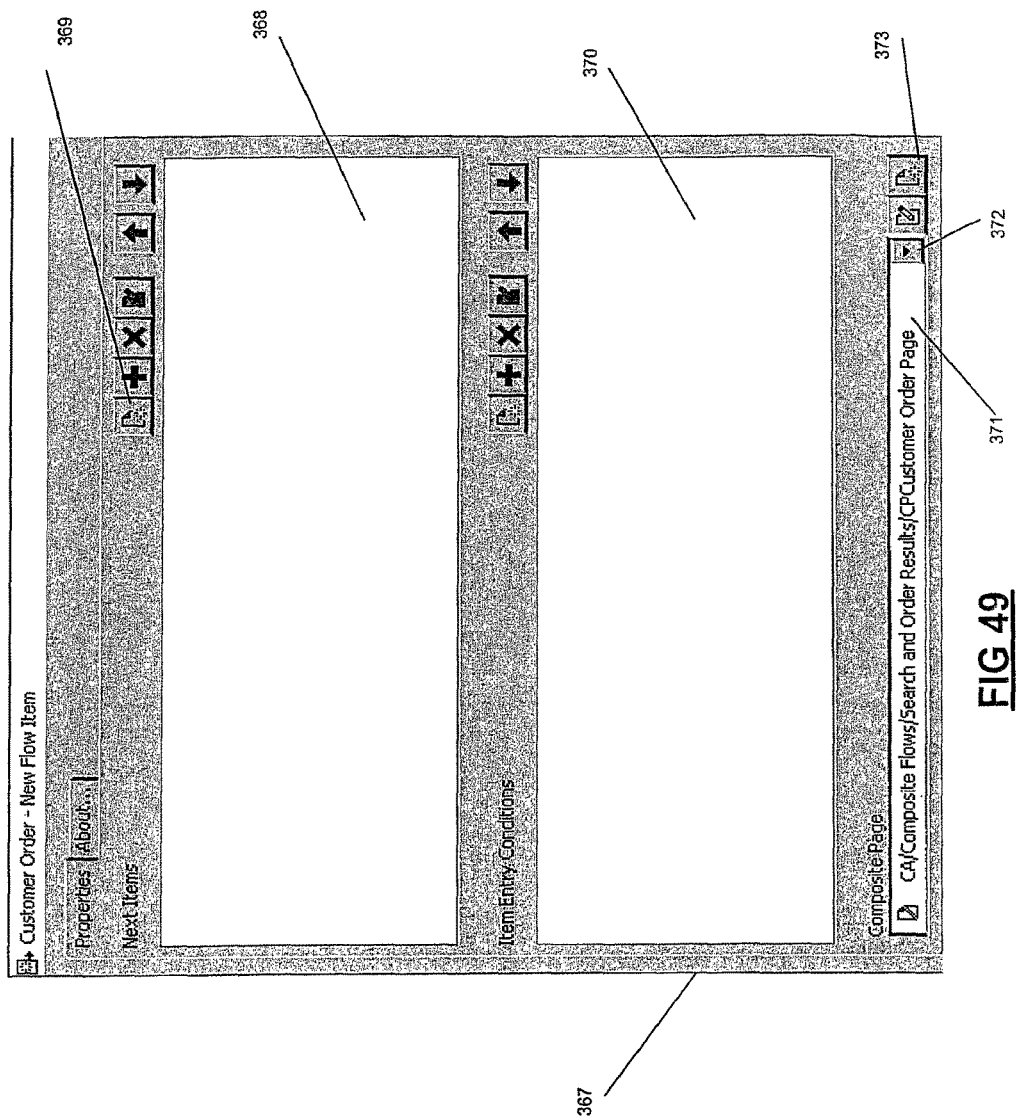
FIG. 49 is a screenshot of a dialog box used to configure a new flow item within a composite application.

FIG. 49 illustrates a dialog box 367 which is used to configure the new flow item object 364. Details of source flows which can follow the source flow being configured are specified within a next items area 368. Items can be added to this area using a new button 369. Details of preconditions for entry to the source flow under consideration are entered into an item entry conditions area 370. A text box 371 is used to specify the composite page associated with the composite source flow. It can be seen that in FIG. 49 the entered data references the composite page object 365. A pull down menu is provided by a button 372 to allow selection of any composite pages within the composite application. New composite pages can be created using a new button 373.

Figure 50:
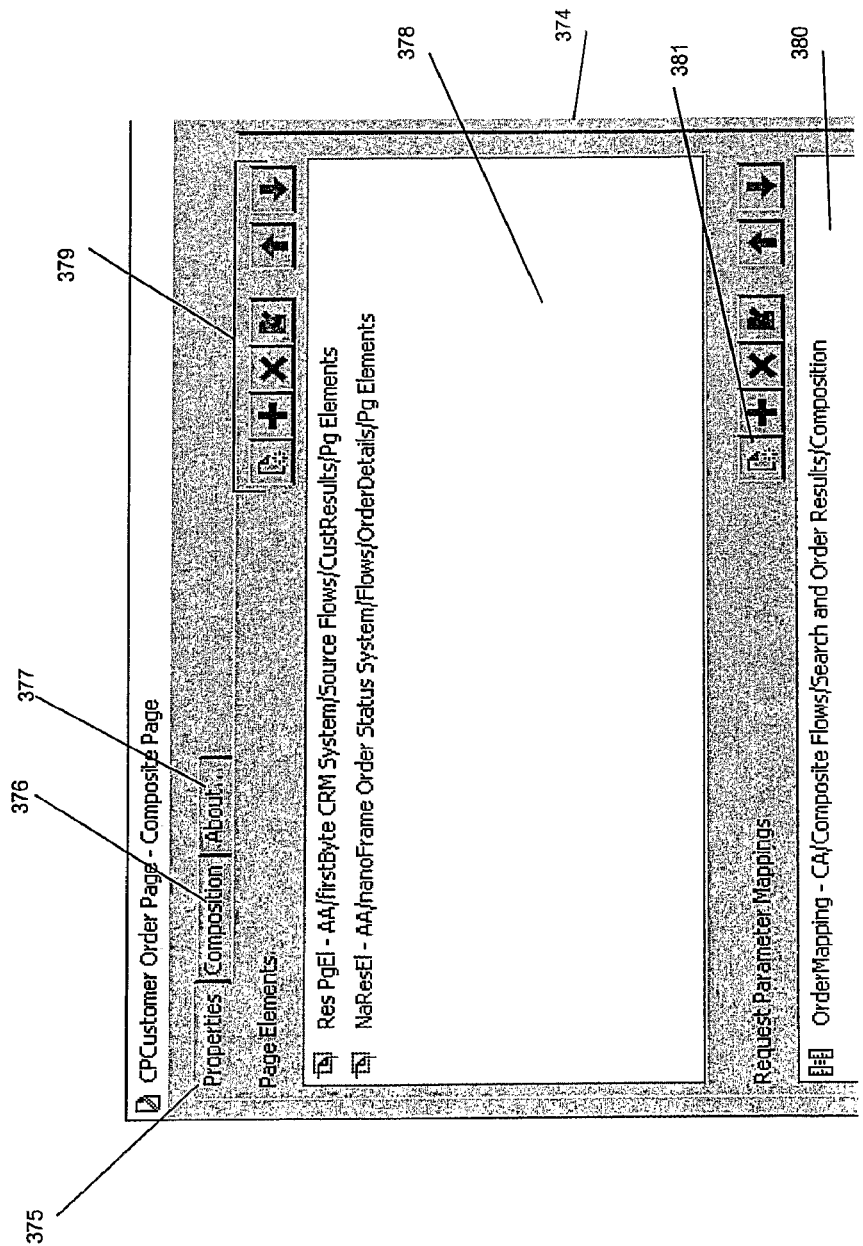
FIG. 50 is a screenshot of a dialog box used to configure a composite page.

FIG. 50 illustrates a dialog box 374 used for configuration of the composite page object 365 (FIG. 48). It can be seen the dialog box comprises a properties tab 375, a composition tab 376 and an about tab 377. The properties tab 375 provides a page elements area 378 into which details of page elements to be used within the composite page are entered. Each of these elements will correspond to an element defined within a source page of one of the source applications (described above). A set of buttons 379 is provided to allow page elements to be added to and manipulated in the page element area 378. Reading the buttons 379 from left to right, a first button is used to create a new page element, a second button is used to add page elements to the page element area 378, a third button is used to delete one or more page elements selected within the page element area 378, a fourth button is used to edit one or more selected page element, and fifth and sixth buttons are used to change the order of page elements within the page element area 378.

Figure 51:
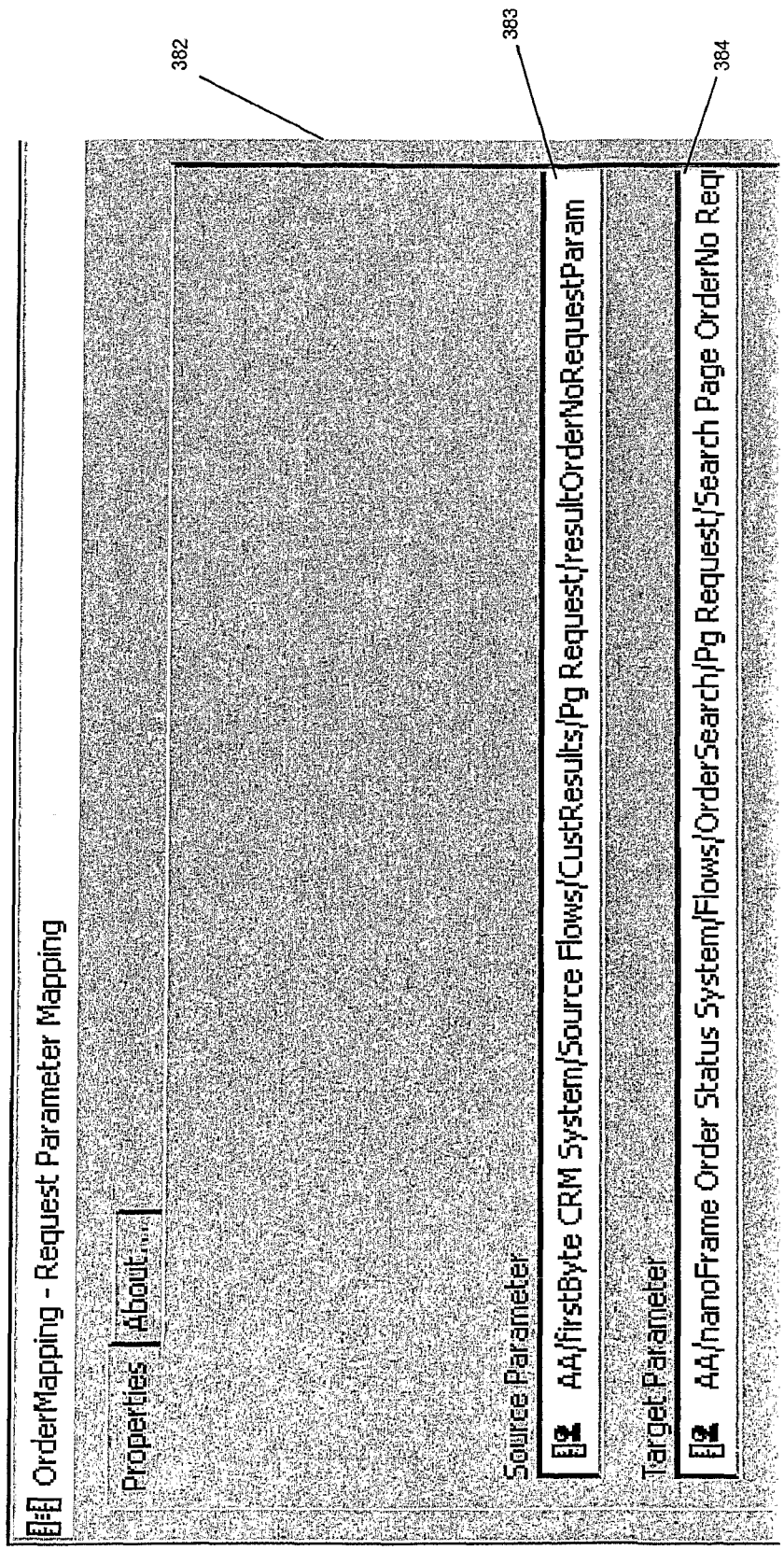
FIG. 51 is a screenshot of a dialog box used to set up request parameter mappings.

A request parameter mappings area 380 is provided for specifying mappings between request parameters used to access the composite page, and the parameters that are to be passed to the appropriate source application when fetching a source page. Use of a new button 381 displays a dialog box 382 as illustrated in FIG. 51, which allows new request parameter mappings to be added to the request parameter mappings area 380. The dialog box 382 allows request parameter mappings to be entered using a source parameter text box 383 and a target parameter text box 384. A mapping is then created between the entered parameters.

Figure 52:
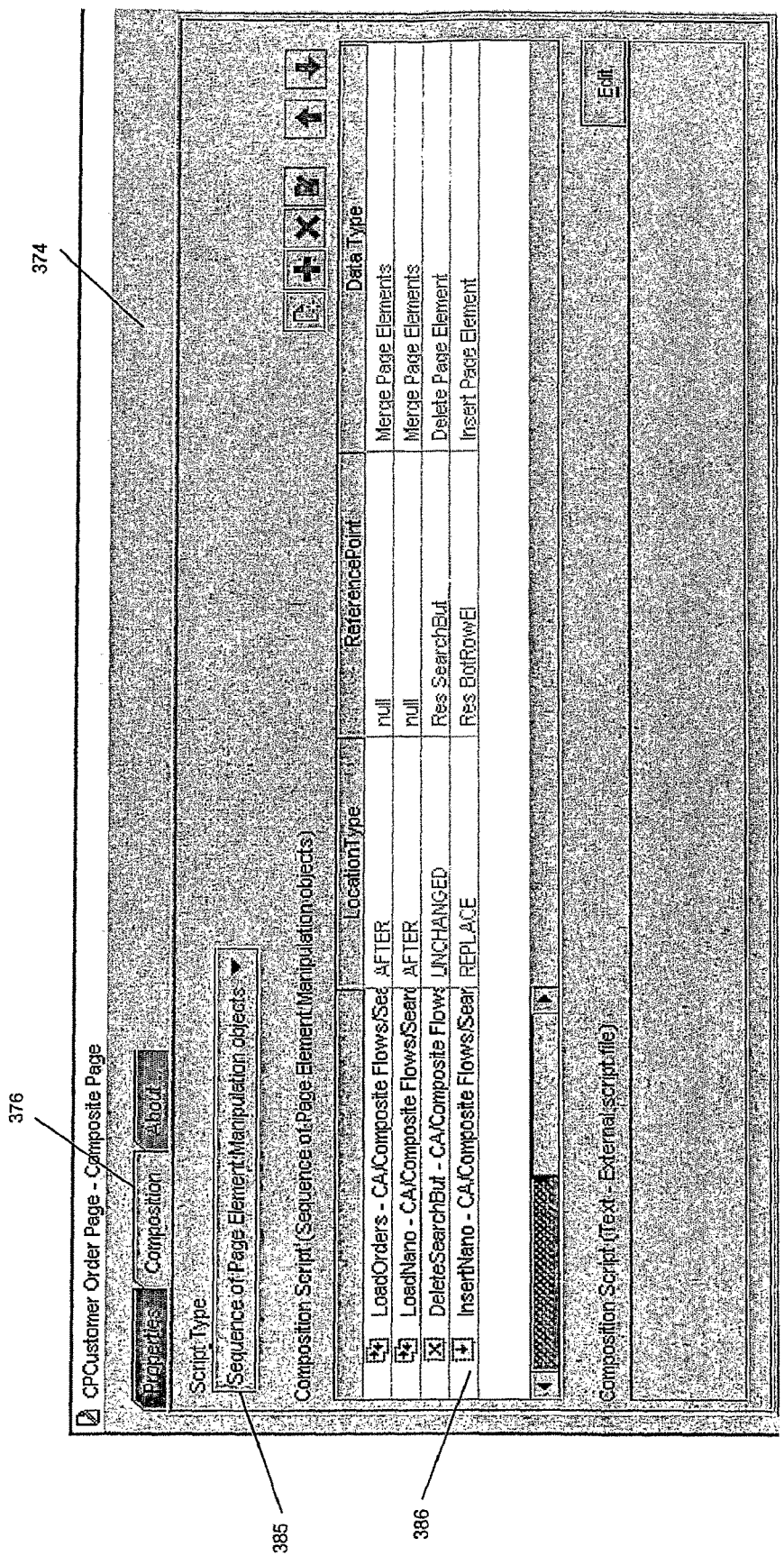
FIG. 52 is a screenshot of a dialog box used to configure a composition script.
Figure 53:
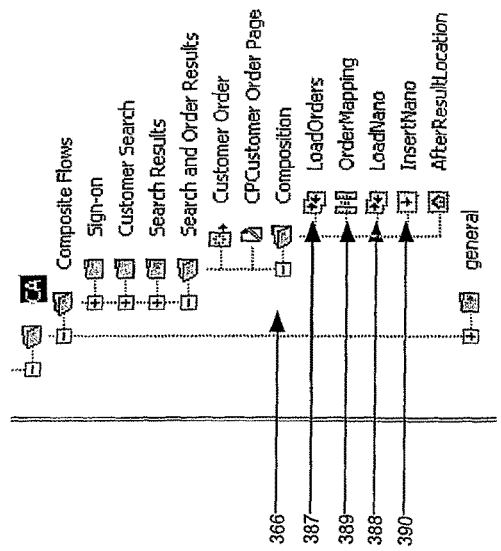
FIG. 53 is a screenshot showing part of the dialog box of FIG. 38 in further detail.

FIG. 52 illustrates the composition tab 376 of the dialog box 374. This tab defines a composition script which is used to combine the specified page elements to generate the composite page. An area 385 specifies the script type (in this case a sequence of page element manipulations), and an area 386 specifies the actions to be carried out. In this case it can be seen that a first action involves fetching a search page provided by the CRM system, a second action fetches a page from the order system, a third action deletes a search button, and a fourth action inserts details from the fetched order page. FIG. 53 illustrates part of the explorer window 295 which shows that the composition folder contains objects relating to the four actions shown in the area 386 of the dialog box 52. The first action is represented by a load orders object 387, the second action is represented by a load nano object 388, the third action is represented by an OrderMapping object 389 and the fourth action is represented by an insert nano object 390.

Figure 55:
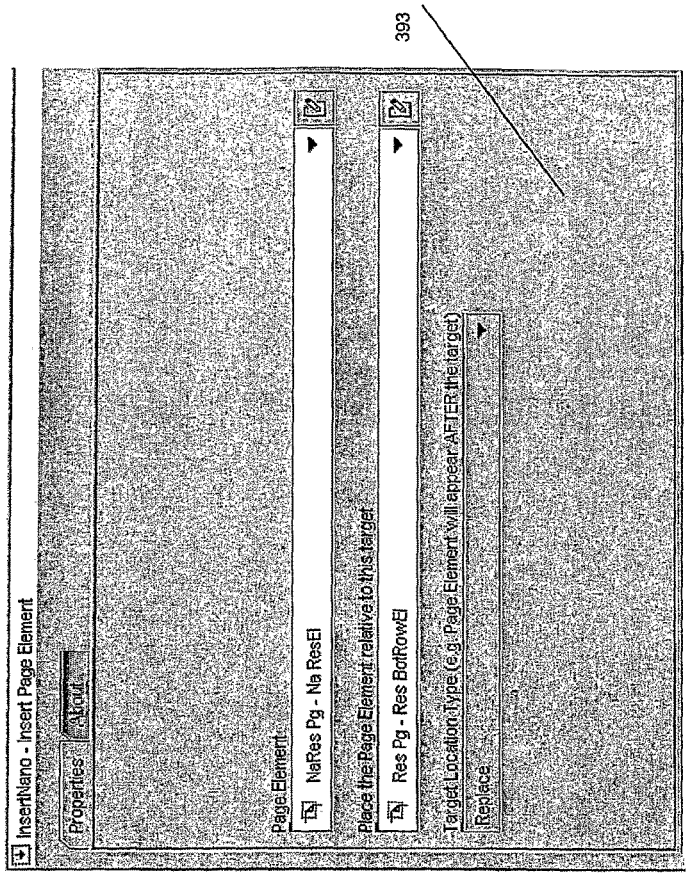
FIGS. 54 and 55 are screenshots of a dialog box used in conjunction with the dialog box of FIG. 52.
Figure 54:
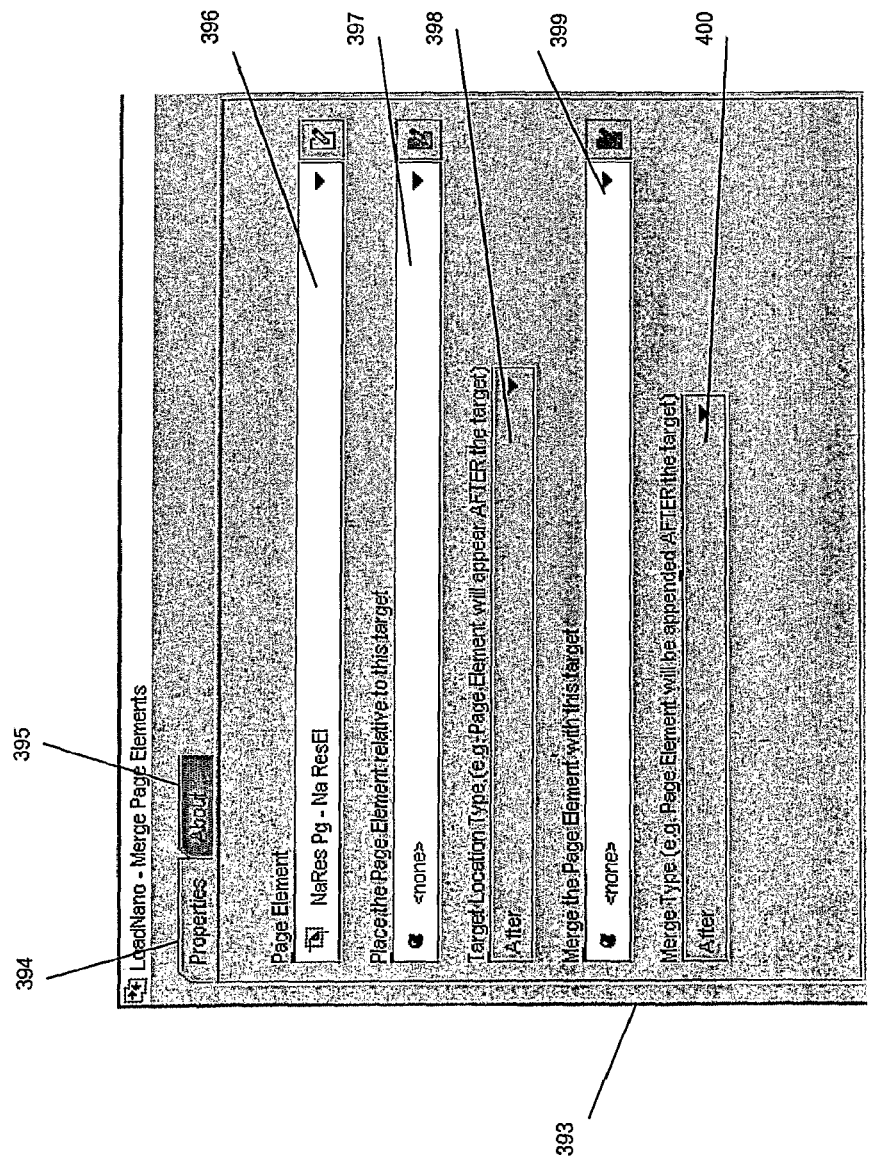

FIGS. 54 and 55 illustrate a dialog box 393 used to define a composition action. A properties tab 394 and an about tab 395 are provided. The properties tab 394 is illustrated in FIG. 54. It can be seen that this tab allows a page element to be specified in a page element text box 396. Location of the specified page element is specified relative to a page element specified in a text box 397, and the relative location (e.g before or after) is specified in a text box 398. If the page element specified in the page element text box 396 is to be merged with another page element, the other page element is specified in a text box 399 and the type of merge is specified in a text box 400. FIG. 55 illustrates the dialog box 393 when used to simply insert a page element relative to another page element, that is, when no merge operation is to be performed.

Figure 36:
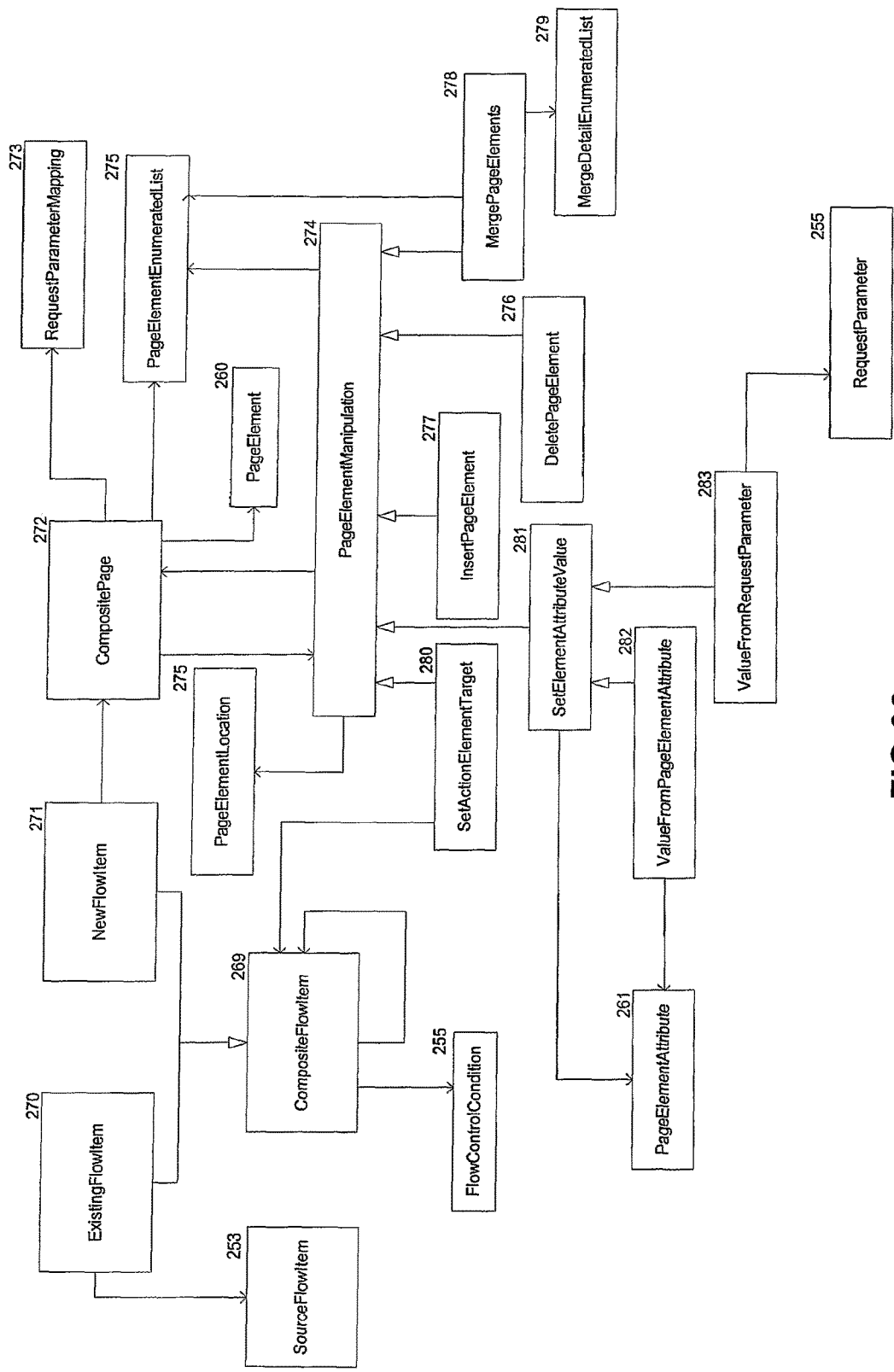
FIG. 36 is a class diagram showing classes used to model a composite application in embodiments of the present invention.

It will be appreciated that data input by a user using the GUI described above can be used to create one or more source application models of the form illustrated in FIG. 35 and a composite application model of the form illustrated in FIG. 36. When such models have been created, it is necessary to generate from the models data for inclusion in the IDM. This is achieved using a process herein referred to as publishing. Publishing can conveniently be achieved by providing a publish button within the GUI, at which point the composite application is created by generating suitable IDM data.

Figure 56:
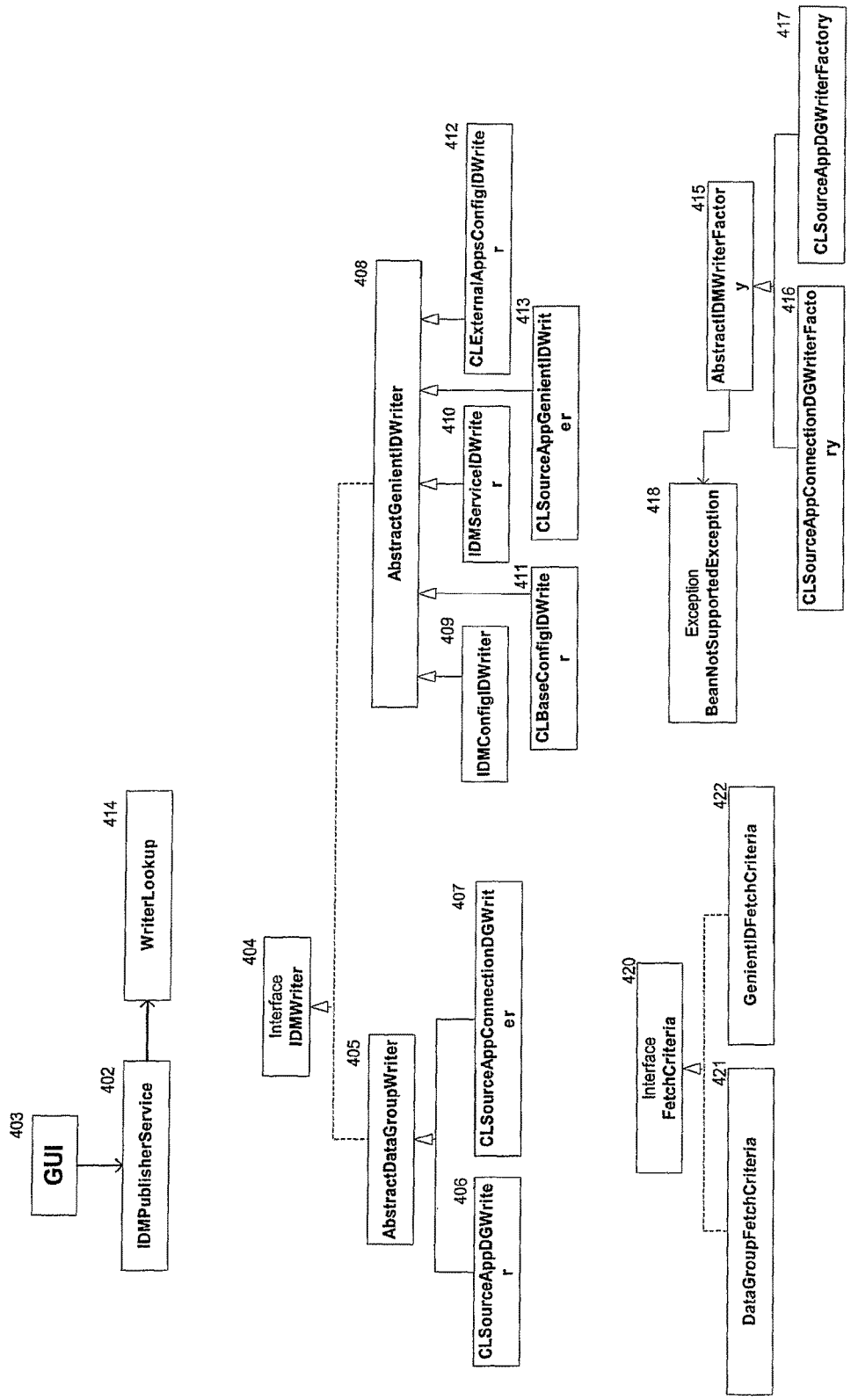
FIG. 56 is a class diagram showing classes used to publish a model.

The process of publishing is now described. FIG. 56 illustrates Java classes used by the publisher. The publishing process is initialised by calling a method provided by an IDMPublisherService class 402. This can suitably be done by calling such a method from the GUI 403, or alternatively from a command line interface. The IDMPublisherService class 402 provides an overloaded publish method which is used for publishing. A first publish method takes a single Java bean representing a part of a composite application, and performs the necessary publishing. A second publish method takes an array of Java beans. The IDMPublisherService class 402 also provides a publishAll( ) method which can be used to publish all Java beans within a model.

Publishing a single part of a composite model may require data to be written to a plurality of different parts of the IDM structure described above. Each part of the IDM has an associated writer responsible for writing data to that specific part of the IDM, and finding data within the IDM. Writers are implemented as instances of classes which implement an IDMWriter interface 404. Two abstract classes implement the IDMWriter interface 404, an AbstractDataGroupWriter class 405 is used as a superclass for all writers which are responsible for creating and writing data to data groups within the IDM (e.g. the g2config data group illustrated in FIG. 20). Each data group has a single writer and only this writer is able to create the data group and manipulate NVP values. FIG. 56 illustrates a CLSourceAppDGWriter class 406 and a CLSourceAppConnectionDGWriter class 407 which are responsible for writing data groups within the IDM relating to CL configuration. The CLSourceAppDG- Writer class 406 is responsible for writing source application data groups 145, 147 (FIG. 21) while the CLSourceAppConnectionDGWriter class 407 is responsible for writing source application connection data groups 146, 148 (FIG. 21).

An AbstractGenientIDWriter class 408 again implements the IDMWriter interface 404. Subclasses of the AbstractGenientIDWriter class 408 are responsible for writing GenientID data to the IDM. These ID writer classes therefore allow entities within the IDM to be created and/or retrieved as described below. Five subclasses are illustrated in FIG. 56, and are described with reference to the IDM data structure of FIG. 21. An IDMConfigIDWriter class 409 is responsible for the CONFIG entity 129, a IDMServiceIDWriter class 410 is responsible for the SERVICE entity 135, a CLBaseConfigIDWriter class 411 is responsible for the BASE_CL_SERVICE entity 138, a CLExternalAppsConfigIDWriter class 412 is responsible for the EXT_APPS entity 140 and a CLSourceAppGenientIDWriter is responsible for source application entities such as the SrcApp1 entity 143 and the SrcApp2 entity 144.

The IDMPublisherService creates an uses an instance of a WriterLookup class 414 which is used to obtain details of any writers which are to be invoked to cause publishing of the specified Java bean(s). The WriterLookup class 414 maintains details of a set of WriterFactory classes which are used to create appropriate writers when required.

FIG. 56 also illustrates an AbstractIDMWriterFactory class 415 which is used as a superclass for all WriterFactory classes. Each data group writer class (i.e. all child classes of the AbstractDataGroupWriter class 405) will have an associated factory class which is a child of the AbstractIDMWriterFactory class 415. FIG. 56 illustrates a CLSourceAppConnectionDGWriterFactory class 416 which creates instances of the CLSourceAppConnectionDGWriter class 407, and a CLSourceAppDGWriterFactory class 417 which creates instance of CLSourceAppDGWriter class 406. Factory classes can throw a BeanNotSupportedException exception 418.

Finally, FIG. 56 illustrates a FetchCriteria interface 420 which is implemented by a DataGroupFetchCriteria class 421 and a GenientIDFetchCriteria class 422. Use of these classes is described below.

Figure 57:
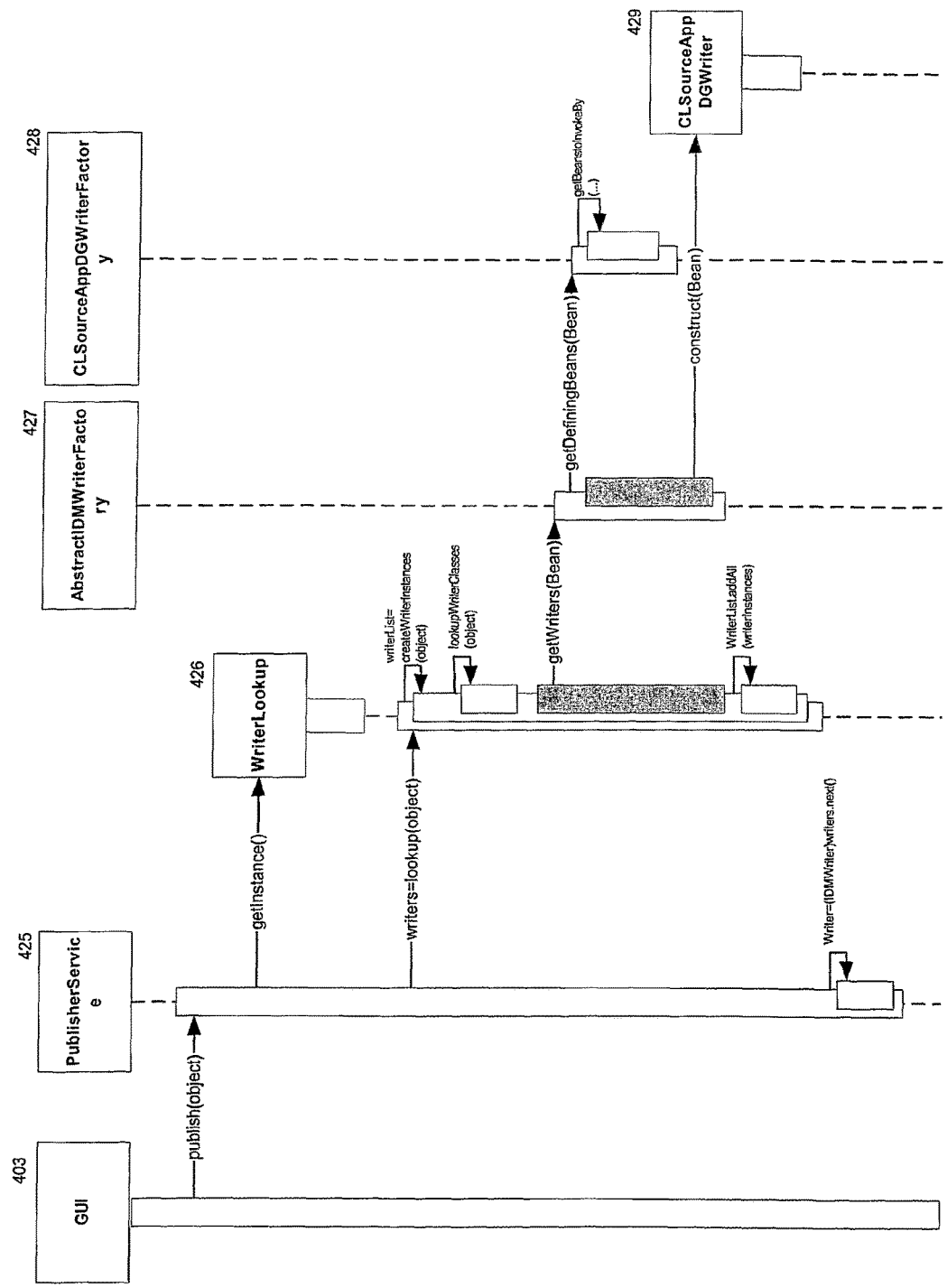
FIG. 57 is a sequence diagram illustrating location and instantiation of appropriate writer classes.

Publishing using the classes illustrated in FIG. 56 is now described. FIG. 57 illustrates how the PublisherService class 402 is used to create appropriate writer classes. A user uses the GUI 403 which calls a public publish method provided by a PublisherService object 425 providing an object to be published as a parameter. The PublisherService object 425 calls a getInstance method provided by a WriterLookup object 426 to create the WriterLookup object 426.

The PublisherService object 425 then calls a lookup method (which takes the object to be published as a parameter) provided by the WriterLookup object and this method provides an array of IDMWriter objects representing writers which are to be invoked to allow publication of the specified object. On receiving the lookup method call, the WriterLookup object 426 calls a private createWriterInstances( ) method to create instances of all writer classes required for publication of the specified object, and in order to obtain the necessary data the createWriterInstances method itself calls a private lookupWriterClasses method using the specified object as a parameter, and this method returns a list of writers which should be invoked. These writers will be instances of a variety of different writer classes, all of which are subclasses of AbstractIDMWriterFactory. Processing is simplified by storing each of these writer objects in an array of type AbstractIDMWriterFactory and calling methods specified by this abstract class which are overridden within the respective subclass.

For each AbstractIDMWriterFactory object (one of which 427 is illustrated in FIG. 57) returned by the lookupWriterClasses method, a public getWriters method provided by the AbstractIDMWriterFactory object 427 is called with the object to be published as a parameter to provide an instance of the appropriate writer. On calling this method the AbstractIDMWriterFactory object 427 calls a getDefiningBeans method provided by a CLSourceAppDGWriterFactory object 428 (a CLSourceAppDGWriter object 429 being a required writer in this case) to obtain details of any other objects within a source or composite application model which may be required to allow publication. For example if a source application object is being published, a corresponding connection object will also be required. Similarly, publication of a connection object may require publication of one or more source application objects. The CLSourceAppDGWriterFactory object 428 calls a getBeansToInvokeBy method to obtain details of a plurality of objects which are required, and a constructor method provided by the writer is called to create an instance of the appropriate writer for each object specified by the getBeansToInvokeBy method. Having created one ore more instances of the required writer in this way, the WriterLookup object 426 adds details of these instances to a list, and the PublisherService object 425 does likewise.

Figure 58:
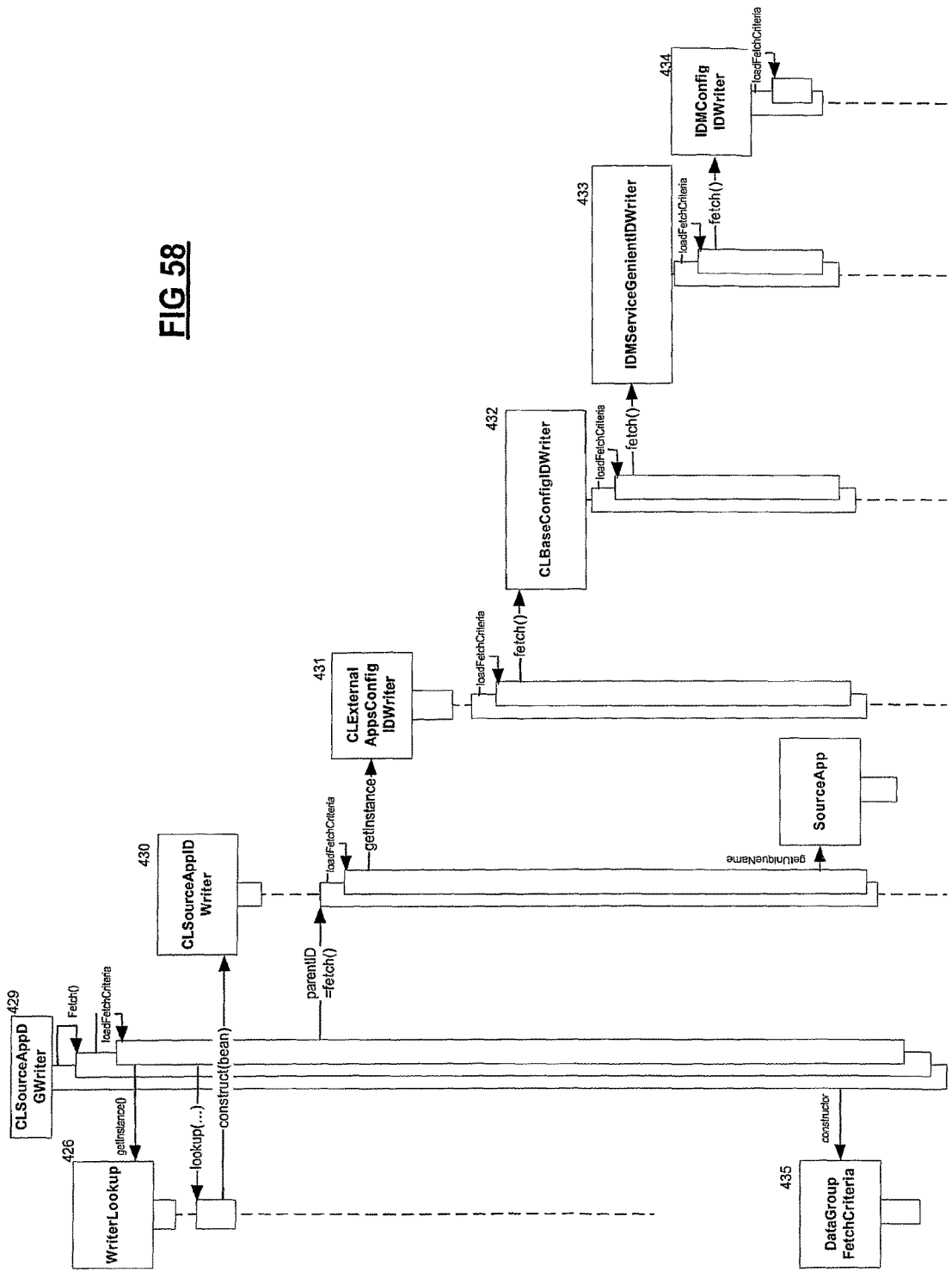
FIG. 58 is a sequence diagram illustrating writing locating a data group within the IDM.

The CLSourceAppDGWriter class is used to create and write a data group representing a particular source application within the IDM data structure. Referring back to FIG. 21, writing of data to the g2config data group 147 of SrcApp 2 using the CLSourceAppDGWriter object 429 created using the process illustrated in FIG. 57 is described with reference to FIG. 58. The CLSourceAppDGWriter object 429 provides a fetch( ) method which is used to obtain an appropriate data group from the IDM. This method is called following creation of the CLSourceAppDGWriter object 429 as illustrated in FIG. 57. The fetch( ) method calls a loadFetchCritera( ) method which returns an instance of the DataGroupFetchCrieria class 421, and this instance allows the appropriate data group to be located within the IDM.

Creation of a DataGroupFetchCriteria object is now described. loadFetchCriteria must locate within the hierarchical IDM datastructure the position of the data group 147 to be written. As a first step, it uses the WriterLookup object 426 to obtain details of an ID writer class corresponding to the data group writer class. This ID writer class will provide an ID for the SrcApp2 entity 144 in the IDM data structure. The lookup method provided by the WriterLookup object 426 is called to locate an appropriate factory object, and then constructs an appropriate ID writer using a construct method. In this case a CLSourceAppIDWriter object 430 Is created. Having created this object, the CLSourceAppDGWriter object 429 calls a fetch( ) method provided by the CLSourceAppIDWriter object 430 to obtain the ID of the entity SrcApp2 entity 144 in the IDM. In response to this call to fetch( ) the CLSourceApIDWriter object 430 calls its loadFetchCriteria( ) method, which uses a getInstance( ) method to obtain a writer responsible for writing its parent ID, that is the ID of the EXT_APPS entity 140 and this creates a CLExternalAppsConfigIDWriter object 431. The loadFetchCriteria( ) method of CLSourceAppIDWriter object 430 calls the fetch( ) method of the CLExternalAppsConfigIDWriter object 431, and this object in turn calls its loadFetchCriteria( ) method, which in turn calls a fetch( ) method provided by a CLBaseConfigIDWriter object 432, which is responsible for the BASE_CL_SERVICE entity 138 within the IDM. Again, this object calls its loadFetchCriteria method, which results in a call to a fetch method provided by a IDMServiceGenientIDWriter object 433 which is responsible for the SERVICE entity 135 within the IDM. This object in turn calls its loadFetchCriteria method and a fetch( ) method provided by an IDMConfigIDWriter object 434 is then called, this writer being responsible for the highest level entity, CONFIG 129, in the IDM data strucuture.

The loadFetchCriteria method of the IDMConfigWriter object 434 is called, and a GenientIDFetchCriteria object can be returned which uniquely identifies the root of the IDM tree. In turn, the IDMServiceGenientIDWriter object 433, the CLBaseConfigIDWriter object 432, and the CLExternalAppsConfig object 431 create instances of GenientIDFetchCriteria (not shown) which are used to locate appropriate entries within the IDM structure. The CLSourceAppIDWriter object 430 then calls a getUniquieName method to provide a unique ID for the data group to be written using the various instances of GenientIDFetchCriteria described above. Having obtained a location within the IDM where the datagroup should be written a DataGroupFetchCriteria object 435 is created, which represents the location to where the data group should be written.

It should be noted that each of the ID writers described above will locate appropriate entities within the IDM where such entities exist, and create entities within the IDM where this is necessary.

Figure 59:
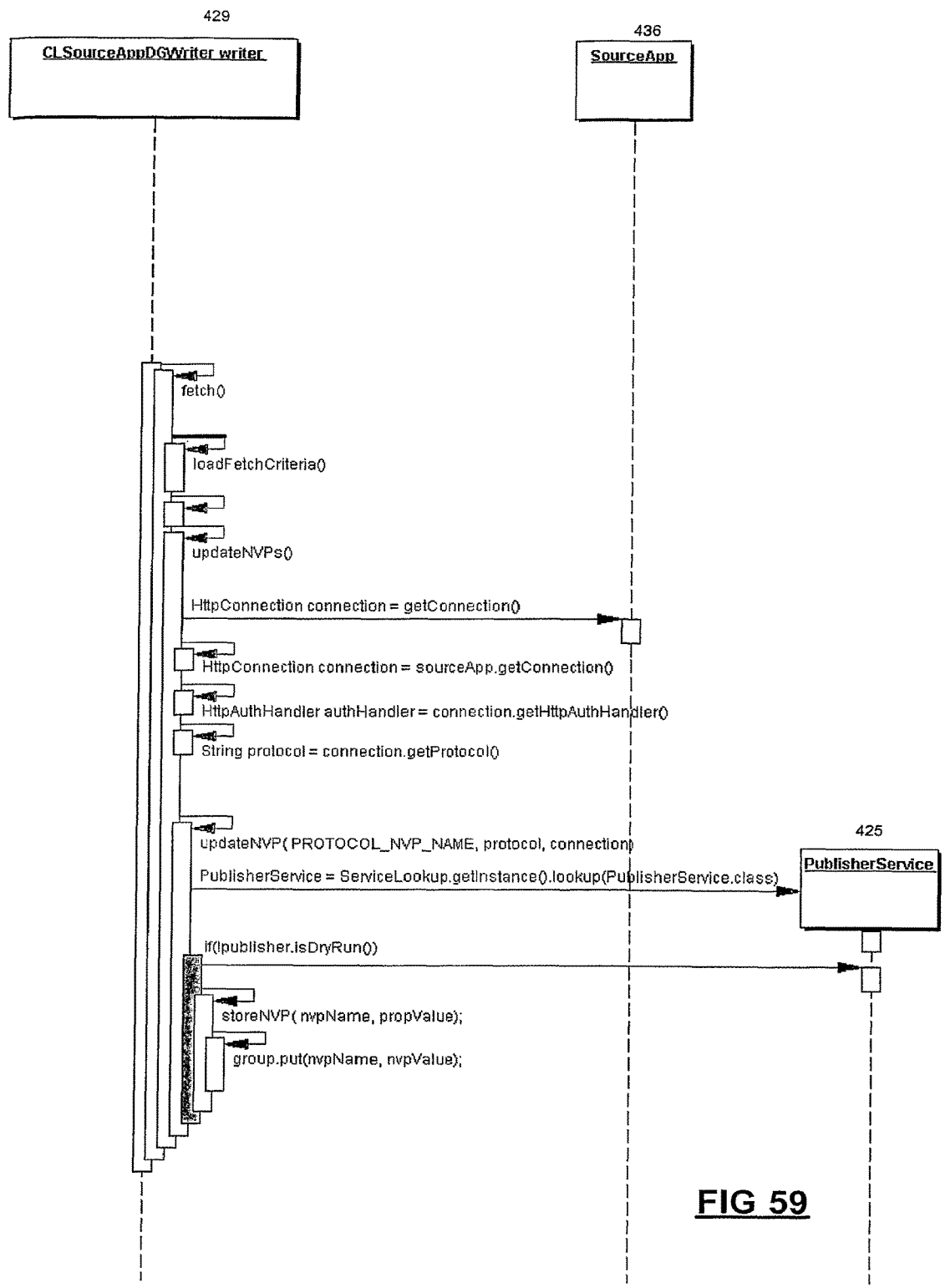
FIG. 59 is a sequence diagram illustrating writing of IDM data to a data group located using the process of FIG. 58, using the writer object created using the process of FIG. 57.

Having created the DataGroupFetchCriteria object 435, the CLSrouceAppDGWriter object 429 can then write appropriate NVP data to the source application's data group within the IDM. This process is illustrated in FIG. 59. An updateNVPs( ) method is called to perform the updating. As a first step the CLSourceAppDGWriter object 429 obtains details of various parameters from a source application object 436, and updates each NVP within the data group using an updateNVP method.

It preferred embodiments of the present invention, the PublisherService object 425 provides a dry run flag, which if set means that publication occurs, but data is not written to the IDM. The CLSourceAppDGWriter object 429 investigates the value of this flag, and if it is set to FALSE, NVPs are stored within the IDM using a storeNVP( ) method and group.put( ) method.

Although the preceding example has been concerned with writing data relating to a source application data group in a part of the IDM relating to CL configuration, it will be readily apparent to those skilled in the art that other IDM data can be written in a very similar manner.

Preferred embodiments of the publication mechanism described above provide various additional services. Firstly an unpublish function can be provided to remove data from the IDM relating to one or more composite applications which are no longer used. The unpublish function is provided by three classes, a DTCleaner class, a UXMCleaner class and a CLCleaner class. These classes are responsible for cleaning respective parts of the IDM noted by their names. Additionally, data in the IDM can be properly located only if it occurs below a well defined identifier, or if it is properly referenced from a datagroup. If data exists which cannot be properly located in this way it should be periodically removed from the IDM using a cleanup routine.

It will be appreciated that it is desirable to allow a plurality of composite applications be created which contain a commonly modelled source application, and the modelling techniques described above allow for such modelling. However, on publication, appropriate data is created for each composite application separately, (given the structure of the IDM described above). Therefore, if a source application model is amended, and subsequently published, this will affect only the composite application represented by the currently active project. Preferred embodiments of the invention therefore provide a mechanism for informing a user of all projects which are affected, and advising that each of these affected projects should be updated if they are to use the new source application model.

It should be noted that when data is published to the IDM it is preferable to do this in a transactional manner such that if problems occur an exception can be thrown, and roll back can return the IDM to the state prior to the start of the publication process.

The preceding description has presented a flexible way of modelling creating and operating composite applications. However some embodiments of the invention provide further flexibility, as is now described. Referring back to FIG. 2, it was explained that the server 13 receives requests from users using composite applications, generates requests for appropriate source data which are dierected to the source applications, and produces composite pages which are provided to the users.

In preferred embodiments of the present invention, the server 13 also runs a monitoring module which monitors user requests and produces management data. This management data can subsequently be used to reconfigure the composite application as necessary. For example, if it is determined that a large number of users input a sequence of requests which require the same two composite pages to be displayed, it may be desirable to provide within the composite application an additional composite page combining all the requested information. This can be achieved either by suitably amending IDM data, or alternatively by amending a composite application and subsequently publishing this model as described above. By operating a monitoring module in this way, use of the composite application can be monitored, to analyse user performance, and if appropriate to asses ways in which the composite application can be improved to improve user performance.

In some embodiments of the invention, two configurations for a composite application are provided. Each application providing essentially the same functionality, albeit using different composite pages. In some cases composite pages can comprise the same data, but with different data items being specified as mandatory. The configuration used in a particular situation can be determined by a number of different factors. For example, a configuration in which less data is mandatory may be used when the composite application is being heavily used so as to provide better performance. Alternatively, if a composite application is being used within a call centre concerned with sales, it may be determined by market research that callers calling at particular times of day find different special offers more attractive. In such cases two composite applications may be provided each providing details of slightly different products in response to the same user request. The composite application to be used can then be automatically selected on the basis of, for example, time of day. Similarly different behaviours may be configured for different times of year, or on the basis of an input customer ID or a user log on ID.

Although the embodiment of the invention described herein is implemented using the Java programming language it will be appreciated that the invention is in no way restricted to a Java implementation. Indeed, the invention can be implemented using any appropriate high level computer programming language. However, it is preferable to use an object oriented programming language to obtain the benefits of reuse and encapsulation which are inherent in such computer programming techniques.

Although the present invention has been described hereinbefore with reference to particular embodiments, it will be apparent to a skilled person in the art that modifications lie within the spirit and scope of the present invention. For example, it will be appreciated that the method for modelling composite applications described above can be used in isolation if so desired, and furthermore, the modelling and publication method provided by the invention is in no way limited to the IDM data structure described above by way of example.

The invention claimed is:

1. A method of configuring a computer system to provide at least one composite user interface to a plurality of source applications, the composite user interface comprising a plurality of user interface elements provided by the source applications, the method comprising:
performing by the computer system programmed with code stored in a memory and executing by a processor of the computer system to configure the computer system into a machine:
accessing in memory the user interface elements provided by the source applications;
combining a subset of at least two of the plurality of user interface elements from the source applications into composite user interface data, wherein for each source application the user interface elements provided by the source applications represent at least a portion of a user interface of the source application;
providing the composite user interface data to a user computer system for display as the composite user interface by the user computer system, wherein the composite user interface causes the user computer system to display the plurality of user interface elements provided by the source applications;
receiving a user request via one or more of the user interface elements provided by the source applications from the user computer system relevant to at least one of the source applications;
processing a model representing said composite user interface to generate rules for communication between said composite user interface and the source applications, wherein the model is distinct from an application implementing the composite user interface;
storing said rules within a hierarchical data structure comprising a plurality of entities;
storing within said hierarchical data structure an entity representing the composite user interface; and
associating with said entity a data group providing configuration data for the composite user interface;
storing within said hierarchical data structure a plurality of service entities representing processing modules to process user request inputs to the composite user interface to produce one or more requests to at least one source application, wherein at least some of said service entities include an associated data group storing configuration data, at least one of said service entities is an aggregation service entity representing an aggregation service configured to generate the one or more source application requests from the user request, said aggregation service entity includes a child entity representing the composite user interface and one of the source applications; and
generating one or more source requests, from an application implementing the composite user interface and in accordance with the model, to each relevant source application that represents the user request.

2. The method according to claim 1, wherein said model comprises a model of at least part of a user interface provided by each source application and a model of relationships between the at least part of the user interface elements provided by each source application and the composite user interface.

3. The method according to claim 1, wherein said rules are generated using a plurality of writers each writer being associated with an entity in said hierarchical data structure, and being adapted to write data to a data group associated with the respective entity.

4. The method according to claim 3, wherein processing said model comprises:
selecting one or more objects within said model;
determining one or more writers to be invoked to write data from the or each object to said hierarchical data structure; and
invoking the or each writer to write data to said hierarchical data structure.

5. The method according to claim 4, further comprising:
determining from said at least one writer at least one further object within said model, and processing said further object.

6. The method according to claim 4, further comprising:
identifying a further writer configured to identify an entity within said hierarchical data structure to which data is to be written.

7. The method according to claim 6, wherein said identifying an entity comprises:
attempting to locate an entity within said hierarchical data structure to which data should be written; and
if said attempt is unsuccessful, creating an appropriate entity.

8. The method according to claim 4, wherein each writer is a writer object which is an instance of a respective Java writer class.

9. The method according to claim 4, wherein each writer class has a corresponding writer factory class.

10. The method according to claim 9, further comprising:
registering each writer factory class with a writer lookup object;
providing details of the or each object to be processed to said writer lookup object; and
identifying one or more factory classes which should be used to create writer objects.

11. The method according to claim 1, wherein at least one specified user interface page is a composite user interface page.

12. The method according to claim 1, wherein processing said model comprises:
selecting one or more objects within said model;
determining one or more writers to be invoked to write data from the or each object to data groups in said hierarchical data structure; and
invoking the or each writer to write data to said hierarchical data structure.

13. The method according to claim 1, further comprising:
determining from said at least one writer at least one further object within said model, and processing said further object.

14. The method according to claim 1, further comprising:
identifying a further writer configured to identify an entity within said hierarchical data structure to which data is to be written.

15. The method according to claim 1, wherein identifying an entity comprises:
  attempting to locate an entity within said hierarchical data structure to which data should be written; and
  if said attempt is unsuccessful, creating an appropriate entity.

16. The method according to claim 1, wherein each writer is a writer object which is an instance of a respective writer class.

17. The method according to claim 1, wherein each writer class has a corresponding writer factory class.

18. The method according to claim 1, further comprising:
  registering each writer factory class with a writer lookup object;
  providing details of the or each object to be processed to said writer lookup object ; and
  identifying one or more factory classes which should be used to create writer objects.

19. A method of generating model data representing a model of a composite user interface comprising a plurality of user interface elements provided by a plurality of source applications, the method comprising:
  performing by the server computer system programmed with code stored in a memory and executing by a processor of the computer system to configure the server computer system into a machine:
    accessing in memory the user interface elements provided by the source applications;
    modelling at least part of a user interface provided by each of the source applications;
    modelling relationships between at least two of the user interface elements provided by the source applications and the composite user interface;
    storing, in a non-transitory, computer readable storage device, model data representing the modeling of the at least part of a user interface and the modelling relationships between the at least part of the user interface elements, wherein the model data represents a model that is distinct from an application implementing the composite user interface;
    processing said model to generate rules for communication between said composite user interface and said at least one source application;
    storing said rules within a hierarchical data structure comprising a plurality of entities;
    storing within said hierarchical data structure an entity representing the composite user interface;
    associating with said entity a data group providing configuration data for the composite user interface;
    storing within said hierarchical data structure a plurality of service entities representing processing modules to process user request inputs to the composite user interface to produce one or more requests to at least one source application, wherein at least some of said service entities include an associated data group storing configuration data, at least one of said service entities is an aggregation service entity representing an aggregation service configured to generate the one or more source application requests from the user request, said aggregation service entity includes a child entity representing the composite user interface and one of the source applications; and
    accessing the model data with the application to generate the composite user interface.

20. The method according to claim 19, wherein modelling at least part of the user interface provided by each of the source applications comprises:
  defining a plurality of source flow items each comprising a specified source user interface page provided by a source application; and
  defining relationships between said plurality of source flow items.

21. The method according to claim 20, wherein modelling at least part of the user interface provided by each of the source applications comprises:
  defining at least one page element within each specified source user interface page.

22. The method according to claim 20, wherein modelling at least part of the user interface provided by each of the source applications comprises:
  defining request parameters used to obtain each specified source user interface page.

23. The method according to claim 20, wherein modelling at least part of the user interface provided by each of the source applications comprises:
  defining at least one rule for each specified source user interface page which can be applied to enable recognition of the associated specified source user interface page.

24. The method according to claim 20, wherein each rule is specified using a regular expression, or a path expression.

25. The method according to claim 20, further comprising:
  defining a plurality of composite flow items each comprising a specified user interface page; and
  defining relationships between said plurality of composite flow items, wherein at least one composite flow item is a source flow item, and said specified user interface page is a specified source user interface page.

26. The method according to claim 21, wherein at least one specified user interface page is a composite user interface page, the method further comprising:
  modelling manipulations which are applied to said at least one page element within a specified source user interface page to create said composite user interface page.

27. The method according to claim 26, further comprising:
  specifying an ordered plurality of manipulations to be carried out to create said composite user interface page.

28. The method according to claim 20, wherein modelling at least part of the user interface provided by each of the source applications comprises:
  defining at least one flow control condition; and
  associating a flow control condition with at least one of said plurality of source flow items.

29. The method according to claim 19, wherein modelling at least part of the user interface provided by each of the source applications comprises:
  creating a plurality of objects which are instances of classes defined in an object oriented programming language.

30. The method according to claim 19, wherein modelling relationships between the at least part of the user interface elements provided by the source applications and the composite user interface comprises:
  combining at least part of a plurality of source application models.

31. The method according to claim 19, further comprising:
  defining a plurality of composite flow items each comprising a specified user interface page; and
  defining relationships between said plurality of composite flow items.

32. The method according to claim 19, further comprising modelling at least one further user interface element to be included in the composite user interface.

33. The method according to claim 19, wherein said rules are generated using a plurality of writers each writer being associated with an entity in said hierarchical data structure, and being adapted to write data to a data group associated with the respective entity.

* * * * *